(12) United States Patent
Baek et al.

(10) Patent No.: US 10,455,406 B2
(45) Date of Patent: Oct. 22, 2019

(54) METHOD AND APPARATUS FOR GENERATING PACKET DATA NETWORK CONNECTION OF USER EQUIPMENT

(71) Applicant: Samsung Electronics Co., Ltd., Suwon-si, Gyeonggi-do (KR)

(72) Inventors: Youngkyo Baek, Seoul (KR); Sunghoon Kim, Suwon-si (KR); Hoyeon Lee, Hwaseong-si (KR); Sangsoo Jeong, Suwon-si (KR); Sungjin Park, Yongin-si (KR); Hyeonmok Ko, Hwaseong-si (KR); Yunsun Baek, Suwon-si (KR); Songyean Cho, Seoul (KR); Guttman Erik, Waibstadt (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 15/196,509

(22) Filed: Jun. 29, 2016

(65) Prior Publication Data

US 2016/0381720 A1  Dec. 29, 2016

Related U.S. Application Data

(60) Provisional application No. 62/185,771, filed on Jun. 29, 2015.

(51) Int. Cl.
*H04W 8/14* (2009.01)
*H04W 76/12* (2018.01)
(Continued)

(52) U.S. Cl.
CPC .......... *H04W 8/14* (2013.01); *H04L 65/4061* (2013.01); *H04W 8/005* (2013.01); *H04W 76/12* (2018.02); *H04W 76/14* (2018.02); *H04W 88/04* (2013.01)

(58) Field of Classification Search
CPC ..... H04W 8/14; H04W 8/005; H04W 76/022; H04W 88/04; H04W 76/12; H04W 76/14; H04L 65/4061
See application file for complete search history.

(56) References Cited

U.S. PATENT DOCUMENTS

| 9,338,627 B1 * | 5/2016 | Singh | H04W 4/22 |
| 2014/0254523 A1 * | 9/2014 | Chai | H04W 72/04 |
| | | | 370/329 |

(Continued)

FOREIGN PATENT DOCUMENTS

| WO | 2014/133356 A1 | 9/2014 |
| WO | 2015/026111 A1 | 2/2015 |
| WO | 2015/068731 A1 | 5/2015 |

OTHER PUBLICATIONS

Huawei et al.; The ProSe UE-to-network relay with the network authorization; SA WG2 Meeting #99; S2-133281; Sep. 23-27, 2013; Xiamen, China.

(Continued)

*Primary Examiner* — Walter J Divito
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The method includes transmitting a service authorization request message to a first network device, the first network drive including a proximity-based service (ProSe) function, and receiving a service authorization response (Continued)

message from the first network device. The first terminal is a relay terminal capable of performing a UE-to-network relay function.

16 Claims, 34 Drawing Sheets

(51) Int. Cl.
*H04W 8/00* (2009.01)
*H04L 29/06* (2006.01)
*H04W 88/04* (2009.01)
*H04W 76/14* (2018.01)

(56) References Cited

U.S. PATENT DOCUMENTS

| | | | |
|---|---|---|---|
| 2015/0341794 A1* | 11/2015 | Vanderveen | G06Q 30/0261 705/14.58 |
| 2015/0382159 A1 | 12/2015 | Kim et al. | |
| 2016/0286459 A1 | 9/2016 | Enomoto et al. | |

OTHER PUBLICATIONS

Huawei et al.; The ProSe UE-to-network relay with the network authorization; SA WG2 Meeting #99; S2-133642; Sep. 23-27, 2013; Xiamen, China.

Nec; L2 ProSe UE-to-Network Relay alternative; SA WG2 Meeting #S2-99; S2-133366; Sep. 23-28, 2013; Xiamen, China.

"3rd Generation Partnership Project; Tethnical Specification Group Services and System Aspects; Proximity-based services (ProSe); Stage 2 (Release 13)", 3GPP Draft; 23303-DOO From C50 CRS Implemented, 3rd Generation Partnership-Project (3GPP), Mobile Competence Centre ; 650, Route Des Lucioles ; F-06921 Sophia-Antipolis Cedex ; France Jun. 25, 2015 (Jun. 25, 2015), XP050985466.

Samsung et al: "Public satety direct 1-14 discovery parameters provided by the 3rd party application server", 3GPP Draft; CI-161287 (WAS0871) 24 334 REL13 Provisioningviaappserver Revi, 3rd-Generation Partnership Project-(3GPP), Mobile Competence Centre ; 650, Route Des Lucioles ; F-06921 Sophia-Antipolis Cede vol. CT WGI, No. Jeju (Korea); Feb. 15, 2016-Feb. 19, 2016 Feb. 17, 2016 (Feb. 17, 2016), XP051050048.

\* cited by examiner

METHOD AND APPARATUS FOR GENERATING PACKET DATA NETWORK CONNECTION OF USER EQUIPMENT

CROSS-REFERENCE TO RELATED APPLICATION(S)

This application claims the benefit under 35 U.S.C. § 119(e) of a U.S. Provisional application filed on Jun. 29, 2015 in the U.S. Patent and Trademark Office and assigned Ser. No. 62/185,771, the entire disclosure of which is hereby incorporated by reference.

TECHNICAL FIELD

The present disclosure relates to a method and apparatus for creating a packet data network (PDN) connection of user equipment (UE) in a mobile communication system. More particularly, the present disclosure relates to a method and apparatus for creating a PDN connection of relay UE.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for creating a packet data network (PDN) connection of relay user equipment (UE) and obtaining relay-related information.

In accordance with an aspect of the present disclosure, a method for a first terminal to perform the transmission of signals is provided. The method includes transmitting a service authorization request message to a first network device and receiving a service authorization response message from the first network device. The first terminal is a relay terminal capable of performing a UE-to-network relay function. The first network device is a function related to a proximity-based service (ProSe function). The service authorization response message includes validity time information related to a service authorization, an access point name (APN), and a relay service code.

In accordance with another aspect of the present disclosure, a method for a first network device to perform the transmission of signals is provided. The method includes receiving a service authorization request message from a first terminal and transmitting a service authorization response message to the first terminal. The first terminal is a relay terminal capable of performing a UE-to-network relay function. The first network device is a function related to a ProSe function. The service authorization response message includes validity time information related to a service authorization, an APN, and a relay service code.

In accordance with another aspect of the present disclosure, a first terminal configured to perform the transmission of signals is provided. The first terminal includes a transceiver for performing transmission/reception of signals and a controller for transmitting a service authorization request message to a first network device and receiving a service authorization response message from the first network device. The first terminal is a relay terminal capable of performing a UE-to-network relay function. The first network device is a function related to a ProSe function. The service authorization response message includes validity time information related to a service authorization, an APN, and a relay service code.

In accordance with another aspect of the present disclosure, a first network device configured to perform the transmission of signals is provided. The first network device includes a transceiver for performing the transmission/reception of signals and a controller for receiving a service authorization request message from a first terminal and transmitting a service authorization response message to the first terminal. The first terminal is a relay terminal capable of performing a UE-to-network relay function. The first network device is a function related to a ProSe function. The service authorization response message includes validity time information related to a service authorization, an APN, and a relay service code.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
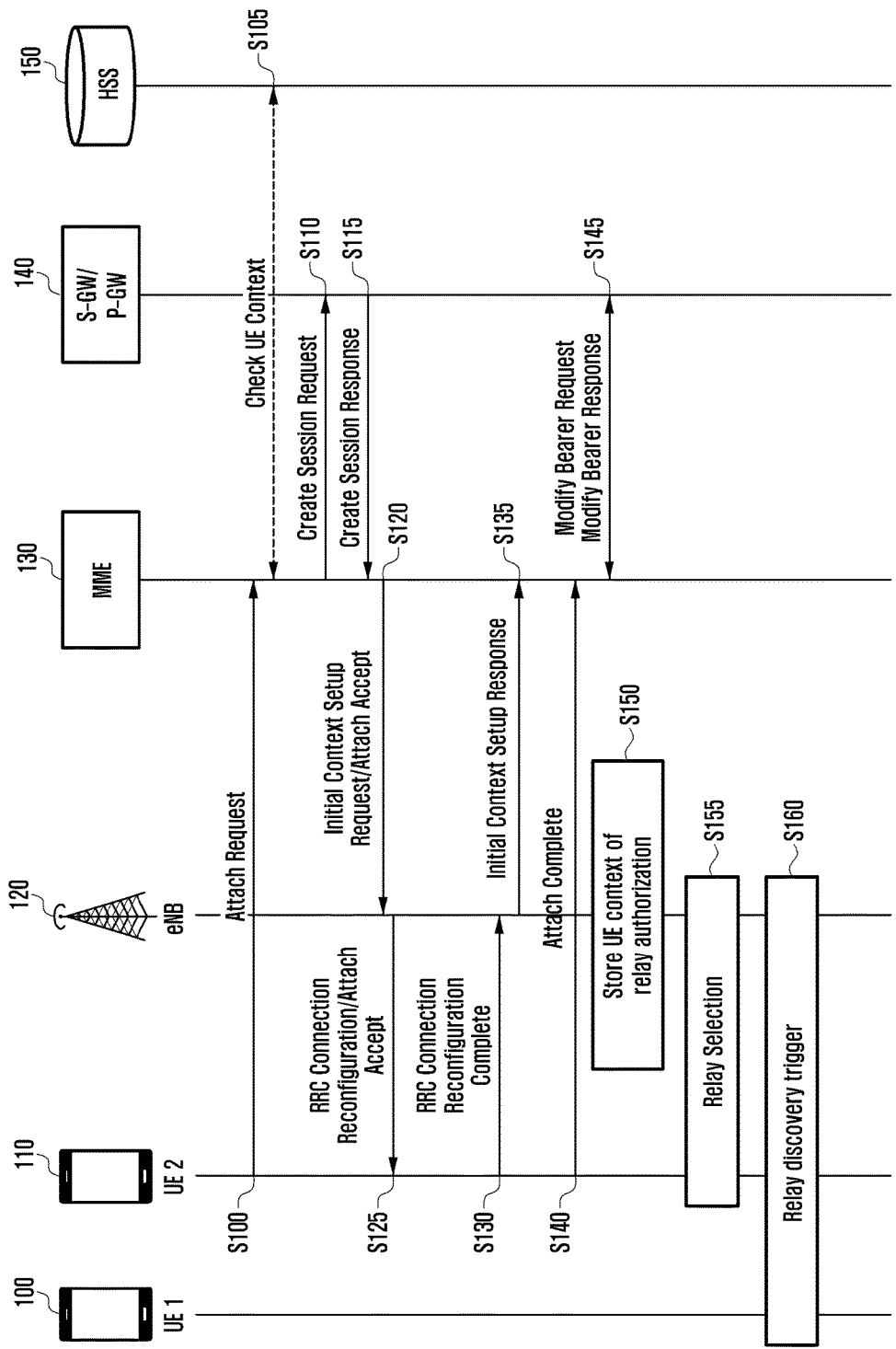
FIG. 1 is a flow diagram that describes a method for a proximity-based service (ProSe) user equipment (UE) to perform an attach procedure to serve as a relay according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description, the term 'user equipment (UE)' is interchangeable with 'terminal(s),' 'UE device(s),' etc. The term 'evolved node B (eNB)' is interchangeable with a 'base station,' etc.

Embodiment 1

Wireless communication systems have evolved to provide services based on communication and connection between users and an eNB or a network device. In order to support direct communication between UE devices using wireless communication systems, a device-to-device (D2D) communication technology has attracted attention. Services related to D2D communication may be called proximity-based services (ProSe).

ProSe users may use services, using a UE exchanging signals with another UE. The term 'UE' is interchangeable with 'terminal(s),' 'UE device(s),' etc. For example, a ProSe user may perform a discovery procedure to search for a user of concern or a corresponding operation to make a communication with a user of concern. ProSe may be used for commercial purpose or public safety services.

Since ProSe users use frequency resources, ProSe may be provided via network devices and eNBs. More specifically, when an eNB and a network are capable of allocating a radio resource to a user, the user is capable of transmitting/receiving data via the allocated radio resource.

ProSe UE is connected to ProSe function configured to control ProSe, serving as a network entity, via a long term evolution (LTE) network. The ProSe function performs: negotiation to provide services used by ProSe UE (e.g., direct discovery, direct communication, UE-to-network relay, etc.); and management and provision of the parameters. The ProSe function does not include an interface connected to a base station (also called an eNB) and a core network. The ProSe function obtains a profile of a user of ProSe UE by negotiating with a home subscriber server (HSS) or has stored the profile therein. The ProSe function is capable of providing parameters that ProSe UE can use in an LTE network. Examples of the parameters are radio resource information, information regarding authorization as to whether ProSe service can be used via a specific public land mobile network (PLMN), access point name (APN) to connect to ProSe function, etc.

The ProSe function, referring to a controller for ProSe (ProSe controller), is capable of negotiating with ProSe-enable UE to provide information that ProSe-enable UE can use for ProSe. When ProSe UE is located within a network coverage area, it is capable of negotiating with the ProSe function via a network connection or performing a direct discovery or direct communication with other ProSe UE via radio resources provided by an eNB.

When UE within a network coverage area detects the nearby UE (remote UE) which is located outside the network coverage area, the UE located within a network coverage area performs a UE-to-network relay function and provides a network connection to the remote UE located outside the network coverage area.

In order to provide a public safety service, ProSe is capable of providing functions allowing UE located outside the coverage of an eNB (called remote UE) to connect to a network by relay. When eNB expects that UE will move out of the coverage area, it may consider the UE to be potential remote UE, which is determined based on measurement information that the UE provides to the eNB. The remote UE performs a discovery procedure to discover UE for providing a relay function (called relay UE) and establishes direct communication with the relay UE.

The relay UE serves as a delegate for performing an internet protocol (IP) address allocation, and allocates an IP address to the remote UE. The remote UE and relay UE may be connected to each other by a one-to-one direct communication method. The remote UE is connected to a network via the relay UE. The remote UE transmits packets to the relay UE. The relay UE establishes a packet network connection for forwarding relay packets and forwards corresponding data to the network. The relay UE also forwards packets from the network to the remote UE via direct communication established in a relay connection.

In various embodiments of the present disclosure, ProSe refers to a D2D discovery or a D2D communication service. Although the embodiments of the present disclosure are described based on LTE systems defined in the 3rd Generation Partnership Project (3GPP), it should be understood that the present disclosure can also be applied to various wireless communication, e.g., wireless local area network (WLAN), Bluetooth, etc. The present disclosure provides a method and apparatus for exchanging relay-related inform between a core network and an eNB in order to support a UE-network relay function, which is one of the ProSe functions for providing public safety services. The present disclosure provides a method and an apparatus for controlling UE so that eNB supports a relay function.

The terms in the description are defined considering functions related to the present disclosure, and may be changed by users or operators according to their needs. Therefore, the terms will be defined throughout the contents of this description. Although the following disclosure describes embodiments of the present disclosure based on LTE and evolved packet core (EPC), as a core network, and radio access network (RAN) defined in the specification of 3GPP, it should be understood that the subject matter of the present disclosure can also be applied to other communication systems that have similar technical backgrounds to the present disclosure. In the various embodiments of the present disclosure, the term 'D2D service' refers to a service, as a general term, supporting communication between devices (D2D communication), e.g., a ProSe following a 3GPP standard technology, etc. In the following description, the term 'D2D system' is also called ProSe.

FIG. 1 is a flow diagram that describes a method for a ProSe UE to perform an attach procedure to serve as a relay according to an embodiment of the present disclosure.

Referring to FIG. 1, a ProSe UE performs an attachment procedure in order to serve as a relay, while informing a network that it is a relay. Through the procedure, a core network provides an eNB with information regarding the relay procedure of corresponding UE. The eNB selects relay UE based on the information, and triggers UE, expected to move out of the coverage area, to discover a relay.

In order to attach to a network, UE 2, which is indicated by reference number 110 and is using ProSe, transmits a message, Attach Request, to a mobility management entity (MME) 130 which is one of the network devices in operation S100. The UE 2 is capable of informing the MME 130 that it is UE which is performing a relay operation or is capable of performing a relay operation, using the Attach Request message, via the following methods. First, UE may include indication indicating that it is capable of a relay operation in the type field of the Attach Request message. Second, UE may set an APN for a packet data network (PDN) connection for a relay in the APN field of the Attach Request message. When ProSe UE performs a Service Authorization procedure for a ProSe operation along with the ProSe function, it may receive the APN for a PDN connection for a relay from the ProSe function. Alternatively, UE may set APN using a value preset in the universal integrated circuit card (UICC) of ProSe UE. Third, UE may set indication indicative of Relay Capability in the UE network Capability field of the Attach Request message. Fourth, UE may set indication indicative of ProSe relay UE in the Device Property field of the Attach Request message. UE 2 is capable of informing that it is ProSe relay UE using one or more of the four methods described above.

When receiving the Attach Request message configured by using one or more of the fourth methods described above, the MME 130 is capable of recognizing that the UE transmitting the Attach Request is UE which performs ProSe UE-to-network relay, based on the field configured by the four methods. When the MME ascertains that a value of an APN for a PDN connection for a relay is set to the APN field referring to the Attach Request message, it may determine that corresponding UE needs a bearer for a relay. Similarly, when the type of the Attach Request message is indicative of a relay, the MME may determine that the UE needs bearer context for a relay operation. When Relay capability of UE is indicated in the UE network Capability field of the Attach request message or relay UE is set in the Device Property field, the MME may determine that the UE needs bearer context suitable for the transmission of ProSe relay traffic, in preparation for a case that the UE uses a ProSe relay service.

In order to check whether UE 2 transmitting the Attach Request has a subscription which may be relayed, the MME 130 negotiates with an HSS 150 to check subscription information regarding UE 2 and obtains UE context for a relay function in operation S105. The UE context may contain: information as to whether UE can serve as a relay, allocation and retention priority (ARP) used for establishing bearer connection for a relay, quality of service (QoS) class identifier (QCI), UE-aggregate maximum bit rate (UE-AMBR), APN-AMBR of APN for a relay, etc. When the MME ascertains that UE 2 transmitting the Attach Request has a subscription required to perform a relay operation, it may omit the negotiation with the HSS.

In order to provide UE 2 transmitting the Attach Request with a bearer connection, the MME 130 transmits Create Session Request to a serving gateway (S-GW)/PDN gateway (P-GW) 140 in operation S110. In addition, when performing the transmission of the Create Session Request, the MME 130 may preferentially process a bearer connection establishment for a relay before other bearer connection establishments. To this end, the MME 130 includes a value of high priority in a Signaling Priority Indication or Indication Flag of Create Session Request message or a QoS value of bearer context, and transmits the request message or the context, so that the S-GW/P-GW can rapidly process the request. When the S-GW/P-GW checks the indication flag or Signaling Priority Indication of the received message, it may process the received message earlier than other requests from UE or the MME. Alternatively, when the S-GW/P-GW checks a QoS value in the bearer information and ascertains that the message includes a QCI or ARP value used for providing a relay service, it may determine that it needs to preferentially process the request earlier than other requests.

The S-GW/P-GW 140 transmits Create Session Response to the MME 130 in response to the Create Session Request in operation S115. When receiving the Create Session Response, the MME 130 contains an Attach Accept message and bearer context information in an Initial Context Setup Request message, and transmits the message to the eNB 120 in operation S120.

The MME 130 sets a ProSe UE-to-network relay value in the ProSe authorized field of the Initial Context Setup Request, and thus informs the eNB 120 that corresponding UE is UE using ProSe UE-to-network relay in operation S120. Alternatively, the MME 130 sets a QCI or ARP value for a relay in the enhanced radio access bearer (E-RAB) level QoS parameter of the enhanced terminal radio access bearer (E-TRAB) to be the setup list field, and thus allows the eNB to recognize that corresponding UE is capable of using a relay. When the eNB receives the Initial Context Setup Request via the methods described above, it recognizes that UE 2 is UE capable of using a ProSe UE-to-network relay.

The eNB 120 transmits Attach Accept to the UE 2, via a radio resource control (RRC) Connection Reconfiguration message in operation S125. The eNB 120 establishes a bearer connection with the UE 2, based on the bearer context of the Initial Context Setup Request in operation S130. When a bearer connection has been established between UE 2 and eNB 120, the eNB 120 transmits an Initial Context Setup response to the MME 130, informing that the bearer has been established in operation S135. The MME 130 transmits a Modify Bearer Request to the S-GW/P-GW 140, thereby establishing a bearer connection between the eNB and the S-GW/P-GW in operation S145. UE 2 transmits an Attach Complete message to the MME 130, and ends the Attach procedure in operation S140.

The eNB 120 obtains information regarding UE performing a ProSe relay, as a result according to operation S140, and stores context of the UE in operation S150. The obtained information may contain Authorization indicating that UE is allowed to perform a ProSe UE-to-network relay operation and/or Indication indicating that UE has capability to perform a ProSe UE-to-network relay operation.

The eNB 120 is capable of selecting relay UE to provide a ProSe UE-to-network relay service in operation S155. The eNB 120 may set specific UE as relay UE, based on the authorization or the indication, transmitted from the MME, for allowing or commanding the specific UE to perform a relay operation, in operation S155. The eNB may select relay UE, by signaling dedicated RRC or broadcasting a system information block (SIB). For example, the eNB may inform the UE 2 of relay UE via dedicated RRC signaling.

In order to select relay UE using dedicated RRC signaling, the eNB 120 may distinguish an RRC message for specific UE from others, by cell radio network temporary identifier (C-RNTI), and perform transmission of the message. The eNB may include, in the RRC message, Authorization indicating that corresponding UE is capable of performing a relay operation or Indication for triggering corresponding UE to perform a relay operation. Alternatively, when the eNB transmits resource pool used for a relay to UE via an RRC message, the UE receives the RRC message and ascertains that information related to a resource pool used for a relay is included in the received RRC message. In this case, the UE ascertains that it has been instructed to perform a relay function or authorized to perform a relay function.

In order to select relay UE using SIB broadcast, the eNB 120 includes C-RNTI of UE serving as a relay in an SIB message, and broadcasts the message. Alternatively, when the eNB 120 includes information related to a resource pool for a relay in an SIB message, UE capable of performing a relay function: determines whether it performs a relay operation, referring to the resource pool information; or starts performing a relay function according to an operation procedure when a relay resource pool is specified in the message.

The eNB 120 receives a measurement report from UE located within its cell. When the eNB 120 ascertains that the received signal strength indicator of UE is less than or equal to a preset threshold, based on the received measurement report, it may determine that the UE will soon move out of the network coverage area, which is, for the sake of convenient description, called a potential remote UE.

The eNB 120 is capable of triggering the UE transmitting the measurement report to perform a relay discovery operation so that the UE can use a ProSe UE-to-network relay service in operation S160. For example, when the eNB 120 ascertains that the received signal strength indicator of UE 1 transmitting the measurement report, indicated by reference number 100, is less than or equal to a preset threshold, it is capable of triggering a relay discovery operation. The eNB determines whether there is UE which is capable of performing a relay operation or is authorized to perform a relay operation, from among the UE devices to which the eNB provides services, before performing the triggering operation. When the eNB ascertains that there are one or more UE devices which are capable of performing a relay operation or are authorized to perform a relay operation, it is capable of triggering potential remote UE to start a relay discovery procedure. This process is performed to prevent potential remote UE from performing unnecessary operations, e.g., starting a relay discovery, although there is no relay-enable UE. The UE is capable of determining whether the relay discovery is performed using a threshold received from the ProSe function, instead of a threshold received from the eNB.

The eNB is capable of triggering potential remote UE to perform a relay discovery, by the following two methods: a dedicated RRC message and an SIB. The method using a dedicated RRC message is performed in such a way that: the eNB provides potential remote UE with a threshold for the cell signal strength; the potential remote UE measures the cell signal strength; and the eNB allows the UE to perform a relay discovery procedure when the measured level of cell signal strength is less than or equal to the threshold. The cell signal strength may be the signal strength of SIB signaling broadcast by the eNB 120 or the strength of sidelink signals for D2D communication. Alternatively, the eNB includes indication (identifier (ID)) commanding to perform a relay discovery in a dedicated RRC message, and transmits the message to potential remote UE. The potential remote UE receives the message and performs a relay discovery.

The method using an SIB is performed in such a way that: the eNB provides potential remote UE with a threshold for the cell signal strength via SIB information; the potential remote UE measures the cell signal strength; the eNB allows the UE to perform a relay discovery procedure when the measured level of cell signal strength is less than or equal to the threshold. The cell signal strength may be the signal strength of SIB signaling broadcast by the eNB or the strength of sidelink signals for D2D communication. The threshold may be preset in UE. Alternatively, the eNB or ProSe function may inform UE of the threshold.

Figure 2:
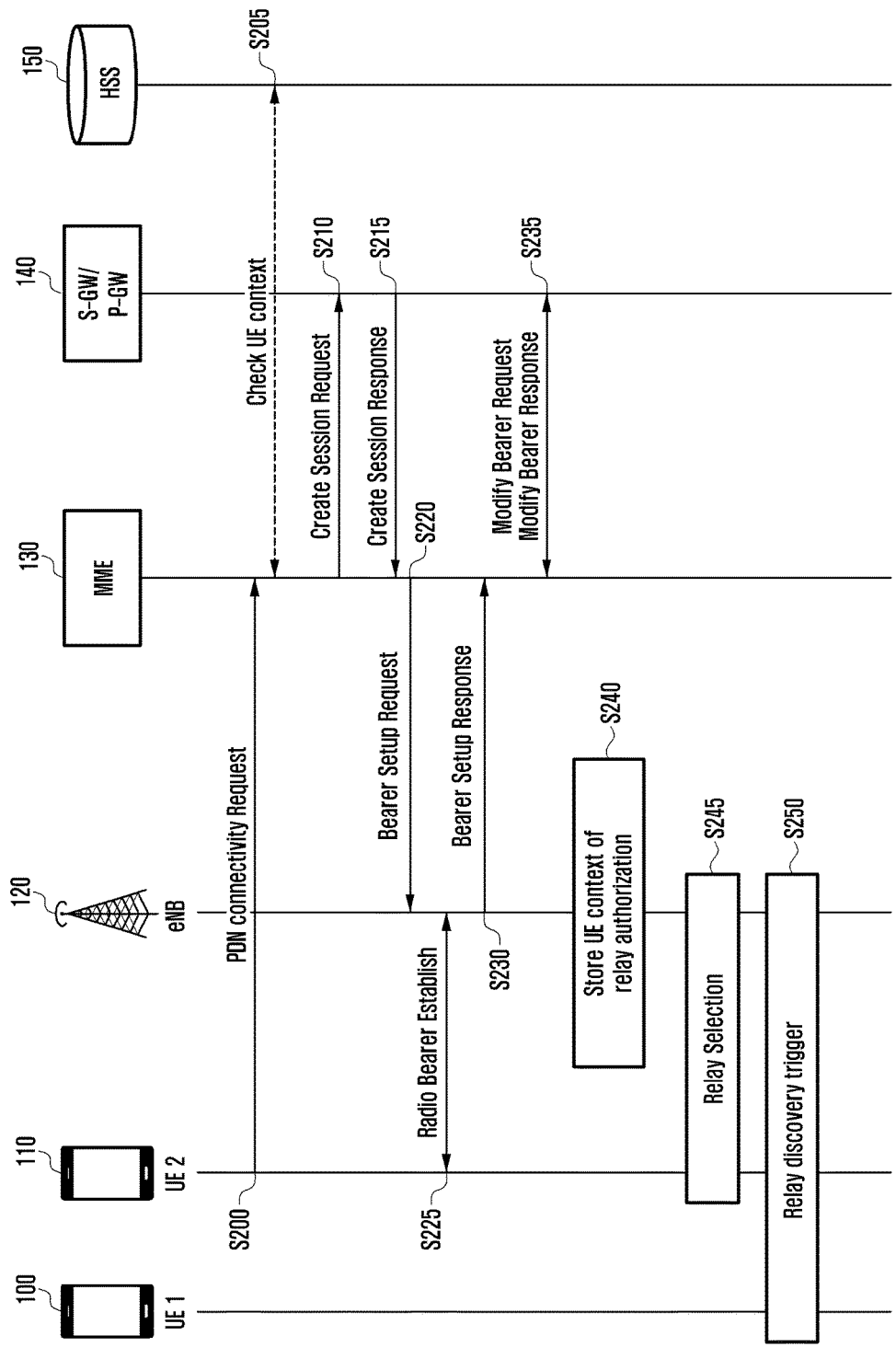
FIG. 2 is a flow diagram that describes a method for a ProSe UE to perform a packet data network (PDN) connection establishment procedure to serve as a relay according to an embodiment of the present disclosure.

FIG. 2 is a flow diagram that describes a method for a ProSe UE to perform a PDN connection establishment procedure to serve as a relay according to an embodiment of the present disclosure.

Referring to FIG. 2, ProSe UE performs a PDN connection establishment procedure for a relay in order to serve as a relay, while informing a network that it is a relay. Through the procedure, a core network provides an eNB with information regarding the relay procedure of corresponding UE. The eNB selects relay UE based on the information, and triggers UE, expected to move out of the coverage area, to discover a relay.

In order to establish a PDN connection in a network, UE 2, which is indicated by reference number 110 and is using ProSe, transmits a message, PDN Connectivity Request, to an MME 130 which is one of the network devices in operation S200. The UE 2 is capable of informing the MME 130 that it is UE which is performing a relay operation or is capable of performing a relay operation, using the PDN Connectivity Request message, via the following methods. First, UE may set an APN for a PDN connection for a relay in the APN field of the PDN connectivity request message. When ProSe UE performs a Service Authorization procedure for a ProSe operation along with the ProSe function, it may receive the APN for a PDN connection for a relay from the ProSe function. Alternatively, UE may set an APN using a value preset in the UICC of ProSe UE. Second, UE may set indication indicative of ProSe relay UE in the Device Property field of the PDN connectivity request message. Third, UE may set an ID indicative of relay UE in an additional parameter part in the Protocol Configuration Options field of the PDN connectivity request message. UE 2 is capable of informing that it is ProSe relay UE using one or more of the three methods described above.

When receiving the PDN connectivity request message configured by using one or more of the three methods described above, the MME 130 is capable of recognizing that the UE transmitting the PDN connectivity request is UE which performs ProSe UE-to-network relay, based on the field configured by the methods. When the MME ascertains that a value of an APN for a PDN connection for a relay is set to the APN field, based on the PDN connectivity request message, it may determine that corresponding UE needs a bearer for a relay. When relay UE is set in the Device Property field of the PDN connectivity request message or an ID indicative of relay UE is set in the Protocol Configuration Options field, the MME may determine that the UE needs bearer context suitable for the transmission of ProSe relay traffic.

In order to check whether UE 2 transmitting the PDN connectivity request has a subscription which may be relayed, the MME 130 negotiates with an HSS 150 to check subscription information regarding UE 2 and obtains UE context for a relay function in operation S205. The UE context may contain: information as to whether UE can serve as a relay, ARP used for establishing bearer connection for a relay, QCI, UE-AMBR, APN-AMBR of APN for a relay, etc. When the MME ascertains that UE 2 transmitting the PDN connectivity request has a subscription required to perform a relay operation, it may omit the negotiation with the HSS.

In order to provide UE 2 transmitting the PDN connectivity request with a bearer connection, the MME 130 transmits Create Session Request to an S-GW/P-GW 140 in operation S120. In addition, when performing the transmission of the Create Session Request, the MME 130 may preferentially process a bearer connection establishment for a relay before other bearer connection establishments. To this end, the MME 130 includes a value of high priority in a Signaling Priority Indication or Indication Flag of Create Session Request message or a QoS value of bearer context, and transmits the request message or the context, so that the S-GW/P-GW can rapidly process the request. When the S-GW/P-GW checks the indication flag or Signaling Priority Indication of the received message, it may process the received message earlier than other requests from UE or the MME. Alternatively, when the S-GW/P-GW checks a QoS value in the bearer information and ascertains that the message includes a QCI or ARP value used for providing a relay service, it may determine that it needs to preferentially process the request earlier than other requests.

The S-GW/P-GW 140 transmits Create Session Response to the MME 130 in response to the Create Session Request in operation S215. When receiving the Create Session Response, the MME 130 contains bearer context information in a Bearer Setup Request message, and transmits the message to the eNB 120 in operation S220.

The MME 130 sets a ProSe UE-to-network relay value in the ProSe related field of the Bearer Setup Request, and thus informs the eNB 120 that corresponding UE is UE using ProSe UE-to-network relay in operation S220. Alternatively, the MME 130 sets a QCI or ARP value for a relay in the E-RAB level QoS parameter of the E-TRAB to be the setup list field, and thus allows the eNB to recognize that corresponding UE is capable of using a relay. When the eNB receives the Bearer Setup Request via the methods described above, it recognizes that UE 2 is UE capable of using a ProSe UE-to-network relay.

The eNB 120 establishes a wireless bearer connection with UE via an RRC message in operation S225. The eNB may select UE 2 so that the UE 2 can perform a relay function. The eNB is capable of including an indicator for authorizing UE 2 to serve as a relay or an indication commanding UE 2 to perform a relay operation in the RRC Connection Reconfiguration message. The UE 2 identifies the indication in the RRC Connection Reconfiguration message transmitted from the eNB and determines whether it performs a relay operation.

When a bearer connection has been established between UE 2 and eNB 120, the eNB 120 transmits a Bearer Setup response to the MME 130, informing that the bearer has been established in operation S230. The MME 130 transmits a Modify Bearer Request to the S-GW/P-GW 140, thereby establishing a bearer connection between the eNB and the S-GW/P-GW in operation S235.

The eNB 120 obtains information regarding UE performing a ProSe relay, as results according to the individual operations, and stores context of corresponding UE in operation S240. The obtained information may contain Authorization indicating that UE is allowed to perform a ProSe UE-to-network relay operation and/or Indication indicating that UE has capability to perform a ProSe UE-to-network relay operation.

The eNB 120 is capable of selecting relay UE to provide a ProSe UE-to-network relay service in operation S245. The eNB 120 may set specific UE as relay UE, based on the authorization or the indication, transmitted from the MME 130, for allowing or commanding the specific UE to perform a relay operation, in operation S245. The eNB may select relay UE, by signaling dedicated RRC or broadcasting SIB.

In order to select relay UE using dedicated RRC signaling, the eNB 120 may distinguish an RRC message for specific UE from others, by C-RNTI, and perform transmission of the message. The eNB may include, in the RRC message, Authorization indicating that corresponding UE is capable of performing a relay operation or Indication for triggering corresponding UE to perform a relay operation. Alternatively, when the eNB transmits resource pool used for a relay to UE via an RRC message, the UE receives the RRC message and ascertains that information related to a resource pool used for a relay is included in the received RRC message. In this case, the UE ascertains that it has been instructed to perform a relay function or authorized to perform a relay function.

In order to select relay UE using SIB broadcast, the eNB 120 includes C-RNTI of UE serving as a relay in an SIB message, and broadcasts the message. Alternatively, when the eNB 120 includes information related to a resource pool for a relay in an SIB message, UE capable of performing a relay function: determines whether it performs a relay operation, referring to the resource pool information; or starts performing a relay function according to an operation procedure when a relay resource pool is specified in the message.

The eNB 120 receives a measurement report from UE located within its cell. When the eNB 120 ascertains that the received signal strength indicator of UE is less than or equal to a preset threshold, based on the received measurement report, it may determine that the UE will soon move out of the network coverage area, which is, for the sake of convenient description, called a potential remote UE.

The eNB 120 is capable of triggering the UE transmitting the measurement report to perform a relay discovery operation so that the UE can use a ProSe UE-to-network relay service in operation S250. The eNB determines whether there is UE which is capable of performing a relay operation or is authorized to perform a relay operation, from among the UE devices to which the eNB provides services, before performing the triggering operation. When the eNB ascertains that there are one or more UE devices which are capable of performing a relay operation or are authorized to perform a relay operation, it is capable of triggering potential remote UE to start a relay discovery procedure. This process is performed, to prevent potential remote UE from performing unnecessary operations, e.g., starting a relay discovery, although there is no relay-enable UE. The UE is capable of determining whether the relay discovery procedure is performed using a threshold received from the ProSe function, instead of a threshold received from the eNB.

The eNB 120 is capable of triggering potential remote UE (e.g., UE 1, indicated by reference number 100) to perform a relay discovery, by the following two methods: by using a dedicated RRC message and by broadcasting an SIB. The method using a dedicated RRC message is performed in such a way that: the eNB provides potential remote UE with a threshold for the cell signal strength; the potential remote UE measures the cell signal strength; and the eNB allows the UE to perform a relay discovery procedure when the measured level of cell signal strength is less than or equal to the threshold. The cell signal strength may be the signal strength of SIB signaling broadcast by the eNB 120 or the strength of sidelink signals for D2D communication. Alternatively, the eNB includes indication (ID) commanding to perform a relay discovery in a dedicated RRC message, and transmits the message to potential remote UE. The potential remote UE receives the message and performs a relay discovery.

The method using an SIB is performed in such a way that: the eNB provides potential remote UE with a threshold for the cell signal strength via SIB information; the potential remote UE measures the cell signal strength; and the eNB allows the UE to perform a relay discovery procedure when the measured level of cell signal strength is less than or equal to the threshold. The cell signal strength may be the signal strength of SIB signaling broadcast by the eNB or the strength of sidelink signals for D2D communication. The threshold may be preset in UE. Alternatively, the eNB or ProSe function may inform UE of the threshold.

Figure 3:
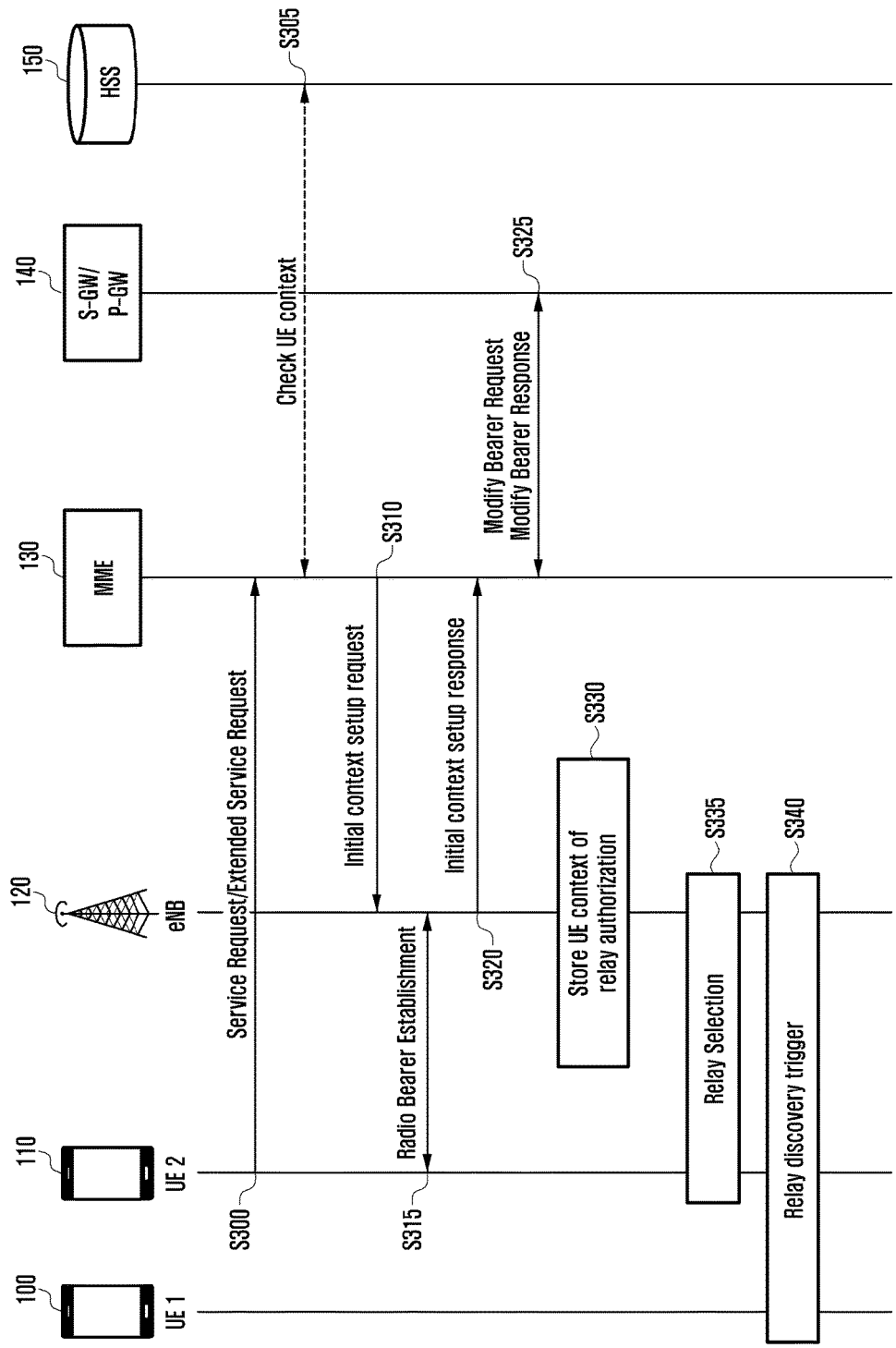
FIG. 3 is a flow diagram that describes a method for a ProSe UE to perform a service request procedure to serve as a relay according to an embodiment of the present disclosure.

FIG. 3 is a flow diagram that describes a method for a ProSe UE to perform a service request procedure to serve as a relay according to an embodiment of the present disclosure.

Referring to FIG. 3, ProSe UE performs a service request procedure in order to serve as a relay, while informing a network that it is a relay. Through the procedure, a core network provides an eNB with information regarding the relay procedure of corresponding UE. The eNB selects relay UE based on the information, and triggers UE, expected to move out of the coverage area, to discover a relay.

In order to establish a bearer connection for a relay in a network, UE 2, which is indicated by reference number 110 and is using ProSe, transmits a message, service request, to an MME 130 which is one of the network devices in operation S300. The UE 2 may also transmit a message, extended service request, to the MME 130. The UE 2 is capable of informing the MME 130 that it is UE which is performing a relay operation or is capable of performing a relay operation, using the extended service request message, via the following methods. First, UE may include an ID indicating that it uses a ProSe UE-to-network relay service in the Service Type field of the extended service request message. Second, UE may specify that it is UE using ProSe UE-to-network relay in the Device Property field of the extended service request message. When receiving the extended service request message configured by using one or two methods described above, the MME 130 is capable of recognizing that the UE transmitting the extended service request is UE which performs ProSe UE-to-network relay, based on the field configured by the methods.

In order to check whether UE 2 transmitting the service request or extended service request has a subscription which may be relayed, the MME 130 negotiates with an HSS 150 to check subscription information regarding UE 2 and obtains UE context for a relay function in operation S305. The UE context may contain: information as to whether UE can serve as a relay, ARP used for establishing bearer connection for a relay, QCI, UE-AMBR, APN-AMBR of APN for a relay, etc. When the MME ascertains that UE 2 transmitting the service request has a subscription required to perform a relay operation, it may omit the negotiation with the HSS.

In order to provide UE 2 transmitting the service request or extended service request with a bearer connection, the MME 130 includes bearer context information in an Initial Context Setup Request message and transmits the message to the eNB 120 in operation S310. The MME 130 sets a ProSe UE-to-network relay value in the ProSe authorized field of the Initial Context Setup Request, and thus informs the eNB 120 that corresponding UE is UE using ProSe UE-to-network relay in operation S310. Alternatively, the MME 130 sets a QCI or ARP value for a relay in the E-RAB level QoS parameter of the E-TRAB to be the setup list field, and thus allows the eNB to recognize that corresponding UE is capable of using a relay. When the eNB receives the Initial Context Setup Request via the methods described above, it recognizes that UE 2 is UE capable of using a ProSe UE-to-network relay.

The eNB 120 establishes a wireless bearer connection with UE (e.g., UE 2) via an RRC message in operation S315. The eNB may select UE 2 so that the UE 2 can perform a relay function. The eNB is capable of including an indicator (or indication) for authorizing UE 2 to serve as a relay or an indication commanding UE 2 to perform a relay operation in the RRC Connection Reconfiguration message. The UE 2 identifies the indication in the RRC Connection Reconfiguration message transmitted from the eNB and determines whether it performs a relay operation.

When a bearer connection has been established between UE 2 and eNB 120, the eNB 120 transmits an Initial Context Setup response to the MME 130, informing that the bearer has been established in operation S320. The MME 130 transmits a Modify Bearer Request to the S-GW/P-GW 140, thereby establishing a bearer connection between the eNB and the S-GW/P-GW in operation S325.

The eNB 120 obtains information regarding UE performing a ProSe relay, as results according to the individual operations, and stores context of corresponding UE in operation S330. The obtained information may contain Authorization indicating that UE is allowed to perform a ProSe UE-to-network relay operation and/or Indication indicating that UE has capability to perform a ProSe UE-to-network relay operation.

The eNB 120 is capable of selecting relay UE to provide a ProSe UE-to-network relay service in operation S335. The eNB 120 may set specific UE as relay UE, based on the authorization or the indication, transmitted from the MME 130, for allowing or commanding the specific UE to perform a relay operation, in operation S335. In this case, the eNB may select UE 2 as relay UE. The eNB may select relay UE, by signaling dedicated RRC or broadcasting SIB.

In order to select relay UE using Dedicated RRC Signaling, the eNB 120 may distinguish an RRC message for specific UE from others, by C-RNTI, and perform transmission of the message. The eNB may include, in the RRC message, Authorization indicating that corresponding UE is capable of performing a relay operation or Indication for triggering corresponding UE to perform a relay operation. Alternatively, when the eNB transmits information related to a resource pool used for a relay to UE via an RRC message, the UE receives the RRC message and ascertains that information related to a resource pool used for a relay is included in the received RRC message. In this case, the UE ascertains that it has been instructed to perform a relay function or authorized to perform a relay function.

In order to select relay UE using SIB broadcast, the eNB 120 includes C-RNTI of UE serving as a relay in an SIB message, and broadcasts the message. Alternatively, when the eNB 120 includes information related to a resource pool for a relay in an SIB message, UE capable of performing a relay function: determines whether it performs a relay operation, referring to the resource pool information; or starts performing a relay function according to an operation procedure when the relay resource pool information is included in the message.

The eNB 120 receives a measurement report from UE located within its cell. When the eNB 120 ascertains that the received signal strength indicator of UE is less than or equal to a preset threshold, based on the received measurement report, it may determine that the UE will soon move out of the network coverage, which is, for the sake of convenient description, called potential remote UE. In this case, UE 1 may be potential remote UE.

The eNB 120 is capable of triggering the UE transmitting the measurement report to perform a relay discovery operation so that the UE can use a ProSe UE-to-network relay service in operation S340. The eNB determines whether there is UE which is capable of performing a relay operation or is authorized to perform a relay operation, from among the UE devices to which the eNB provides services, before performing the triggering operation. When the eNB ascertains that there are one or more UE devices which are capable of performing a relay operation or are authorized to perform a relay operation, it is capable of triggering potential remote UE to start a relay discovery procedure. This process is performed to prevent potential remote UE from performing unnecessary operations, e.g., starting a relay discovery, although there is no relay-enable UE. The UE is capable of determining whether the relay discovery is performed using a threshold received from the ProSe function, instead of a threshold received from the eNB.

The eNB is capable of triggering potential remote UE to perform a relay discovery, by the following two methods: using a dedicated RRC message and broadcasting an SIB. The method using a dedicated RRC message is performed in such a way that: the eNB provides potential remote UE with a threshold for the cell signal strength; the potential remote UE measures the cell signal strength; and the eNB allows the UE to perform a relay discovery procedure when the measured level of cell signal strength is less than or equal to the threshold. The cell signal strength may be the signal strength of SIB signaling broadcast by the eNB 120 or the strength of sidelink signals for D2D communication. Alternatively, the eNB includes indication (ID) commanding to perform a relay discovery in a dedicated RRC message, and transmits the message to potential remote UE. The potential remote UE receives the message and performs a relay discovery.

The method using an SIB is performed in such a way that: the eNB provides potential remote UE with a threshold for the cell signal strength via SIB information; the potential remote UE measures the cell signal strength; and the eNB allows the UE to perform a relay discovery procedure when the measured level of cell signal strength is less than or equal to the threshold. The cell signal strength may be the signal strength of SIB signaling broadcast by the eNB or the strength of sidelink signals for D2D communication. The threshold may be preset in UE. Alternatively, the eNB or ProSe function may inform UE of the threshold.

Figure 4:
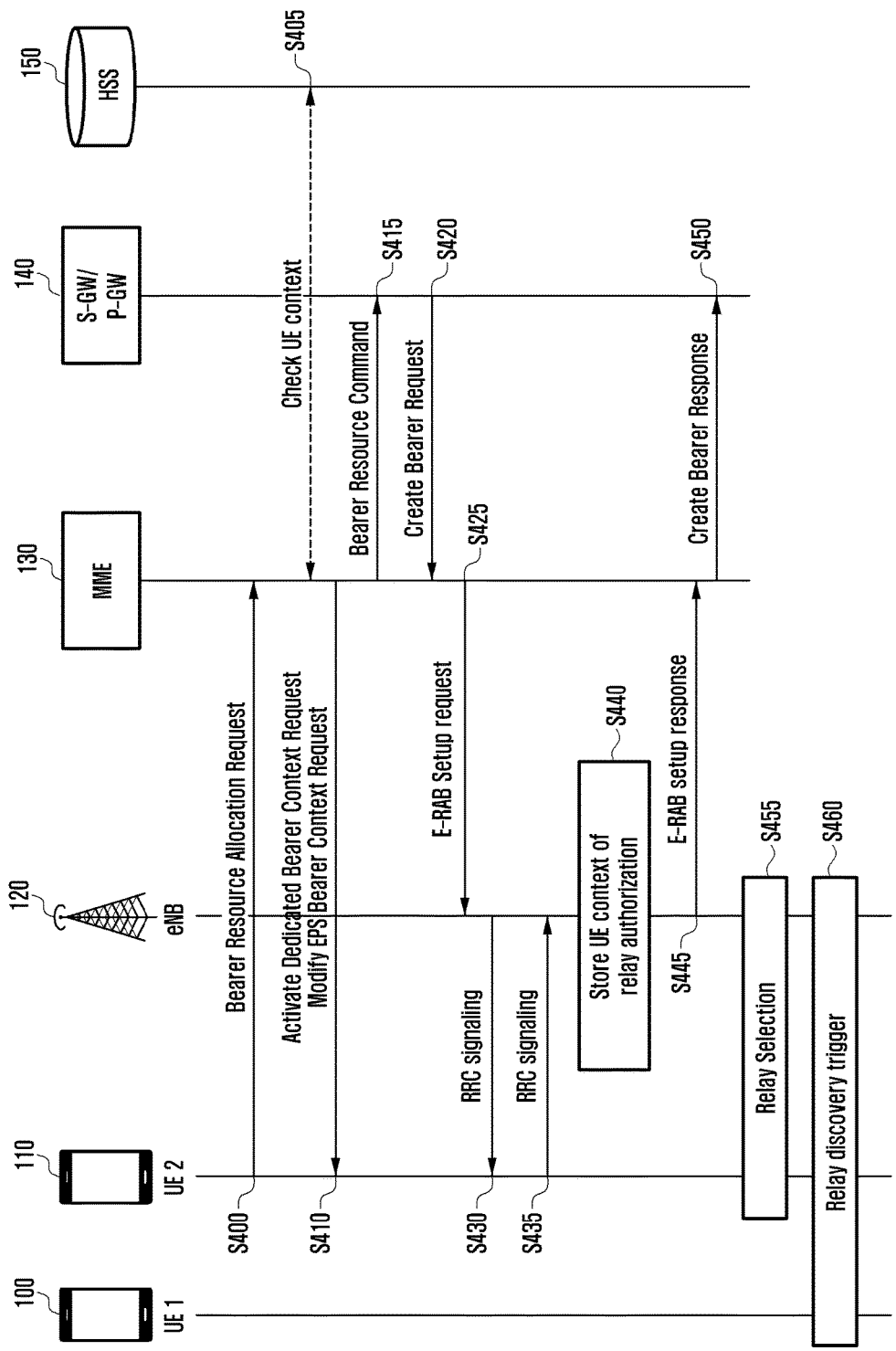
FIG. 4 is a flow diagram that describes a method for a ProSe UE to perform a bearer resource allocation procedure to serve as a relay according to an embodiment of the present disclosure.

FIG. 4 is a flow diagram that describes a method for a ProSe UE to perform a bearer resource allocation procedure to serve as a relay according to an embodiment of the present disclosure.

Referring to FIG. 4, ProSe UE performs a Bearer Resource Allocation procedure in order to serve as a relay, while informing a network that it is a relay. Through the procedure, a core network provides an eNB with information regarding the relay procedure of corresponding UE. The eNB selects relay UE based on the information, and triggers UE, expected to move out of the coverage area, to discover a relay.

In order to establish a bearer connection for a relay in a network, UE 2, which is indicated by reference number 110 and is using ProSe, transmits a message, Bearer Resource allocation request, to an MME 130 which is one of the network devices in operation S400. The UE 2 is capable of informing the MME 130 that it is UE which is performing a relay operation or is capable of performing a relay operation, using the Bearer Resource allocation request message, via the following methods. First, UE may include a QCI or ARP value corresponding to a ProSe UE-to-network relay service in the required traffic flow QoS field of the Bearer Resource allocation request message. Second, UE may specify that it is UE using ProSe UE-to-network relay in the additional parameter part of the Protocol Configuration Option field of the Bearer Resource allocation request message. Third, UE may specify that it is UE using ProSe UE-to-network relay in the Device Properties field of the Bearer Resource allocation request message.

When receiving the Bearer Resource allocation request message configured by using one or more of the three methods described above, the MME 130 is capable of recognizing that the UE transmitting the Bearer Resource allocation request is UE which performs ProSe UE-to-network relay, based on the field configured by the methods.

In order to check whether UE 2 transmitting the Bearer Resource allocation request message has subscription which may be relayed, the MME 130 negotiates with an HSS 150 to check subscription information regarding UE 2 and obtains UE context for a relay function in operation S405. The UE context may contain: information as to whether UE can serve as a relay, ARP used for establishing bearer connection for a relay, QCI, UE-AMBR, APN-AMBR of APN for a relay, etc. When the MME ascertains that UE 2 transmitting the Bearer Resource allocation request has a subscription required to perform a relay operation, it may omit the negotiation with the HSS.

After that, the MME 130 transmits messages, Activated Dedicated Bearer Context Request and Modify Evolved Packet System (EPS) Bearer Context Request, to UE 2 in operation S410, and a message, Bearer Resource Command, to an S-GW/P-GW 140 in operation S415. The S-GW/P-GW 140 transmits a Create Bearer Request message to the MME 130 in operation S420.

In order to provide UE transmitting the Bearer Resource allocation request message with a bearer connection, the MME 130 includes bearer context information in an E-RAB Setup request message and transmits the message to the eNB in operation S425. The MME 130 sets a ProSe UE-to-network relay value in the ProSe related field of the E-RAB Setup request, and thus informs the eNB 120 that corresponding UE is UE using ProSe UE-to-network relay in operation S425. Alternatively, the MME 130 includes a QCI or ARP value for a relay in the E-RAB level QoS parameter of the E-TRAB to be the setup list field, and thus allows the eNB to recognize that corresponding UE is capable of using a relay. When the eNB receives the E-RAB Setup Request via the methods described above, it is capable of recognizing that UE 2 is UE that uses a ProSe UE-to-network relay.

The eNB 120 establishes a wireless bearer connection with UE via an RRC message in operations S430 and S435. The eNB may select UE 2 so that the UE 2 can perform a relay function. The eNB is capable of including an indication (indicator) for authorizing UE 2 to serve as a relay or an indication commanding UE 2 to perform a relay operation in the RRC Connection Reconfiguration message. The UE 2 identifies the indication in the RRC Connection Reconfiguration message transmitted from the eNB and determines whether it performs a relay operation.

The eNB 120 obtains information regarding UE performing a ProSe relay, as results according to the individual operations, and stores context of corresponding UE in operation S440. The obtained information may contain Authorization indicating that UE is allowed to perform a ProSe UE-to-network relay operation and/or Indication indicating that UE has capability to perform a ProSe UE-to-network relay operation.

When a bearer connection has been established between UE 2 and eNB 120, the eNB 120 transmits an E-RAB Setup response to the MME 130, informing that the bearer has been established in operation S445. The MME 130 transmits a Create Bearer Repose message to the S-GW/P-GW 140 according to the details in operation S450.

The eNB 120 is capable of selecting relay UE to provide a ProSe UE-to-network relay service in operation S455. The eNB 120 may set specific UE as relay UE, based on the authorization or the indication, transmitted from the MME 130, for allowing or commanding the specific UE to perform a relay operation, in operation S455. In this case, the specific UE may be UE 2. The eNB may select relay UE, by signaling dedicated RRC or broadcasting SIB.

In order to select relay UE using Dedicated RRC Signaling, the eNB 120 may distinguish an RRC message for specific UE from others, by C-RNTI, and perform transmission of the message. The eNB may include, in the RRC message, Authorization indicating that corresponding UE is capable of performing a relay operation or Indication for triggering corresponding UE to perform a relay operation. Alternatively, when the eNB transmits information related to a resource pool used for a relay to UE via an RRC message, the UE receives the RRC message and ascertains that information related to a resource pool used for a relay is included in the received RRC message. In this case, the UE ascertains that it has been instructed to perform a relay function or authorized to perform a relay function.

In order to select relay UE using SIB broadcast, the eNB 120 includes C-RNTI of UE serving as a relay in an SIB message, and broadcasts the message. Alternatively, when the eNB 120 includes information related to a resource pool for a relay in an SIB message, UE capable of performing a relay function: determines whether it performs a relay operation, referring to the resource pool information; or starts performing a relay function according to an operation procedure when the relay resource pool information is specified in the message.

The eNB 120 receives a measurement report from UE located within its cell. When the eNB 120 ascertains that the received signal strength indicator of UE is less than or equal to a preset threshold, based on the received measurement report, it may determine that the UE will soon move out of the network coverage area, which is, for the sake of convenient description, called potential remote UE. In this case, potential remote UE may be UE 1.

The eNB 120 is capable of triggering the UE transmitting the measurement report to perform a relay discovery operation so that the UE can use a ProSe UE-to-network relay service in operation S460. The eNB determines whether there is UE which is capable of performing a relay operation or is authorized to perform a relay operation, from among the UE devices to which the eNB provides services, before performing the triggering operation. When the eNB ascertains that there are one or more UE devices which are capable of performing a relay operation or are authorized to perform a relay operation, it is capable of triggering potential remote UE to start a relay discovery procedure. This process is performed to prevent potential remote UE from performing unnecessary operations, e.g., starting a relay discovery, although there is no relay-enable UE. The UE is capable of determining whether the relay discovery is performed using a threshold received from the ProSe function, instead of a threshold received from the eNB.

The eNB is capable of triggering potential remote UE to perform a relay discovery, by the following two methods: using a dedicated RRC message and broadcasting an SIB. The method using a dedicated RRC message is performed in such a way that: the eNB provides potential remote UE with a threshold for the cell signal strength; the potential remote UE measures the cell signal strength; and the eNB allows the UE to perform a relay discovery procedure when the measured level of cell signal strength is less than or equal to the threshold. The cell signal strength may be the signal strength of SIB signaling broadcast by the eNB 120 or the strength of sidelink signals for D2D communication. Alternatively, the eNB includes indication (ID) commanding to perform a relay discovery in a dedicated RRC message, and transmits the message to potential remote UE. The potential remote UE receives the message and performs a relay discovery.

The method using an SIB is performed in such a way that: the eNB provides potential remote UE with a threshold for the cell signal strength via SIB information; the potential remote UE measures the cell signal strength; and the eNB allows the UE to perform a relay discovery procedure when the measured level of cell signal strength is less than or equal to the threshold. The cell signal strength may be the signal strength of SIB signaling broadcast by the eNB or the strength of sidelink signals for D2D communication.

Figure 5:
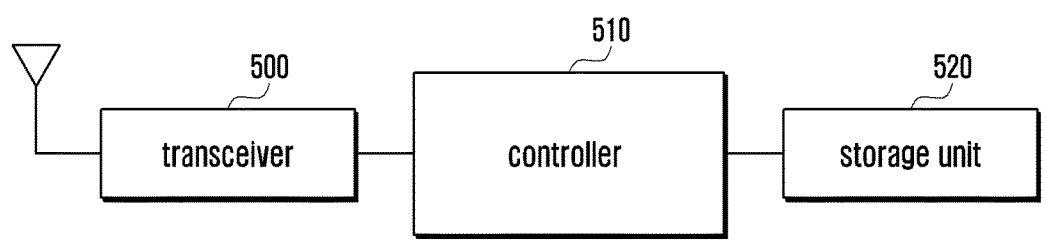
FIG. 5 is a block diagram showing an apparatus configured to perform functions according to an embodiment of the present disclosure.

FIG. 5 is a block diagram showing an apparatus configured to perform functions according to an embodiment of the present disclosure.

Referring to FIG. 5, an apparatus is illustrated. The apparatus may be a relay UE, a remote UE, eNB 120, MME 130, S-GW or P-GW 140, or HSS 150 and may include a transceiver 500, a controller 510 and a storage unit 520. The transceiver 500 transmits/receives signals to/from external devices. The storage unit 520 stores information or data for the components therein. The controller 510 controls: the transceiver 500 to perform transmission/reception of signals; and the storage unit 520 to store/output the information or data therein/therefrom.

Embodiment 2

The embodiment is related to a method of providing parameters related to relay service codes required for the process of providing a relay service via ProSe UE-to-network relay. The embodiment is also related to a method of allocating layer 2 (L2) group ID used to transmit multimedia broadcast multicast service (MBMS) traffic via ProSe UE-to-network relay.

Figure 6:
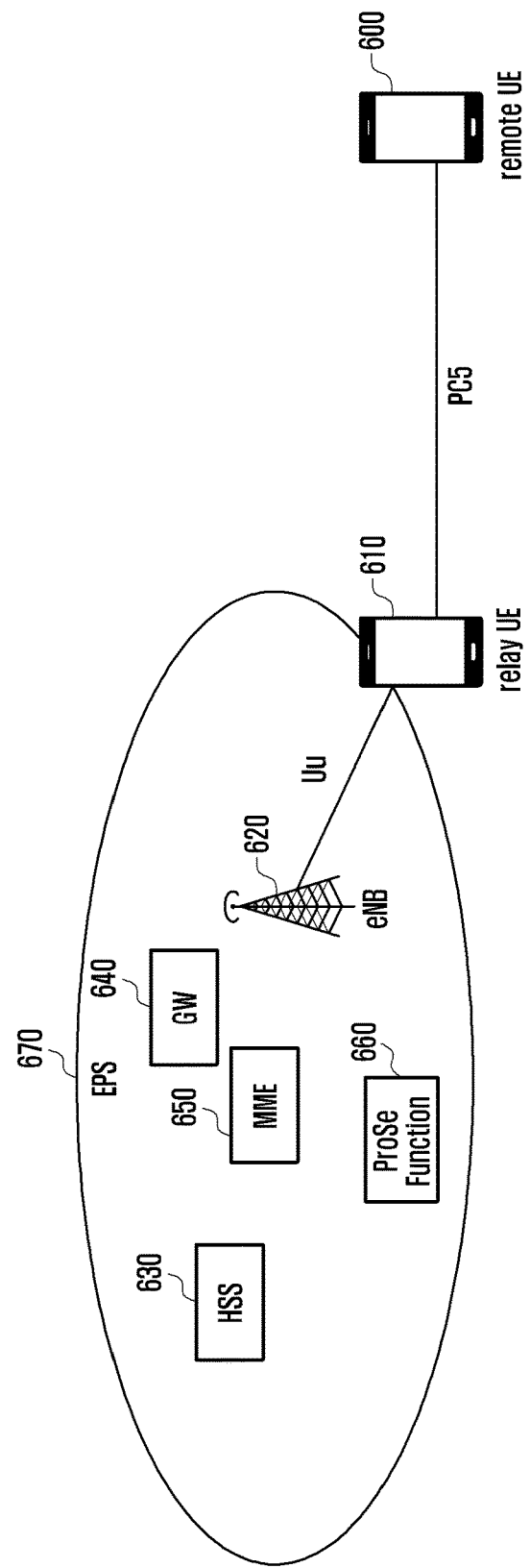
FIG. 6 is a diagram showing a ProSe network configuration for receiving services using a ProSe UE-to-network relay according to an embodiment of the present disclosure.

FIG. 6 is a diagram showing a ProSe network configuration for receiving services using a ProSe UE-to-network relay according to an embodiment of the present disclosure.

Referring to FIG. 6, UE-to-network relay UE 610 is located within the coverage area 670 of an eNB 620 and serves as a relay for forwarding services provided by a cellular network to remote UE 600 that is outside of the network coverage using the PC5 connection. The network includes ProSe function 660 for performing a provisioning procedure and a service authentication for ProSe, an MME 650 for performing operations related to a call process, a HSS 630 for storing subscriber information, and various gateways 640 (e.g., S-GW, P-GW) etc. In this case, the network may be EPS.

The UE-to-network relay UE (called relay UE) performs preparations for providing relay services, such as registering that UE is a relay via an EPS network, receiving information related to the provision of relay services, creating PDN connection to provide remote UE with IP services, etc. After preparing for relay services, the relay UE broadcasts an announcement message to announce that it is a relay, according to a discovery method, or receives a discovery solicitation message from remote UE nearby the relay UE. The discovery solicitation message is transmitted by UE to discover a relay. When the relay UE ascertains that the discovery solicitation message satisfies a corresponding condition, it transmits a discovery response message to the remote UE, so that the remote UE discovers the relay UE.

The remote UE selects corresponding relay UE from among the discovered relay UE devices, and sets up a connection with the corresponding relay UE. The remote UE receives services from the network through the setup connection.

The embodiment relates to a method of providing relay service code-related information announcing services which are provided by UE-to-network relay and required for the discovery procedure performed between the remote UE and the relay UE. The embodiment relates to a method and an apparatus for obtaining information related to L2 group to transmit MBMS traffic from relay UE to remote UE according to the request of the remote UE. The relay service code refers to a code that announces services provided by from UE-to-network relay and identifies whether remote UE is an authorized user authorized to receive services from the UE-to-network relay. The L2 group ID refers to a code for identifying a communication group used when MBMS traffic is transmitted to remote UE.

Figure 7:
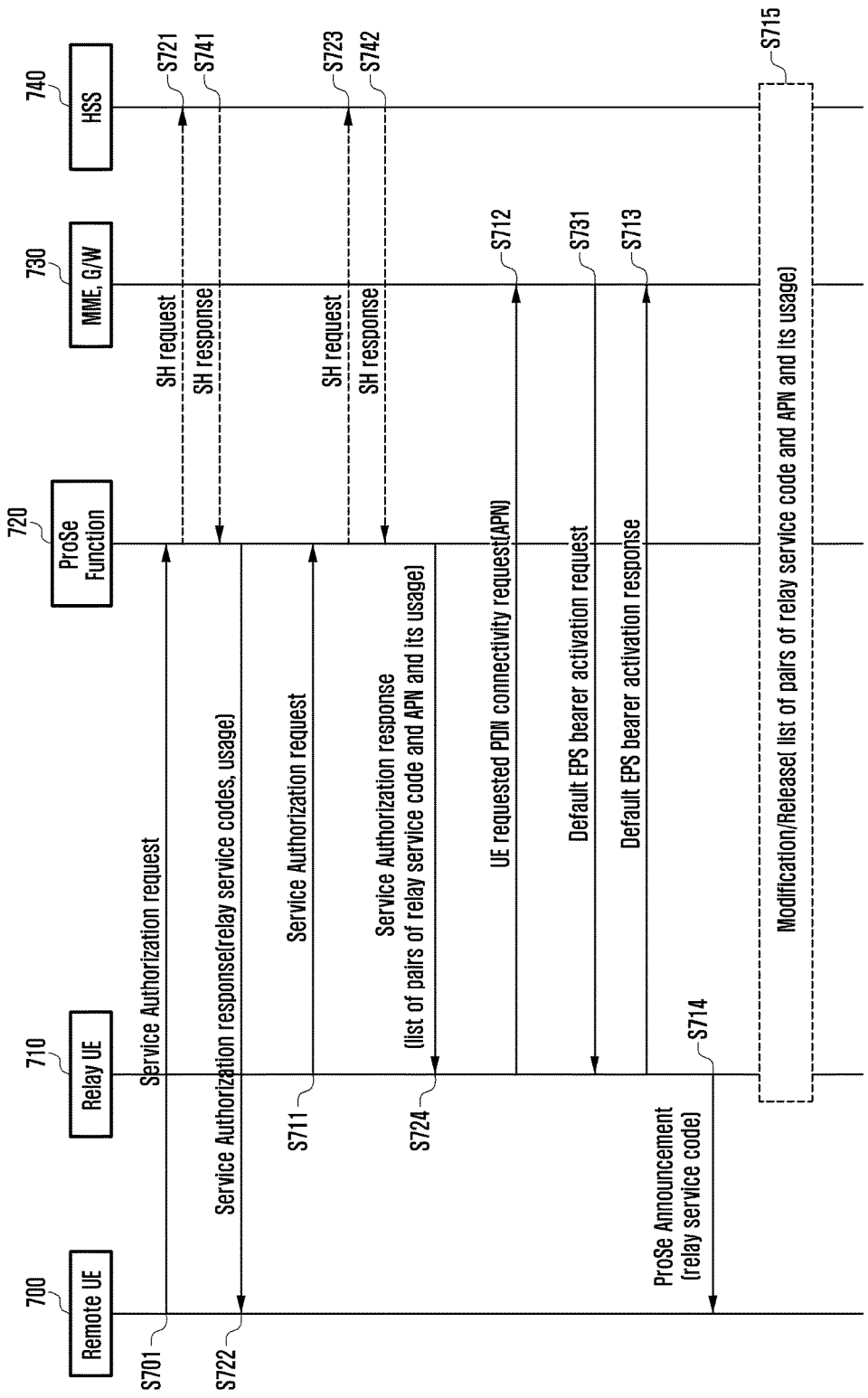
FIG. 7 is a flow diagram that describes a procedure for receiving a relay service code value according to an embodiment of the present disclosure.

FIG. 7 is a flow diagram that describes a procedure for receiving a relay service code value according to an embodiment of the present disclosure.

Referring to FIG. 7, when ProSe UE is located within the coverage of a cellular network, it performs a procedure for receiving ProSe services through a service authorization. When UE is located outside the coverage of a cellular network and cannot thus be attached to an EPS network, such as ProSe function, it may use ProSe service using a value set in its universal subscriber identity module (USIM).

A remote UE 700, which is one of general ProSe UE devices, transmits a Service Authorization request message for a service authorization to a ProSe function 720 in operation S701. The ProSe function receives, as required, information regarding ProSe service for the remote UE from an HSS 740 in operations S721 and S741. When the ProSe function 720 receives services from remote UE via a relay, according to its storing value or information received from the HSS 740 via the message in operation S742, it forwards, via a Service Authorization response message, information related to usage regarding services (e.g., fire office network service, police station network service, etc.) which can be received through a relay service code value to receive services and a corresponding relay service code in operation S722.

When a relay UE 710, which is capable of providing a relay service or is providing a relay service, transmits a Service Authorization request message in operation S711, it may also include relay indication (relay indicator) indicating that it is capable of providing a relay service or is providing a relay service in the Service Authorization request message.

The ProSe function 720 is capable of determining whether corresponding UE is UE authorized to provide a relay service, based on its storing information (which may be UE context) or by inquiring of the HSS 740 whether corresponding UE is UE authorized to provide a relay service, in operations S723 and S742. The HSS 740 is capable of providing subscription information to the ProSe function 720 in operations S723 or S742. After that, the ProSe function 720 forwards, to relay UE 710, via a Service Authorization response message in operation S724, a list of: information regarding a date by which a corresponding relay service code can be used (valid) if it is necessary, i.e., information related to lifetime (or validity time); APN that relay UE 710 needs to use to request a PDN connection to receive a corresponding service; information related to usage regarding services (e.g., fire office network service, police station network service, etc.) which can be received through a relay service code value and a corresponding relay service code that the relay UE 710 can provide, when providing a relay service, according to a value stored in the ProSe function 720 or information received from the HSS 740 via the message as in operation S742.

When relay UE 710 receives the relay service code value, usage-related information, and a corresponding APN value, it transmits, to an MME 730, a UE requested PDN connectivity request message including the received APN information in operation S712. The relay UE 710 performs a procedure of selecting a suitable P-GW and setting up a PDN connection, via the default EPS bearer activation (EPS bearer activation), as in operations S731 and S713.

When the PDN connection has been set up and the EPS bearer has been activated, the relay UE 710 can perform a relay function. In this case, the relay UE 710 is capable of performing a discovery procedure via a broadcast message including information such as a relay service code, etc. as in operation S714.

After that, when the relay UE 710 does not use or needs to alter part of its relay service codes, it transmits a Service Authorization request message to the ProSe function 720 as in operation S711. In this case, the Service Authorization request message may contain values of relay service codes that the relay UE needs to release, or an indication for requesting the extension of a lifetime along with the relay service codes. Therefore, the ProSe function 720 transmits, to the relay UE 710, via the Service Authorization response message, the values which are altered based on its storing information or information received, by request, from the HSS 740 as in operations S723 and S742, and provides the relay UE 710 with relay services, based on the altered values, in operation S715.

Alternatively, when the ProSe function 720 needs to alter information regarding a corresponding relay service code value, it may transmit a push message (e.g., short message service (SMS)) to the relay UE 710 or remote UE 700, so that the relay UE 710 or remote UE 700 can attach to the ProSe function 720 (e.g., the relay UE 710 or remote UE 700 can perform a Service Authorization request process), thereby transmitting the altered value to UE devices via the same method.

Figure 8:
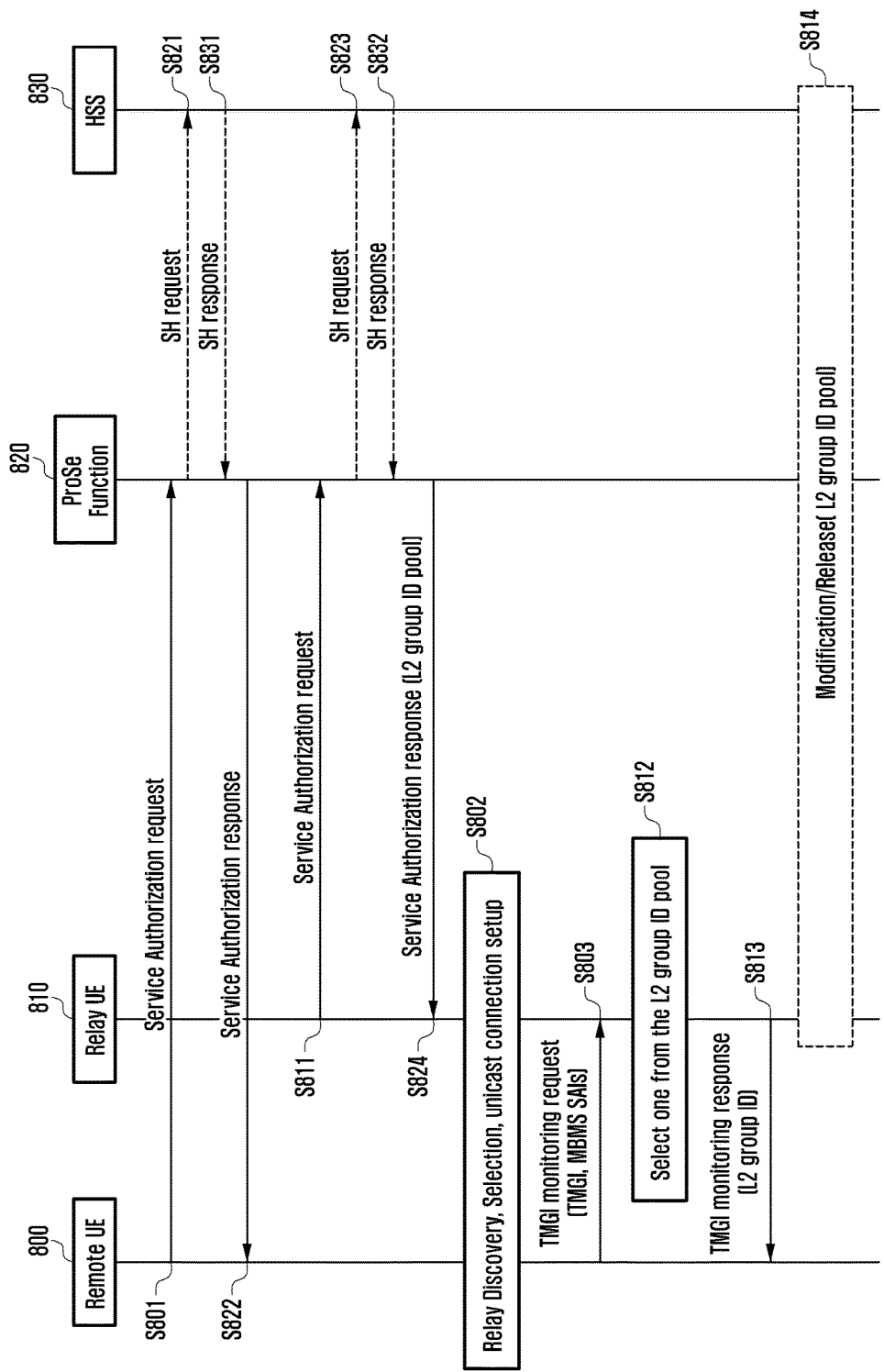
FIG. 8 is a flow diagram that describes an example of a method for a relay UE to receive a layer 2 (L2) group identifier (ID) according to an embodiment of the present disclosure.

FIG. 8 is a flow diagram that describes an example of a method for a relay UE to receive an L2 group ID according to an embodiment of the present disclosure.

Referring to FIG. 8, the embodiment shown is a method of allocating an L2 group ID to be used when a remote UE 800 attaches to a relay UE 810 and requests the monitoring of temporary mobile group identity (TMGI) and the transmission of MBMS traffic. In the embodiment, the relay UE 810 receives a service authorization from a ProSe function 820 and also receives the corresponding value.

Referring to FIG. 8, the remote UE 800 transmits a Service Authorization request message for a service authorization to a ProSe function 820 in operation S801. In response, the ProSe function 820 transmits a SH request to the HSS in operation S821 and receives an SH response in operation S831. The ProSe function 820 transmits a service authorization response to the remote UE 800 in operation S822. When the relay UE 810 performs transmission of a Service Authorization request message in operation S811, it may also include relay indication (relay indicator) indicating that it is capable of providing a relay service or is providing a relay service in the Service Authorization request message. The ProSe function 820 is capable of determining whether corresponding UE is UE authorized to provide a relay service, based on its storing information or by inquiring of the HSS 830 whether corresponding UE is UE authorized to provide a relay service, in operations S823 and S832. The ProSe function 820 includes, in a Service Authorization response message, a pool of L2 group ID that the relay UE 810 can use to relay MBMS traffic, i.e., a range or list of L2 group ID, according to a value stored in the ProSe function 820 or a value received from the HSS 830 via the message in operation S832, and provides the message to the relay UE 810 in operation S824. In this case, the ProSe function 820 may also include a lifetime of the use of the pool of L2 group ID in the Service Authorization response message.

When a connection has been set up between the remote UE 800 and the relay UE 810 and a relay service is provided in operation S802, the remote UE 800 transmits a TMGI monitoring request message to the relay UE 810 in operation S803. The relay UE 810 may authorize a relay service for TMGI corresponding to the request. The relay UE 810 selects an L2 group ID value from the L2 group ID pool obtained in operation S824, and determines the selected value as a group value for transmitting MBMS traffic for a corresponding TMGI value in operation S812. The relay UE 810 includes the L2 group ID value corresponding to the TMGI in the TMGI monitoring response message, and transmits the message to the remote UE 800 in operation S813.

After that, when the relay UE 810 does not use or needs to alter part of the L2 group ID allocated to the relay UE 810, it transmits a Service Authorization request message to the ProSe function 820 in operation S811. In this case, the Service Authorization request message may contain the L2 group ID value that the relay UE 810 needs to release or an indication for requesting the extension of a lifetime of the particular L2 group ID along with the particular L2 group ID. Therefore, the ProSe function 820 transmits, to the relay UE 810, via the Service Authorization response message, the values which are altered based on its storing information or information obtained, by request, from the HSS 830 in operations S823 and S832, and provides the relay UE 810 with relay services, based on the altered values, in operation S824.

Alternatively, when the ProSe function 820 needs to alter information regarding corresponding L2 group ID pool, it may transmit a push message (e.g., SMS) to the relay UE 810, so that the relay UE 810 can attach to the ProSe function 820 (e.g., the relay UE 810 can perform a Service Authorization request process), thereby transmitting the altered value to UE devices via the same method in operation S814.

Figure 9:
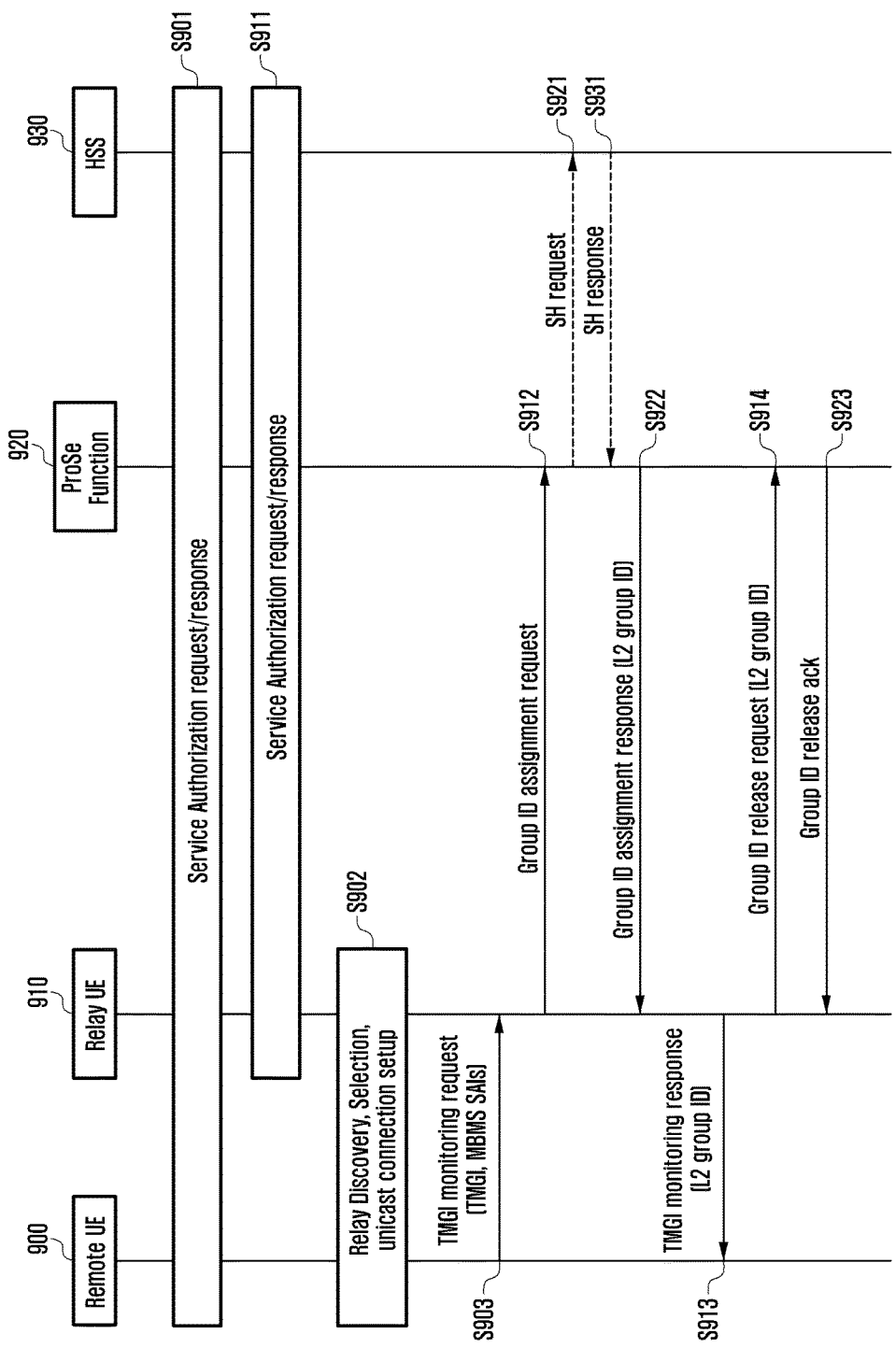
FIG. 9 is a flow diagram that describes another example of a method for a relay UE to receive an L2 group ID according to an embodiment of the present disclosure.

FIG. 9 is a flow diagram that describes another example of a method for a relay UE to receive an L2 group ID according to an embodiment of the present disclosure.

Referring to FIG. 9, the embodiment shown is a method of allocating an L2 group ID to be used when a remote UE 900 attaches to a relay UE 910 and requests the monitoring of TMGI and the transmission of MBMS traffic in operation S901. In the embodiment, when the relay UE 910 receives the TMGI monitoring request from the remote UE 900, it receives the corresponding value from a ProSe function 920 in operation S911.

The relay UE 910 has established a connection with the remote UE 900 and provides a relay service in operation S902. The remote UE 900 transmits a TMGI monitoring request message to the relay UE 910 in operation S903. The relay UE 910 may authorize a relay service for TMGI corresponding to the request. The relay UE 910 requests an L2 group ID value for transmitting MBMB traffic for corresponding TMGI, from the ProSe function 920, via a group ID assignment request message in operation S912. During the process, the ProSe function 920 may perform a procedure to determine whether corresponding UE is UE capable of providing services, based on information obtained by inquiring from an HSS 930 in operations S921 and S931.

The relay UE 910 requests a group ID assignment from the ProSe function 920 by transmitting the group ID assignment request message and is assigned an L2 group ID, from the ProSe function 920, via the group ID assignment response message in operation S922. The relay UE 910 transmits, to the remote UE 900, a TMGI monitoring response message containing an L2 group ID value corresponding to TMGI, included in the received, group ID assignment response message in operation S913.

When the relay UE 910 no longer uses the L2 group ID, it transmits a group ID release request message to the ProSe function 920 in operation S914 to interrupt the use of the L2 group ID. In this case, the ProSe function 920 may transmit a group ID release acknowledgement (ACK) message to the relay UE 910, in response to the group ID release request in operation S923.

Figure 10:
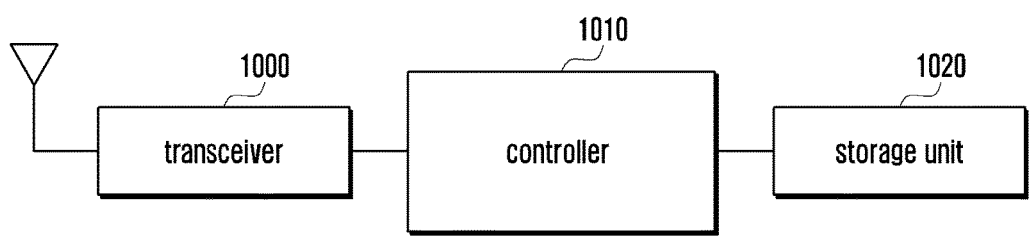
FIG. 10 is a block diagram showing an apparatus configured to perform functions according to an embodiment of the present disclosure.

FIG. 10 is a block diagram showing an apparatus configured to perform functions according to an embodiment of the present disclosure.

Referring to FIG. 10, the apparatus may be a relay UE, a remote UE, a ProSe function, a HSS, and so forth. The apparatus includes a transceiver 1000, a controller 1010 and a storage unit 1020. The transceiver 1000 transmits/receives signals to/from external devices. The storage unit 1020 stores information or data for the components therein. The controller 1010 controls: the transceiver 1000 to perform transmission/reception of signals; and the storage unit 1020 to store/output the information or data therein/therefrom.

Embodiment 3

Public safety network based on LTE is actively researched by 3GPP. Mission critical push to talk (MCPTT) services over LTE define a group communication at application ends like the features of existing walkie-talkie services. In order to make a group communication even in an emergency state where eNB does not properly perform functions, 3GPP requires D2D direct communication as requirements. In order to normally perform a group communication, a session for communication (called a call setup) needs to have been created. In the process of creating a session via a message announcement, UE devices in a group share media-related data, e.g., media type, codec, port numbers, etc., to transmit media, such as a voice, an image, a video, etc., with each other. In a state where a call setup has been completed, when a user wants to make a speech, the user needs to press a push button and obtain a floor. After obtaining a floor, the user may transmit media to the group members, in terms of only a voice and a type of media which has been announced.

In existing MCPTT service providing methods, MCPTT services have been provided using an MCPTT server and MCPTT client (also called UE) connected to the MCPTT server in an environment where they are connected to an eNB and a network (on-network). In an on-network environment, SIP is generally used for a call setup. When UE needs to create a session, the UE transmits INVITE message to an SIP server and the SIP server transmits an INVITE message to a UE device (UE devices) related to a corresponding session. When a UE device (UE devices) needs to participate in a session, the UE (UE devices) responds with a 200 OK message. A communication encryption key for security and information regarding a media type, a codec, and a port are contained in the INVITE message. MCPTT clients in UE perform MCPTT functions.

In an on-network environment, floor control is processed by the binary floor control protocol (BFCP) and the media burst control protocol (MBCP), which refer to a method of processing a floor request in an always-on server. When UE has received a Grant message in respond to a Request message transmitted from a server, it may be considered to have a floor. In an on-network environment, a centralized method is performed in such a way that: all UE devices transmit all requests to a server and the server processes the received requests.

In contrast, in order to use MCPTT services in an emergency state where an eNB and a network do not perform functions (off-network), devices (UE devices) need to transmit/receive voices to/from each other via direct communication therebetween. Since a central control server does not exist, individual UE devices need to operate in a distribution way. In order to transmit/receive voices between group members, UE devices need to establish a group call (Group Call Setup) and share setup information related to the transmission of media to be used during a call, i.e., media parameters and the values thereof, with the group members. The media parameters include a media type, a coder-decoder (codec), a bandwidth, a multicast port for transmitting media, a protocol and a port for transmitting a Floor Control message, a group key for Media Encryption, etc. Devices may share media parameter and the corresponding values with each other by the following two methods.

A first method is performed in such a way that: every UE device, which needs to receive services, previously sets up items related to transmission of media and values for the items, which will be used in the group call; and a UE device announces that it starts a group call, and transmits media to the group member UE devices, using a media type, a transmission port and a codec which have previously been set up. The first method is advantageous because it does not necessarily need a response and thus can complete the setup rapidly. However, since the first method requires UE devices, which need to participate in a group call, to have previously defined the group call media transmission setup information therebetween, it has a limitation to use group call resources which can be created, out of the settings determined by a service provider.

A second method is performed in such a way that: a UE device, which will open a group call, selects items related to transmission of media which will be used in the group call; and transmits a Group Call Announcement to other member UE devices to announce the selected items. The transmission of Group Call Announcement (also called a group call message) is performed so that UE devices, which will participate in group communication, can be ready for the reception of media such as voices.

Figure 11:
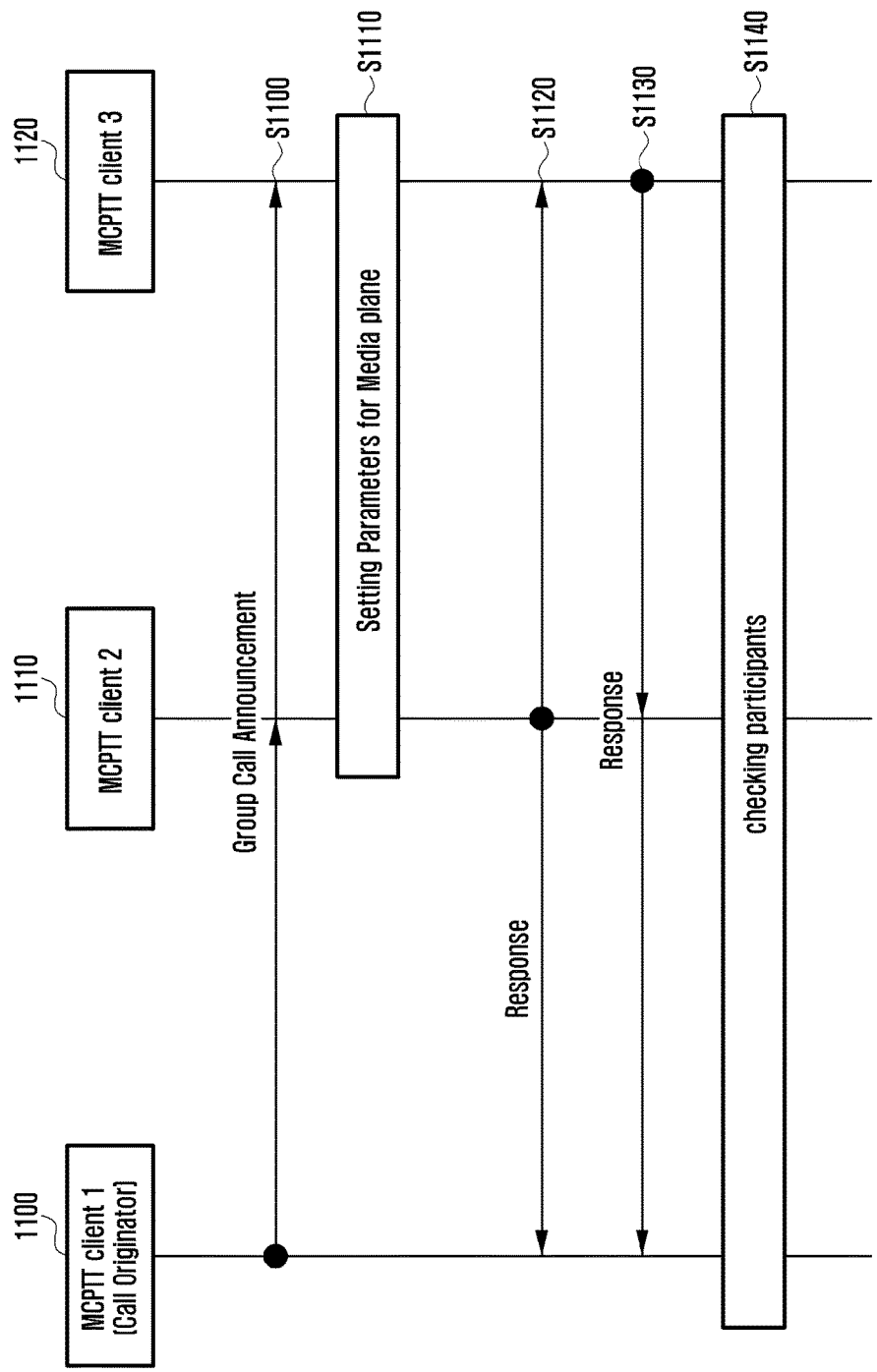
FIG. 11 is a flow diagram that describes a method for a UE to select a media transmission-related item to be used for a group call and announce the selected item to other member UE devices according to an embodiment of the present disclosure.

FIG. 11 is a flow diagram that describes a method for a UE to select a media transmission-related item to be used for a group call and announce the selected item to other member UE devices according to an embodiment of the present disclosure.

Referring to FIG. 11, MCPTT client 1 1100 which starts a group call: determines a number of parameter values for media used in a group call; includes the determined parameter values in a group call announcement message; and transmits the nearby MCPTT clients 1110 and 1120 in operation S1100. When receiving the announcement message, MCPTT clients 1110 and 1120 set up media parameters based on the received parameter values and prepare for the reception of media during a group call in operation S1110. MCPTT clients 1110 and 1120 create a response message and transmit the message to other MCPTT clients in the group, thereby informing that MCPTT clients 1110 and 1120 participate in the group call in operation S1120. Since the response message is a message indicating whether client participate in a group, it does not include information related to media parameters. Each MCPTT client may transmit the response message each time that it receives every group call announcement message; however, in order to efficiently use network resources, the MCPTT client may transmit a response message in response to the first announcement message for the same group ID in operation S1130. All the participants participating in a group call may identify each other in the group via the group call announcement messages and the response messages in operation S1140.

Therefore, the method allows MCPTT clients to prepare for the transmission/reception of media (e.g., voice) via the MCPTT off-network group call procedure.

MCPTT client may be out of a range of message transmission when the first group call announcement message is transmitted and then move into a range of group call. MCPTT client may be activated after transmitting an announcement message. In these cases, a method is required to join corresponding MCPTT client in a previously created group call.

The method according to the embodiment is capable of transmitting media parameters used in a group call to an MCPTT client which has joined a range of group call service later, so that the corresponding MCPTT client can perform a setup for the transmission/reception of media, using the received media parameter. Therefore, the method can join a new MCPTT client in a previously created group call.

The embodiment provides a method of joining a new MCPTT client in a group call which has been created in a PTT solution via direct communication. In particular, in order to immediately create a group call, the method transmits a Group Announcement message to a client so that the client can actively join a group call of a previously created, identical ID. The method receives a periodically transmitted Group Announcement message, so that the client can passively joint a group call. The method can also be implemented to include both cases.

Figure 12:
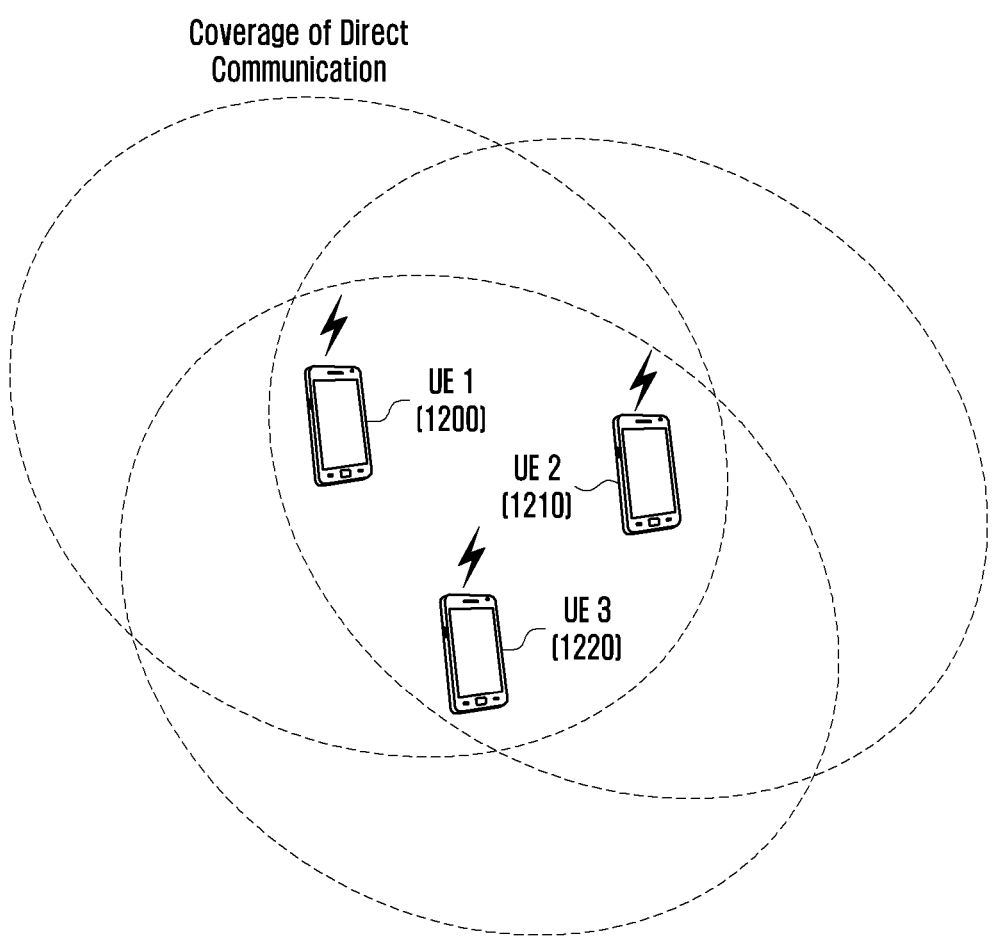
FIG. 12 is a diagram showing a mission critical push to talk (MCPTT) system based on direct communication between UE devices according to an embodiment of the present disclosure.

FIG. 12 is a diagram showing an MCPTT system based on direct communication between UE devices according to an embodiment of the present disclosure.

Referring to FIG. 12, a MCPTT system based on D2D direct communication does not include a server. MPCTT UE 1200, MPCTT UW 1210, and MPCTT UE 1220 are capable of performing communication with each other in individual coverage areas of direct communication.

Figure 13A:
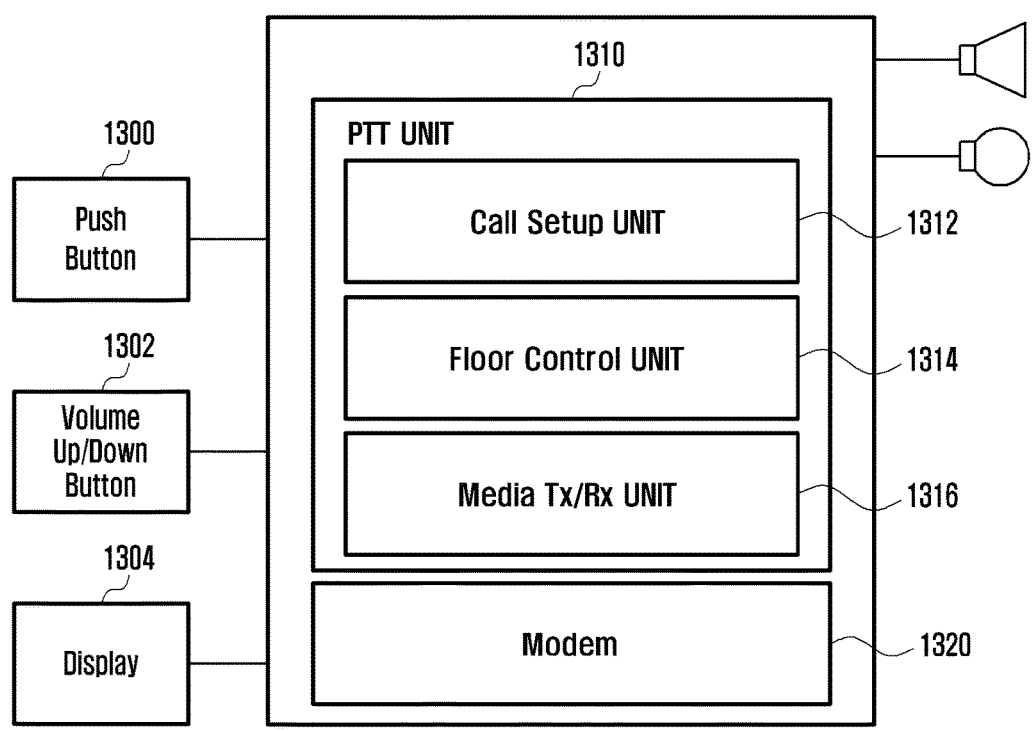
FIG. 13A is a block diagram of an MCPTT UE according to an embodiment of the present disclosure.

FIG. 13A is a block diagram of an MCPTT UE according to an embodiment of the present disclosure.

Referring to FIG. 13A, MCPTT UE includes various types of peripheral modules, e.g., a push button 1300 and a volume up/down button 1302 for MCPTT speech, a screen (display) 1304 for displaying group information, a speaker (not shown) for outputting a voce, a microphone (not shown) for receiving a voice, etc. The MCPTT UE enables the embedded MCPTT system to perform D2D MCPTT operations using the peripheral modules and a modem 1320 and provide services. The MCPTT UE includes a PTT unit 1310. The PTT unit 1310 includes a call setup unit 1312 for creating a group call, a floor control unit 1314 for controlling floor, and a media transmission (Tx)/reception (Rx) unit (e.g., a media transceiver) 1316 for performing Tx/Rx of voices. The PTT unit 1310 supports direct communication using the modem 1320. Although it is not shown, MCPTT UE may also include a ProSe unit for controlling network layers to support D2D communication.

Figure 13B:
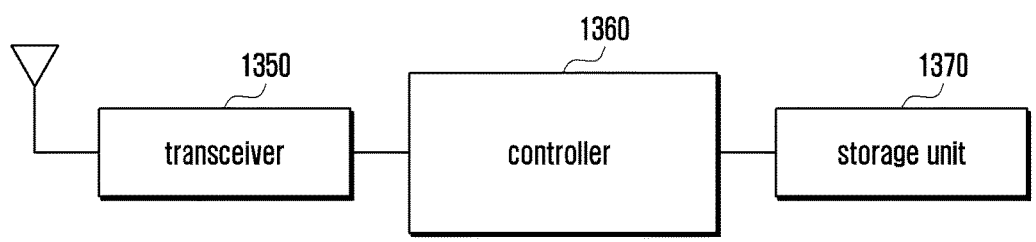
FIG. 13B is a block diagram of an MCPTT UE according to an embodiment of the present disclosure.

FIG. 13B is a block diagram of an MCPTT UE according to an embodiment of the present disclosure.

Referring to FIG. 13B, MCPTT UE includes a transceiver 1350, a controller 1360 and a storage unit 1370. The transceiver 1350 transmits/receives messages to/from external devices other UE. The storage unit 1370 stores information contained in the message, such as parameters, etc. The controller 1360 controls: the transceiver 1350 and the storage unit 1370 to perform operations according to the embodiment. The operations of the PTT unit 1310 shown in FIG. 13A can be performed by the controller 1360 shown in FIG. 13B.

The method according to the embodiment is capable of creating a group call announcement message and a response message, using the call setup unit 1312 of the MCPTT UE and performing transmission/reception of messages between MCPTT UE devices. Therefore, the method can join a new MCPTT client in a previously created group call. In this case, group calls are distinguished from each other according to group IDs. Since the media parameters used according to group calls are determined by an MCPTT client that initiates the first group call, they may differ from each other according to group calls. However, the same media parameter may be used according to group calls.

The method of joining a new MCPTT client in a group call which has been created may be classified into an active joining method and a passive joining method. The active joining method enables a new MCPTT client to actively transmit a group call announcement message and thus join a previously created group call. The passive joining method enables a client to receive a periodically transmitted group call announcement message, and thus join a group call.

Figure 14:
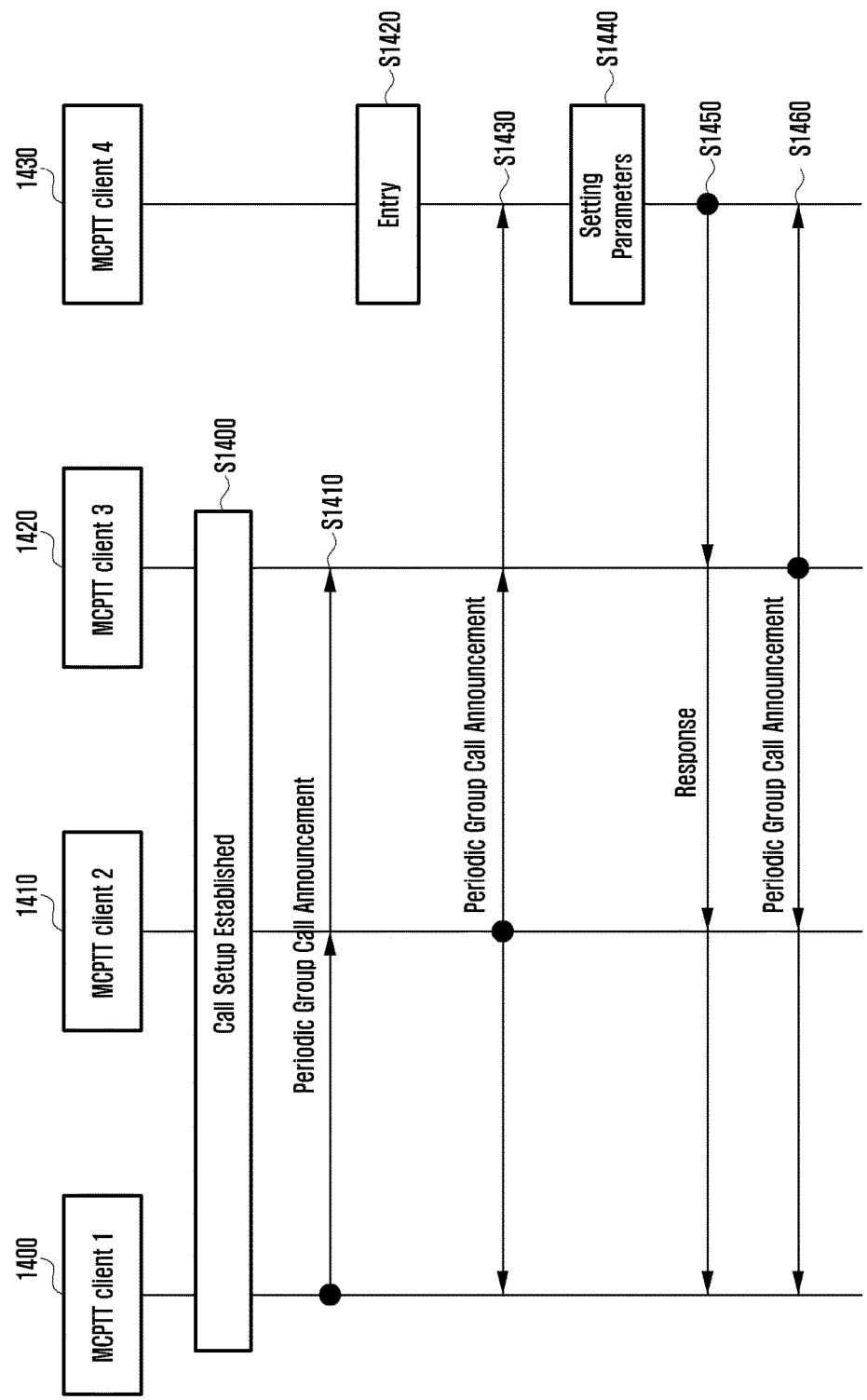
FIG. 14 is a flow diagram that describes a method for a new MCPTT client to receive a periodically transmitted group call announcement message and to participate in a group call according to an embodiment of the present disclosure.

FIG. 14 is a flow diagram that describes a method for a new MCPTT client to receive a periodically transmitted group call announcement message and to participate in a group call according to an embodiment of the present disclosure.

Referring to FIG. 14, MCPTT client 1 1400, MCPTT client 2 1410, and MCPTT client 3 1430, have created a group call therebetween via the methods described above in operation S1400. MCPTT clients joining a group call periodically announce their currently using media parameter information, so that a new MCPTT client that appears after a call has been created can set up its media parameters and join the group call in operation S1410. The new MCPTT client 4 1430, waits for a period of time in operation S1420, and receives a group call announcement message that a previously created group call member client (e.g., MCPTT client 2 shown in FIG. 14) transmits to other clients in operation S1430. The new MCPTT client 4 1430 sets up its media parameters as the details of the media parameters used in the group call, which are contained in the received group call announcement message, and prepares for the transmission/reception of media in operation S1440. The new MCPTT client 4 1430 transmits a response message, announcing that it has joined the group call, to other clients in the group in operation S1450. The response message of the new MCPTT client 4 1430 does not include media parameters. The MCPTT clients 1, 2, and 3 are capable of recognizing that the new MCPTT client 4 1430 has joined the group call through the response message After that, the group call members periodically transmit a group call announcement message in operation S1460.

A cycle of transmitting a group call announcement message is determined as 300 seconds when using request for comment (RFC) 2974 session announcement protocol (SAP); and the largest one of the values obtained by dividing "the number of transmitting a group call announcement message×a size of announcement message" by a preset bandwidth (bit/sec). The bandwidth may be 4000 bits/sec as a default value if the SAP did not particularly describe it for services. For example, in a state where the transmission cycle of a group call announcement message is set to 300 seconds, when an MCPTT client has joined a group right after the announcement message is transmitted, it must wait for 299 seconds to join a group call. This may cause user experience (UX) of services to decrease and may not also meet MCPTT QoS requirements of 3GPP. In order to prevent this problem, the present disclosure provides a method of actively joining a previously created group call.

Figure 15:
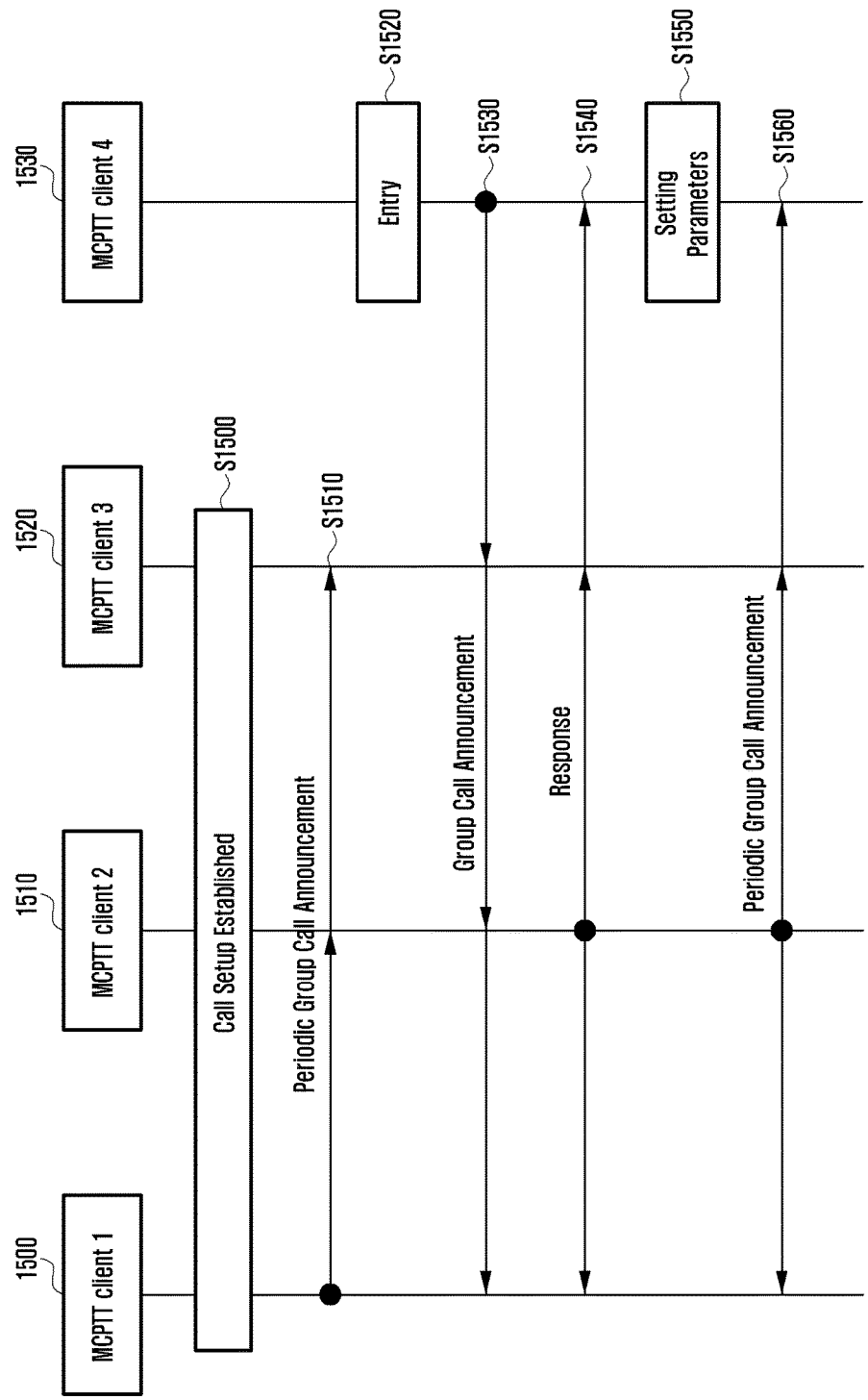
FIG. 15 is a flow diagram that describes a method for a new MCPTT client to actively transmit a group call announcement message and to participate in a group call that has already been created according to an embodiment of the present disclosure.

FIG. 15 is a flow diagram that describes a method for a new MCPTT client to actively transmit a group call announcement message and to participate in a group call that has already been created according to an embodiment of the present disclosure.

Referring to FIG. 15, MCPTT clients 1, 2, and 3, indicated by reference numbers 1500, 1510, and 1520 respectively, have created a group call therebetween in operation S1500. MCPTT clients 1, 2, and 3 transmit a periodic group call announcement message to each other in the previously created group in operation S1510. MCPTT client 4, indicated by reference number 1530, is activated in operation S1520. The MCPTT client 4: selects a group where it wants to create a group call, without waiting for a group call announcement message; determines media parameters; creates a group call announcement message including the media parameters; multicasts the message to other clients in operation S1530. MCPTT clients 1, 2, and 3: receive the announcement message; compare a group ID contained in the received message with a group ID of the previously created group call; recognize that the MCPTT client 4 has just joined the group call when a group ID contained in the received message is identical to a group ID of the previously created group call. MCPTT clients: include media parameters used in the previously created call in the response message, instead of setting a group call using media parameters contained in the announcement message transmitted from MCPTT client 4; and transmit the response message to the new MCPTT client 4 in operation S1540.

In this case, not all the MCPTT clients transmit the response message to the MCPTT client 4. When individual MCPTT clients receive an announcement message from the MCPTT client 4, they select one of the numbers [0, maximum], wait for transmission slots corresponding to the selected number, and transmit a response message to the MCPTT client 4. The maximum value may be determined previously or when a call group is created. When individual MCPTT clients receive a response message from one of them (e.g., MCPTT client 2) before transmitting their response messages, the other MCPTT clients (e.g., MCPTT clients 1 and 3 except for the MCPTT client 2 do not need to transmit their response messages.

When receiving a response message from the MCPTT client 2, the MCPTT client 4: ascertains that a group call that the MCPTT client 4 has a plan to create already exists, via a group ID and media parameters contained in the response message; alters its set media parameter values to the media parameter values contained in the response message in operation S1550; and receives media (e.g., voice) from a corresponding group call. After that, a group call announcement message may be periodically transmitted in operation S1560.

When two MCPTT clients newly appear in a previously created call coverage area, they may join a group call in such a way that: one client actively transmits a group call announcement message and the other client passively receives the group call announcement message. In this case, the passively joining MCPTT client may not join the group call because, although the announcement message and the response message have the same group ID, media parameters contained in the announcement message differ from those contained in the response message.

In order to resolve the problem, when new MCPTT clients receive a response message containing media parameters used in a previously created group call, they may set their media parameters by altering the preset media parameter values to media parameter values contained in the response message.

Figure 16:
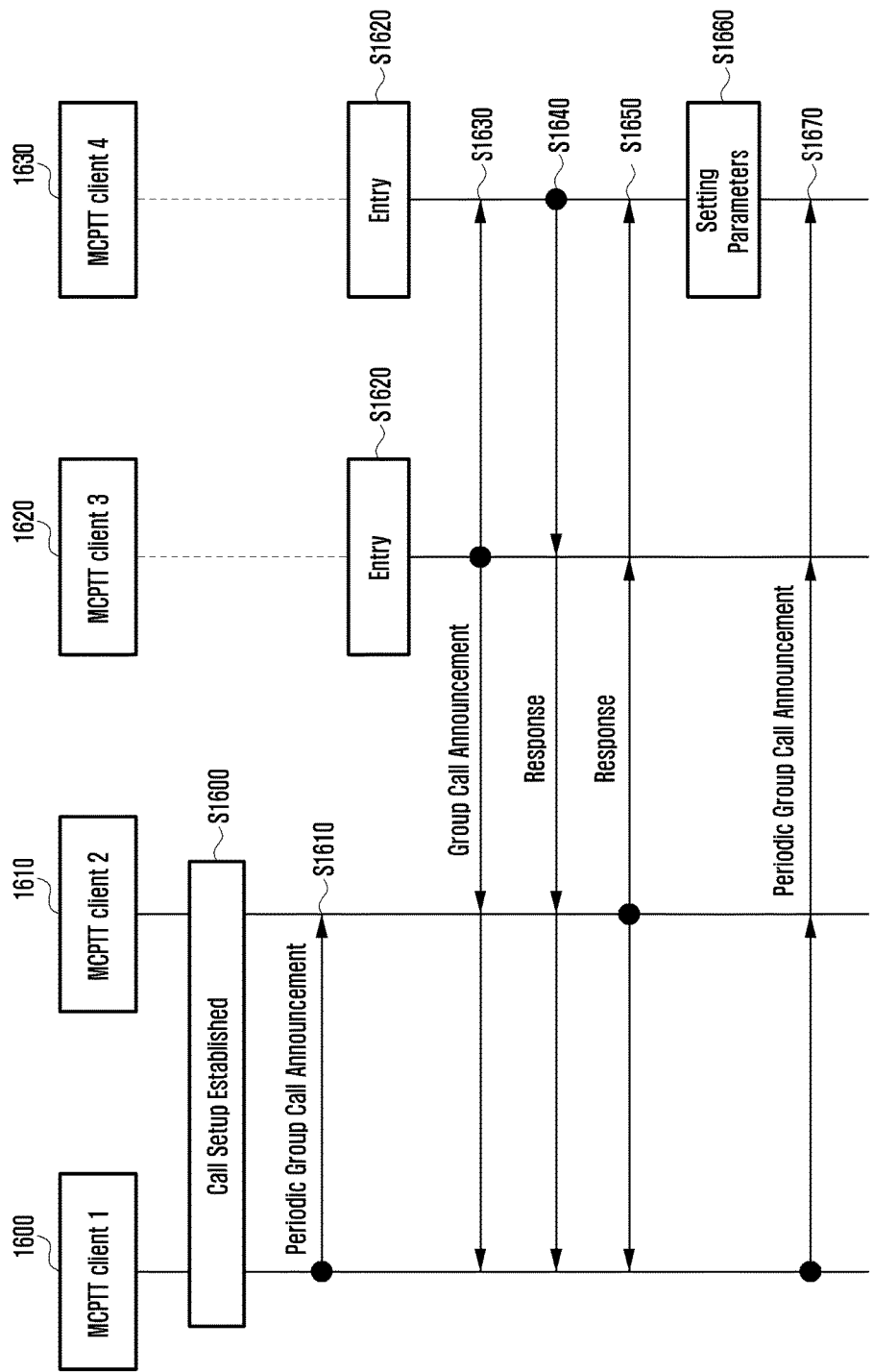
FIG. 16 is a flow diagram that describes a method of allowing both an active MCPTT client and a passive MCPTT client to participate in a group call according to an embodiment of the present disclosure.

FIG. 16 is a flow diagram that describes a method of allowing both an active MCPTT client and a passive MCPTT client to participate in a group call according to an embodiment of the present disclosure.

Referring to FIG. 16, MCPTT clients 1 and 2, indicated by reference numbers 1600 and 1610 respectively, have created a group call therebetween and communicate with each other in operation S1600. MCPTT clients 1 and 2 transmit/receive a periodic group call announcement message to/from each other in operation S1610. MCPTT clients 3 and 4, indicated by reference numbers 1620 and 1630 respectively, newly appear. In order to create a group call, MCPTT client 3 transmits, to MCPTT client 4, a group call announcement message containing a group ID of a group call that MCPTT clients 1 and 2 have already created in operation S1630. When receiving the group call announcement message from MCPTT client 3, MCPTT client 4 sets its parameters based on the media parameters contained in the received group call announcement message, and transmits a response message indicating that it will join the group call in operation S1640.

When the group call announcement message from the MCPTT client 3, the MCPTT clients 1 and 2 ascertain that a group call corresponding to a group ID contained in the announcement message has been created, and transmit response messages including media parameter information used in the previously created group call to the MCPTT client 3 in operation S1650. For example, MCPTT client 2 transmits the response message. MCPTT clients 3 and 4: receive the response message; recognize that a previously created group call has existed; alter their preset media parameters to media parameter values contained in the received response message; and prepare for the transmission/reception of media in operation S1660. After that, a periodic group call announcement message is transmitted in operation S1670.

As described above, before MCPTT client 4 transmits its response message, MCPTT client 1 or client 2 may transmit a response message (including media parameter information used in a previously created group call) in response to an announcement message of the MCPTT client 3. MCPTT client 4 receives the response message from MCPTT client 1 or client 2, and transmits its response message in response thereto. MCPTT clients joining a previously created group call receives a group call announcement message from MCPTT client 3 and a response message from MCPTT client 4, and recognizes that the MCPTT clients 3 and 4 have joined the group call.

The methods of setting up and joining a MCPTT group call are implemented using the SAP.

Figure 17:
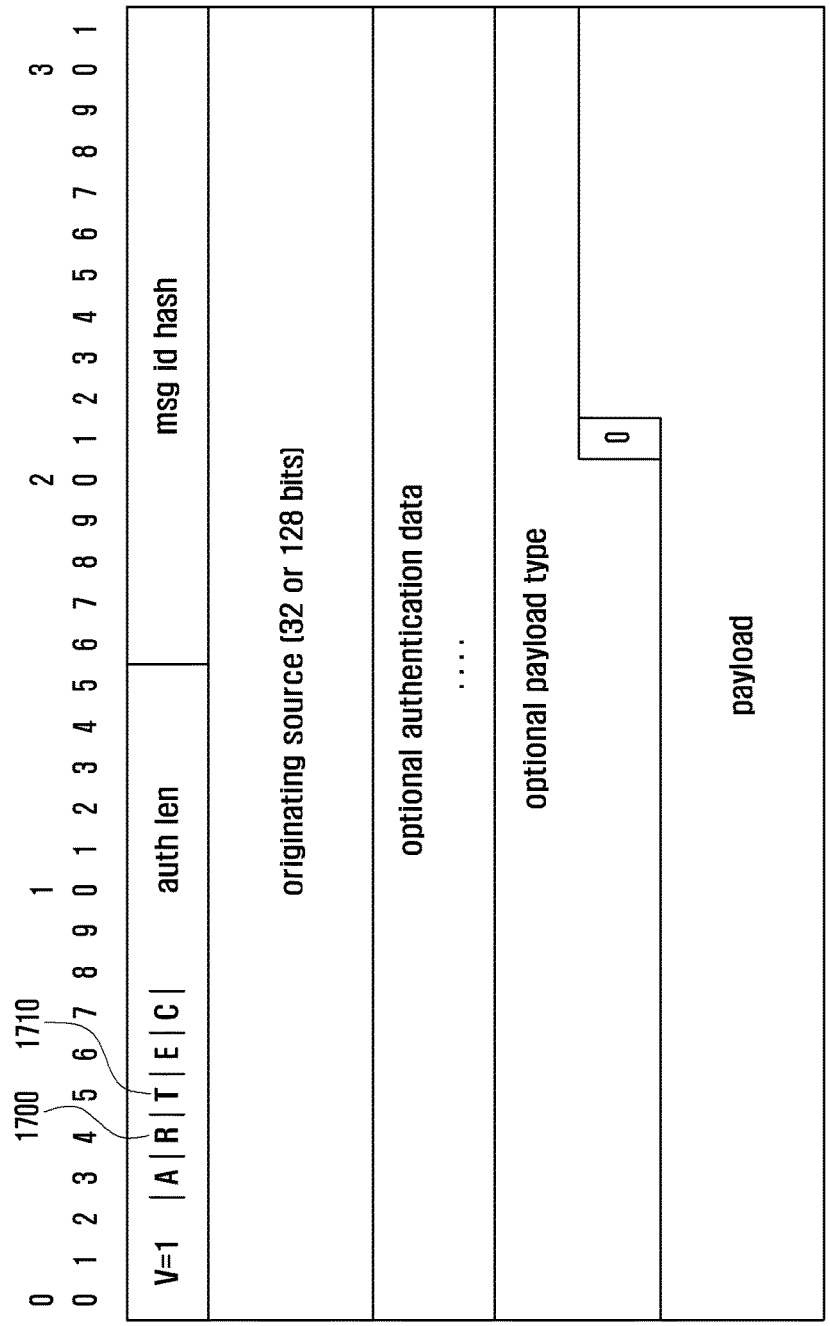
FIG. 17 is a diagram showing a packet format of a session announcement protocol (SAP) according to an embodiment of the present disclosure.

FIG. 17 is a diagram showing a packet format of a SAP according to an embodiment of the present disclosure.

Referring to FIG. 17, since the meaning and use of the SAP header are well-known, its description will not be explained in this disclosure. The embodiment of the present disclosure describes the packet format by R bit and T bit, indicated by the reference numbers 1700 and 1710, in order to implement a group call announcement message and a response message. R bit refers to a reserved bit for future use on the RFC. T bit refers to a bit defining a message type of SAP. The SAP uses T bit to represent: an announcement message when the value of T bit is 0; and an end of the session when it is 1. Therefore, the SAP may set R bit to '1' and T bit to '0' in order to specify a response message as in the following table 1.

TABLE 1

| R bit | T bit | message type |
|---|---|---|
| 0 | 0 | group call announcement message |
| 1 | 0 | response message |

The embodiment joins an MCPTT client, which is not a member, in a previously created group for D2D direct communication.

Embodiment 4

Public safety-LTE (PS-LTE) provides users with communication services for public safety in emergency situations, such as natural disasters, using the MCPTT over LTE technology.

When an emergency situation occurs, UE is capable of announcing the emergency situation to other UE. The MCPTT technology may give aid to MCPTT users in emergency.

The embodiments of the present disclosure provide a method and apparatus for providing services in wireless communication systems.

The embodiments of the present disclosure provide a method and apparatus for providing priority-based services in wireless communication systems.

The embodiments of the present disclosure provide a method and apparatus for determining priority for users, groups and services in an MCPTT system. The embodiments of the present disclosure provide a procedure, an apparatus and a system, required for a method that enables UE and a server to control services based on priority. The embodiments of the present disclosure provide a message flow for providing priority-based services.

The embodiments of the present disclosure provide a method and apparatus for transmitting an emergency notification message from UE in an emergency situation to other UE and setting up a call.

The method and apparatus according to the embodiments are capable of providing priority-based services in wireless communication systems.

The method and apparatus according to the embodiments are capable of providing and processing priority-based services, guaranteeing the QoS.

The method and apparatus according to the embodiments are capable of transmitting an emergency notification message from UE in an emergency situation to other UE and setting up a call. The method and apparatus are capable of transmitting media that UE has collected when an emergency situation occurred to an administrator, thereby giving aid to UE in an emergency situation.

Embodiments are described based on the SIP of the Internet Engineering Task Force (IETF) and wireless IP multimedia subsystem (IMS) and UE defined in the 3GPP specification; however, it will be appreciated to those skilled in the art that the subject matter of the present disclosure can also be applied to various types of communication systems which have the technical background similar to those of the present disclosure, without departing from the scope and sprit of the present disclosure.

The embodiments have features of setting priority for MCPTT users, groups and services, and allowing UE and a server to operates, based on the set priority.

The embodiments have a feature of a message flow for providing priority-based services between an MCPTT user and an MCPTT server.

PS-LTE provides users with communication services for public safety in emergency situations, such as natural disasters, using the MCPTT over LTE technology. MCPTT is defined by the 3GPP and provides various functions, such as group communication between users, one-to-one communication, emergency call, emergency notification, ambient listening, etc.

MCPTT service includes UE and EPS, SIP core, and a MCPTT application server. EPS may refer to an LTE network. SIP core is a network device employing the SIP and may refer to IMS. MCPTT service may be configured in various architectures. The MCPTT service provider is capable of managing the EPS, the SIP core, and the MCPTT application server. While managing the SIP core and the MCPTT application server, the MCPTT service provider is capable of providing services, cooperating with the EPS of the other service provider. Alternatively, while the MCPTT service provider manages only the MCPTT application server, it may provide services, cooperating with the SIP core and the EPS of the other service provider.

The functional elements of the MCPTT service may be divided into group management, session control, and media control. The group management manages subscription information regarding a group that a user belonged to, priority of a group, functions allowed in a group, a call type available in a group, etc. The session control controls a user's registration in MCPTT service and signals for a call session, such as signals for initiating, switching or terminating a group call, etc. The session management signals transmitted from the MCPTT user are controlled/managed by the MCPTT application server.

The media control controls: the permission for transmission/reception of media by MCPTT service when the user uses a group call, a one-to-one call, or emergency notification, etc., provided by the MCPTT service; and the resource control. Information regarding media transmitted by the MCPTT user is transmitted to other users via the media gateway provided by the MCPTT service. The group management server for group management may be located along with the MCPTT application server. In this case, the group management server and the MCPTT application server are logically distinguished from each other according to functions. The media gateway for media control may be connected to UE, EPS and MCPTT application server without the use of the SIP core. The media gateway controls a user authorization for transmission/reception, which is called 'floor control.' The media gateway may be located along with the MCPTT application server. In this case, the media gateway and the MCPTT application server are logically distinguished from each other according to functions.

MCPTT services may be classified into a group call, a one-to-one call, and emergency notification. The group call supports: a group call which needs group communication for public safety; an emergency call which provides communication with the highest priority when an urgency/emergency situation occurred; and an imminent peril call which provides group communication in preparation for an imminent urgency/emergency with a lower priority than the emergency call. The one-to-one call supports a general call, an emergency call, and an ambient listening function for listening ambient sound of the correspondent.

MCPTT users may be divided into a number of categories, e.g., a general (unauthorized) MCPTT user, an authorized MCPTT user, an authorized MCPTT service provider, etc.

MCPTT users are capable of receiving services from a number of MCPTT service providers. The MCPTT user may perform group communication and one-to-one communication with another MCPTT user that the MCPTT user is in partnership with, cooperating with MCPTT service providers that the MCPTT user is in partnership with, as well as the main MCPTT service provider.

MCPTT UE is capable of receiving basic information for MCPTT services from the MCPTT service provider.

Examples of the basic information are a user ID, a group ID, functions allowed in a group, a call type available in a group, a condition as to whether one-to-one call can be performed, a type of arrangement, report information to be reported to MCPTT server, information regarding access to MCPTT application server, SIP core, EPS to support various types of arrangement, etc.

The MCPTT service provider is capable of providing and controlling services based on priority. MCPTT UE is capable of controlling services based on the service priority.

QoS level and priority, based on services, provided limited service providers, and subscription and fixed differentiation, provided by existing communication systems, do not satisfy requirements of the MCPTT priority service. Therefore, a method is required to sub-divide a level of priority into sub-divided levels of priority and to process the sub-divided levels of priority.

In the following description, the embodiment provides a procedure and method for determining priority for users, groups and services in an MCPTT system. The embodiment also provides a procedure, an apparatus and a system, required for a method that enables UE and a server to control services based on priority. The embodiment provides a message flow for providing priority-based services.

There are three types of items to set priority, e.g., priority according to users, priority according to groups, and priority according to services.

The priority of corresponding items may be set by a service provider or an authorized MCPTT user provided by the MCPTT service.

The set priority value may be shared by the MCPTT user and the MCPTT server. The MCPTT user and the MCPTT server may have shared the set priority before services are provided or may share the set priority when services are requested.

The set priority value is used by entities such as an MCPTT server, an MCPTT user, and an SIP core.

The priority (the order of priority) may be used by a combination of one or more priority values. When the MCPTT server receives a service request from the MCPTT user, it may use a priority value to process the service request. The MCPTT user may use a priority value to manage a service currently in process. A priority value may also be used for floor control. When the MCPTT user receives a service request, it may use a priority value to process the service request. A priority value may also be used to manage a service currently in process. The SIP core may use a priority value to manage network resources.

The method of processing services based on priority, according to the embodiment of the present disclosure, has the following features. Service process based on priority values varies in existing communication systems to which priority values are not applied. Service process varies according to types of media (e.g., audio, video, text, etc.) required for service. Types of media may have an additional classification system. In the embodiment of the present disclosure, media may be classified into media which can be simultaneously serviced (media type A) and media which cannot be simultaneously serviced (media type B). For example, since online chat is capable of servicing media (media type A) simultaneously, it can simultaneously provide a service of high priority and a service of low priority. In contrast, since audio cannot be serviced simultaneously (media type B), audio corresponding to a service of high priority is output first. When a user has a number of UE devices, a UE device to receive a service varies depending on priority. When a network has users the number of which is greater than or equal to the number of users which can be supported by the network, the network may provide a user of high priority with a service first.

Figure 18:
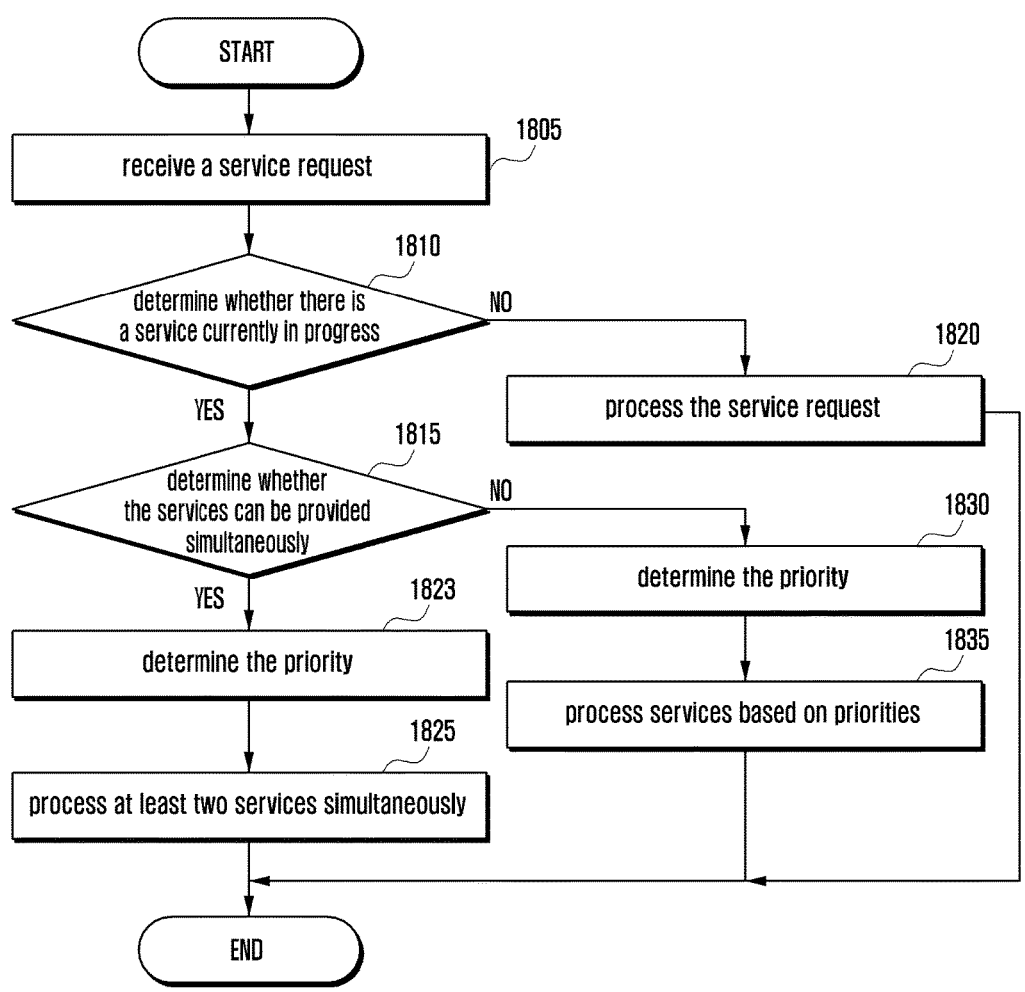
FIG. 18 is a flowchart that describes a method of processing services based on priority according to an embodiment of the present disclosure.

FIG. 18 is a flowchart that describes a method of processing services based on priority according to an embodiment of the present disclosure.

Referring to FIG. 18, MCPTT UE is capable of receiving a service request in operation 1805. The received service request may be a new service request.

MCPTT UE is capable of determining whether there is a service currently in process in operation 1810. An example of the service may be an MCPTT service.

When MCPTT UE ascertains that there is no service currently in process in operation 1810, it is capable of processing a service, corresponding to the request of operation 1805, in operation 1820.

On the other hand, when MCPTT UE ascertains that there is a service currently in process in operation 1810, it is capable of determining whether a service currently in process and a service (new service) corresponding to a new service request can be simultaneously provided in operation 1815. When MCPTT UE ascertains that a service currently in process and a service (new service) corresponding to a new service request can be simultaneously provided in operation 1815, it proceeds with operation 1823. On the other hand, when MCPTT UE ascertains that a service currently in process and a service (new service) corresponding to a new service request cannot be simultaneously provided in operation 1815, it proceeds with operation 1830. The embodiment may be modified in such a way that operation 1823 is omitted. In this case, MCPTT UE proceeds with operation 1825. For example, when media provided by individual services is audio, the audio service cannot be simultaneously provided. For example, when media provided by individual services is text or images, the text and image services can be simultaneously provided. When one service provides audio and the other service provides text, the media of the individual services may be simultaneously provided depending on the capability of UE. A condition as to whether individual services are simultaneously provided may be determined according to a type of service and the capability of UE.

In operation 1823, the MCPTT UE is capable of determining the priority of the service currently in process and the priority of the new service. In addition, the MCPTT UE is capable of determining the priority of media provided by the service currently in process and the priority of media provided by the new service. The determined priorities are used in operation 1825.

The MCPTT UE simultaneously provides the service currently in process and the service (new service) corresponding to the new service request in operation 1825. To this end, the MCPTT UE may use the determined priorities as obtained in operation 1823. Serviced which can be simultaneously provided may be assigned weights according to priorities. For example, MCPTT UE may provide text in such a way to control the display to show text of a service with relatively high priority on the top of the screen and text of a service with relatively low priority on the bottom of the screen. Alternatively, MCPTT UE may assign a weight to the size of text or images of a service with relatively high priority. Alternatively, MCPTT UE may apply different weights to times that services are provided.

In operation 1825, the service currently in process and the new service are not always simultaneously provided. For example, although MCPTT UE is capable of providing both of the two services simultaneously, it may provide one service first and then other service. Alternatively, MCPTT UE may provide a particular service first, based on the priorities determined in operation 1823. To this end, MCPTT UE may employ a priority-based service processing method which will be described later referring to operation 1835.

In operation 1830, MCPTT UE determines priority. MCPTT UE may determine priorities of a service currently in process and a service corresponding to a new service request.

MCPTT UE may provide a service currently in process and a service corresponding to a new service request, based on the determined priorities in operation 1835. For example, MCPTT UE may process a service with high priority first. MCPTT UE may drop or hold a posterior service. Alternatively, MCPTT UE may alter individual services into a service which can be simultaneously provided and then provide them or transmit them to another UE of the MCPTT UE's user.

Operation 1835 may also be implemented as follows. MCPTT UE may adjust services based on priority. From among the service currently in process and the new service, MCPTT UE may adjust a service which has relatively lower priority than the other service. For the sake of convenience, a service with a relatively low priority is called a 'posterior service,' and a service with a relatively high priority is called a 'prior service.' MCPTT UE may refuse a posterior service request. When MCPTT UE refuses a posterior service request, it may inform the MCPTT server or the correspondent UE of the refusal.

MCPTT UE may store corresponding media of a posterior service therein or in a server, and perform the transmission of the stored media, later. Since MCPTT UE has held a posterior service request, it may provide the request after a service currently in process is ended. When part of media of the prior service is ended, part of media of the held posterior service, which does not conflict with the media of the prior service, may be provided first. Alternatively, after storing information regarding the posterior service, the operation may be set to be executed at a time that the stored information can be checked.

The type of corresponding media of a posterior service may be altered. For example, the type of corresponding media of a posterior service is altered to a type of media which does not conflict with the prior service, and then the altered media is provided. Alternatively, the type of corresponding media of a posterior service may be altered to a type of media which can be simultaneously provided with the media provided by the prior service, and then the altered media is provided. For example, audio media may be altered to a type of text media, and then the altered media is displayed on the UE. In addition, information regarding a new service may be provided in text. When a posterior service needs to provide a plurality of media items, the posterior service provides part of the media items, which can be provided simultaneously with media provided by the prior service; however, the posterior service only adjusts part of the media items, which cannot be provided simultaneously with media provided by the prior service.

The posterior service may be transmitted to another UE of the MCPTT UE's user. In order to transmit corresponding media of a corresponding service another UE of the same user, the device capability of the other UE owned by the same user needs to be considered.

The embodiment of FIG. 18 may also be applied to an MCPTT server as well as MCPTT UE. When an MCPTT server receives a service request from UE 1, it transmits the request to UE 2. Although the embodiment of FIG. 18 describes the operations of UE 2 receiving a service request, it may also be applied to operations before the MCPTT server receiving a service request from UE 1 transmits the received service request to UE 2.

That is, the MCPTT server may determine whether UE 2 has a service currently in process. When the MCPTT server ascertains that UE 2 does not have a service currently in process, it transmits the requested service to the UE 2. On the other hand, when the MCPTT server ascertains that UE 2 has a service currently in process, it may determine whether the service currently provided by UE 2 can be provided simultaneously with a service corresponding to a new service request. When the MCPTT server ascertains that the service currently provided by UE 2 can be provided simultaneously with a service corresponding to a new service request, it transmits the service request to provide both of the services simultaneously. On the other hand, when the MCPTT server ascertains that the service currently provided by UE 2 cannot be provided simultaneously with a service corresponding to a new service request, it determines priorities of both of the services, and transmits a service request to the UE 2, so that the UE 2 can provide services, based on the determined priorities.

Figure 19:
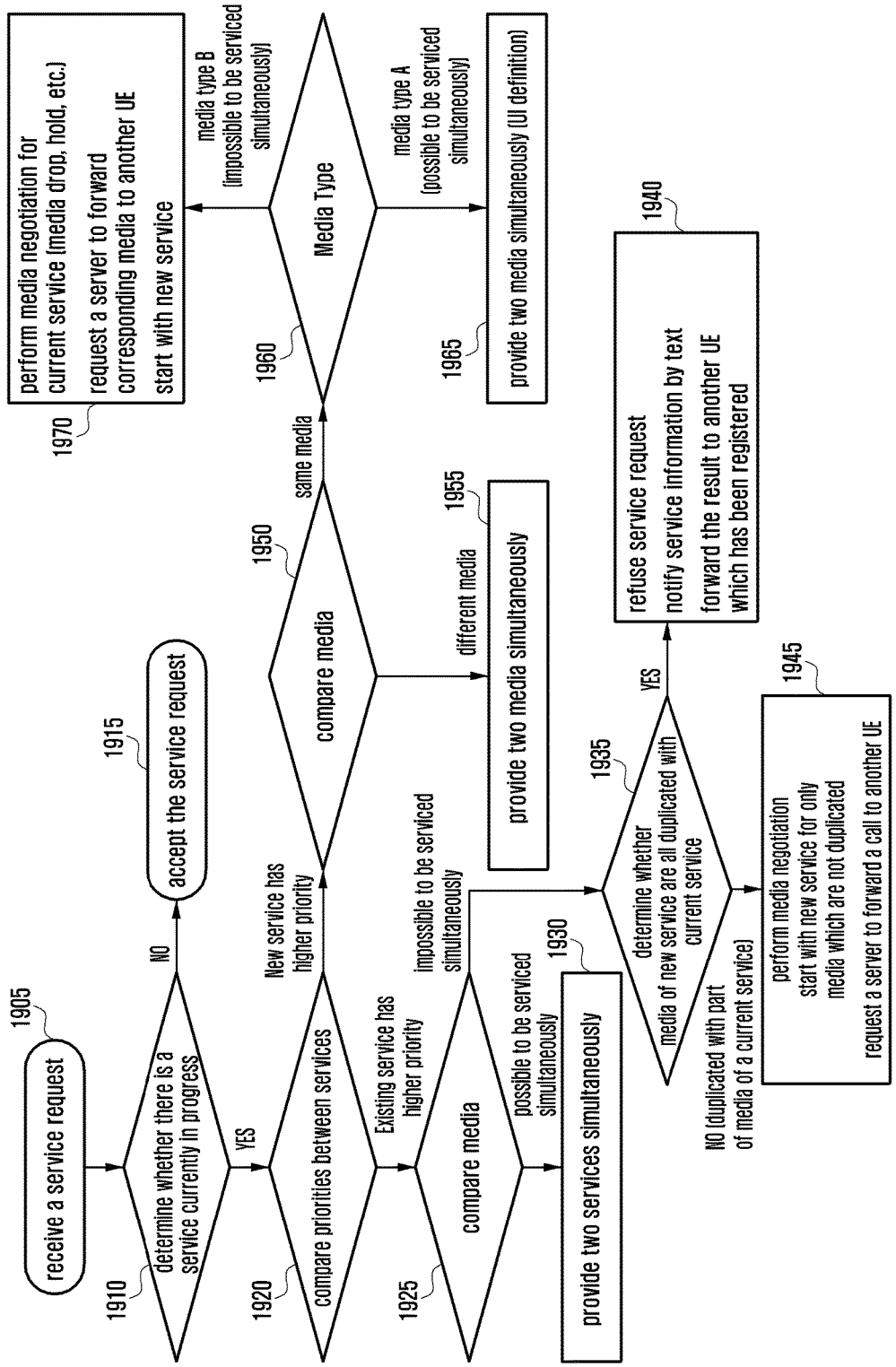
FIG. 19 is a flowchart that describes a method for a UE to process services based on priority according to an embodiment of the present disclosure.

FIG. 19 is a flowchart that describes a method for a UE to process services based on priority according to an embodiment of the present disclosure.

Referring to FIG. 19, MCPTT UE receives a new service request in operation 1905. MCPTT UE is capable of determining whether there is a service currently in process in operation 1910.

When MCPTT UE ascertains that there is no service currently in process in operation 1910, it accepts a service request in operation 1915. MCPTT UE is capable of processing the requested service.

On the other hand, when MCPTT UE ascertains that there is a service currently in process in operation 1910, it is capable of comparing the priority of a service currently in process with that of a newly requested service in operation 1920.

When the MCPTT UE ascertains that the priority of a service currently in process is higher than that of a newly requested service in operation 1920, it proceeds with operation 1925. On the other hand, when the MCPTT UE ascertains that the priority of a newly requested service is higher than that of a service currently in process in operation 1920, it proceeds with operation 1950.

In operation 1925, MCPTT UE compares media provided by the service currently in process with media provided by the newly requested service. MCPTT UE compares a type of media provided by the service currently in process with a type of media provided by the newly requested service, and determines whether both of the media can be simultaneously serviced in operation 1925.

When MCPTT UE ascertains that both of the media can be simultaneously serviced in operation 1925, it provides both of the services simultaneously in operation 1930.

On the other hand, when MCPTT UE ascertains that both of the media cannot be simultaneously serviced in operation 1925, it compares media provided by the service currently in process with media provided by the newly requested service, and processes the services in operation 1935. For example, MCPTT UE may determine whether media of a current service is all duplicated with that of a new service and process services based on the determination in operation 1935. For example, MCPTT UE may adjust part of the services. MCPTT UE may adjust corresponding media of a corresponding service and correspondent UE transmitting the service request or an MCPTT server.

When MCPTT UE ascertains that media of a current service is all duplicated with that of a new service in operation 1935, it may adjust services in operation 1940. When MCPTT UE ascertains that the service currently in process has a higher priority than the newly requested service (new service), it may adjust the new service. MCPTT UE may refuse a new service request. When MCPTT UE refuses a new service request, it may inform the MCPTT server or the correspondent UE of the refusal.

MCPTT UE may store corresponding media of a corresponding service therein or in a server, and perform the transmission of the stored media, later. Since MCPTT UE has held a new service request, it may provide the held request after a service currently in process is ended. When part of media of the service currently in progress is ended, part of media of the held, new service, which does not conflict with the media of the service currently in process, may be provided first. Alternatively, after storing information regarding the new service, the operation may be set to be executed at a time that the stored information can be checked.

The type of corresponding media of a new service may be altered. For example, the type of corresponding media of a new service is altered to a type of media which does not conflict with media provided by the service currently in process, and then the altered media is provided. Alternatively, the type of corresponding media of a new service may be altered to a type of media which can be simultaneously provided with the media provided by the service currently in process, and then the altered media is provided. For example, audio media may be altered to a type of text media, and then the altered media is displayed on the UE. In addition, information regarding a new service may be provided in text.

The new service may be transmitted to another UE of the MCPTT UE's user. In order to transmit corresponding media of a corresponding service another UE of the same user, the device capability of the other UE owned by the same user needs to be considered.

When MCPTT UE ascertains that all the media of a new service is duplicated with part of media of a current service in operation 1935, it negotiates for media and starts a new service for only media which is not duplicated with media of a current service in operation 1945. In this case, MCPTT UE may request a server to forward a call to another UE.

When the MCPTT UE ascertains that the priority of a newly requested service is higher than that of a service currently in process in operation 1920, it compares media provided by the service currently in process with media provided by the newly requested service in operation 1950. MCPTT UE compares a type of media provided by the service currently in process with a type of media provided by the newly requested service, and determines whether media provided by both of the services are identical to each other in operation 1960.

When MCPTT UE ascertains that both of the services provide different media in operation 1950, it determines that the media can be service simultaneously, and provides individual services simultaneously in operation 1955.

On the other hand, when MCPTT UE ascertains that media provided by both of the services are identical to each other in operation 1950, it identifies a type of media and determines whether the identified type of media can be provided simultaneously in operation 1960. For example, the embodiment is capable of classifying media into media types A and B. The media type A refers to a type of which two media can be provided simultaneously. The media type B refers to a type of which two media cannot be provided simultaneously.

When MCPTT UE ascertains that the identified type of media is media which can be simultaneously provided by both of the services in operation 1960, it provides services by a method of providing two media simultaneously in operation 1965.

On the other hand, when MCPTT UE ascertains that the identified type of media is not media which can be simultaneously provided by both of the services in operation 1960, it adjusts a service currently in process to provide services in operation 1970. Since the new service has a higher priority than the other in operation 1920, MCPTT UE may adjust the service currently in process.

MCPTT UE may refuse a service currently in process. When MCPTT UE refuses a service currently in process, it may inform the MCPTT server or the correspondent UE of the refusal.

MCPTT UE may store corresponding media of a service currently in process therein or in a server, and perform the transmission of the stored media, later. Since MCPTT UE has held a service currently in process, it may provide the held service after a new service is ended. When part of media of the new service is ended, part of media of the held service, which does not conflict with the media of the new service, may be provided first. Alternatively, after storing information regarding the service currently in process, the operation may be set to be executed at a time that the stored information can be checked.

The type of corresponding media of a service currently in process may be altered. For example, the type of corresponding media of a service currently in process is altered to a type of media which does not conflict with media provided by the new service, and then the altered media is provided. Alternatively, the type of corresponding media of a service currently in process may be altered to a type of media which can be simultaneously provided with the media provided by the new service, and then the altered media is provided. For example, audio media may be altered to a type of text media, and then the altered media is displayed on the UE. In addition, information regarding a new service may be provided in text.

Therefore, the embodiment can provide priority-based MCPTT services.

Figure 20:
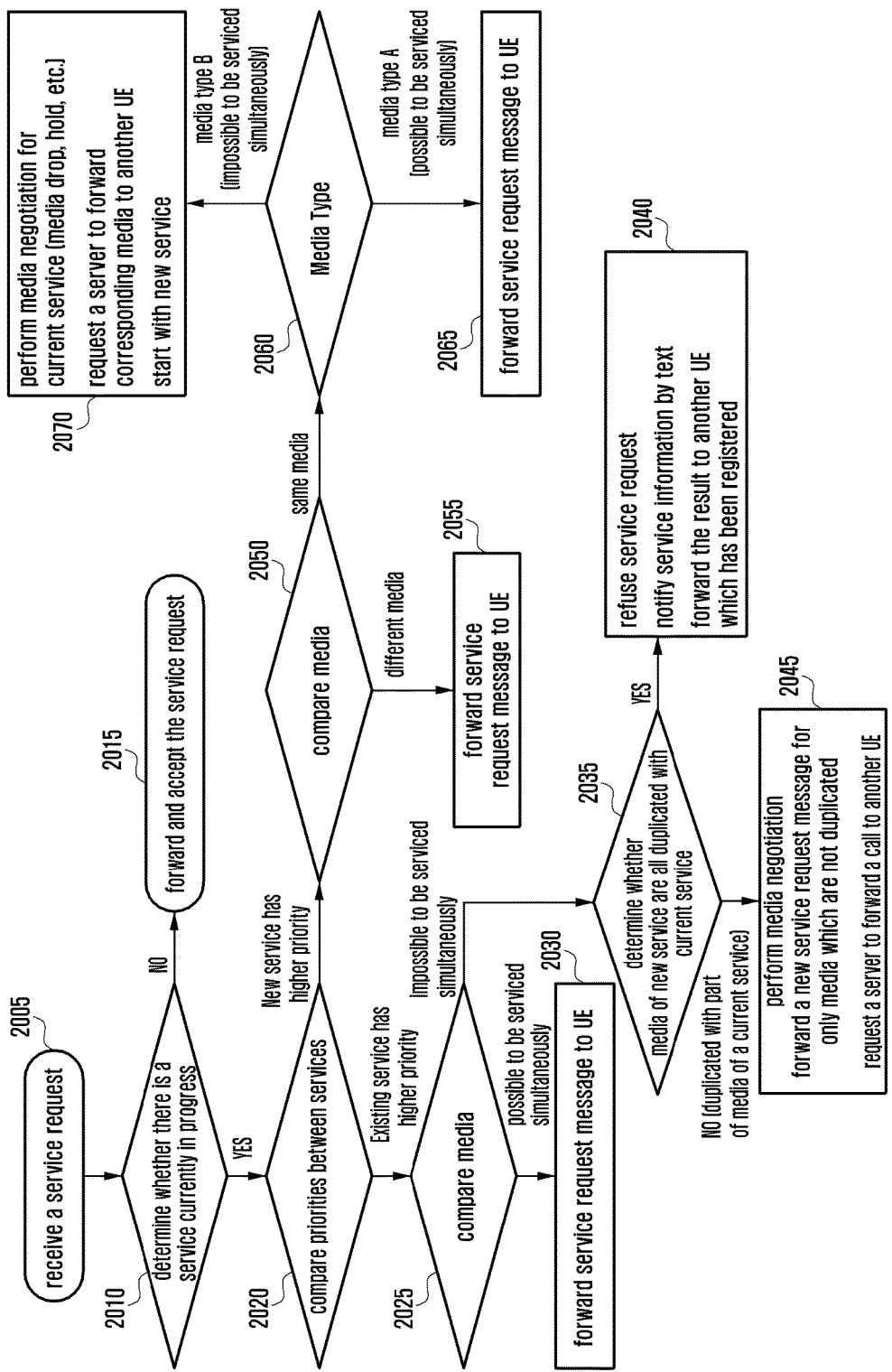
FIG. 20 is a flowchart that describes a method for a server to process services based on priority according to an embodiment of the present disclosure.

FIG. 20 is a flowchart that describes a method for a server to process services based on priority according to an embodiment of the present disclosure.

Referring to FIG. 20, the MCPTT server receives a new service request from an MCPTT user (or a user of UE 1), or UE 1, in operation 2005. The MCPTT server transmits the received service request to a target UE device (or UE 2).

MCPTT server receives the new service request and determines whether corresponding MCPTT UE (UE 2) has a service currently in process in operation 2010.

When the MCPTT server ascertains that corresponding MCPTT UE (UE 2) does not have a service currently in process, or an MCPTT service, in operation 2010, it transmits the new service request to UE 2 in operation 2015.

On the other hand, when the MCPTT server ascertains that corresponding MCPTT UE (UE 2) has a service currently in process in operation 2010, it is capable of comparing the priority of a service currently in process with that of a newly requested service in operation 2020.

When the MCPTT server ascertains that the priority of a service currently in process is higher than that of a newly requested service in operation 2020, it proceeds with operation 2025. On the other hand, when the MCPTT server ascertains that the priority of a newly requested service is higher than that of a service currently in process in operation 2020, it proceeds with operation 2050.

In operation 2025, MCPTT server compares media provided by the service currently in process with media provided by the newly requested service. MCPTT server compares a type of media provided by the service currently in process with a type of media provided by the newly requested service, and determines whether both of the media can be simultaneously serviced in operation 2025.

When MCPTT server ascertains that both of the media can be simultaneously serviced 2025, it forwards the service request message to the UE, and allows the UE receiving the service request message to determine whether it accepts the service request in operation 2030. When the UE accepts the service request, the server may simultaneously provide the UE with both of the services.

On the other hand, when MCPTT server ascertains that both of the media cannot be simultaneously serviced in operation 2025, it compares media provided by the service currently in process with media provided by the newly requested service, and processes the services in operation 2035. For example, MCPTT server may determine whether media of a current service is all duplicated with that of a new service and process services based on the determination in operation 2035. For example, MCPTT server may adjust part of the services. MCPTT server may adjust corresponding media of a corresponding service and correspondent UE transmitting the service request or an MCPTT server.

When MCPTT server ascertains that media of a current service is all duplicated with that of a new service in operation 2035, it may adjust services in operation 2040. When MCPTT server ascertains that the service currently in process has a higher priority than the newly requested service (new service), it may adjust the new service. MCPTT server may refuse a new service request. When MCPTT server refuses a new service request, it may inform UE related to the service of the refusal.

MCPTT server may store corresponding media of a corresponding service therein, and perform the transmission of the stored media, later. Since MCPTT server has held a new service request, it may provide the held request after a service currently in process is ended. When part of media of the service currently in progress is ended, part of media of the held, new service, which does not conflict with the media of the service currently in process, may be provided first. Alternatively, after storing information regarding the new service, the operation may be set to be executed at a time that the stored information can be checked.

The MCPTT server may alter the type of corresponding media of a new service. For example, the type of corresponding media of a new service is altered to a type of media which does not conflict with media provided by the service currently in process, and then the altered media is provided. Alternatively, the type of corresponding media of a new service may be altered to a type of media which can be simultaneously provided with the media provided by the service currently in process, and then the altered media is provided. For example, audio media may be altered to a type of text media, and then the altered media is displayed on the UE. In addition, information regarding a new service may be provided in text.

MCPTT server may transmit the new service to another UE of the MCPTT UE's user. In order to transmit corresponding media of a corresponding service another UE of the same user, MCPTT server may consider the device capability of the other UE owned by the same user.

When MCPTT server ascertains that all the media of a new service is duplicated part of media of a current service in operation 2035, it negotiates for media and starts a new service for only media which is not duplicated with media of a current service in operation 2045. In this case, MCPTT UE may request the server to forward a call to another UE that has been previously registered.

When the MCPTT server ascertains that the priority of a newly requested service is higher than that of a service currently in process in operation 2020, it compares media provided by the service currently in process with media provided by the newly requested service in operation 2050. MCPTT server compares a type of media provided by the service currently in process with a type of media provided by the newly requested service, and determines whether media provided by both of the services are identical to each other in operation 2060.

When MCPTT server ascertains that both of the services provide different media in operation 2050, it determines that both of the media can be simultaneously serviced; forwards the service request message to the UE; and allows the UE receiving the service request message to determine whether it accepts the service request in operation 2055. When the UE accepts the service request, the server may simultaneously provide the UE with both of the services.

On the other hand, when MCPTT server ascertains that media provided by both of the services are identical to each other in operation 2050, it identifies a type of media and determines whether the identified type of media can be provided simultaneously in operation 2060. For example, the embodiment is capable of classifying media into media types A and B. The media type A refers to a type of which two media can be provided simultaneously. The media type B refers to a type of which two media cannot be provided simultaneously.

When MCPTT server ascertains that the identified type of media is media which can be simultaneously provided by both of the services in operation 2060, it provides services simultaneously in operation 2065.

On the other hand, when MCPTT server ascertains that the identified type of media is not media which can be simultaneously provided by both of the services in operation 2060, it adjusts a service currently in process and provides services in operation 2070. Since the new service has a higher priority than the other in operation 2020, MCPTT server it may adjust the service currently in process.

MCPTT server may refuse a service currently in process. When MCPTT server refuses a service currently in process, it may inform UE related to the service of the refusal.

MCPTT server may store corresponding media of a service currently in process therein, and perform the transmission of the stored media, later. Since MCPTT server has held a service currently in process, it may provide the held service after a new service is ended. When part of media of the new service is ended, part of media of the held service, which does not conflict with the media of the new service, may be provided first.

The MCPTT server may alter the type of corresponding media of a service currently in process. For example, the type of corresponding media of a service currently in process is altered to a type of media which does not conflict with media provided by the new service, and then the altered media is provided. Alternatively, the type of corresponding media of a service currently in process may be altered to a type of media which can be simultaneously provided with the media provided by the new service, and then the altered media is provided. For example, audio media may be altered to a type of text media, and then the altered media is displayed on the UE. In addition, information regarding a new service may be provided in text.

Using the method described above, MCPTT server may adjust media provided by the service currently in process and a new service, according to conditions, based on priorities of the service currently in process and the new service, and then provide an MCPTT service to UE 2.

When the SIP core receives a service request message, it may manage network resources using priority values in order to provide a corresponding service.

Figure 21:
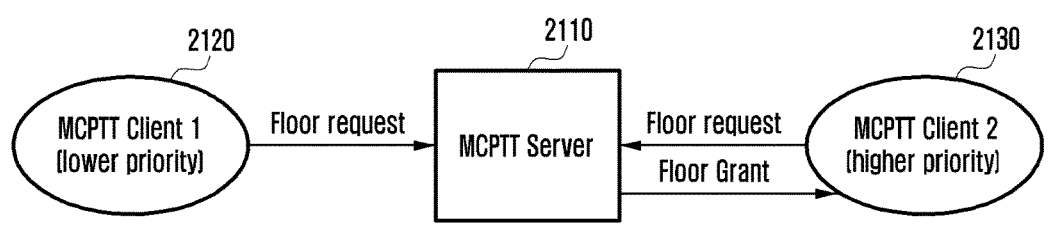
FIG. 21 is a diagram that describes a process of controlling a floor of a teleconference based on a value of priority according to an embodiment of the present disclosure.

FIG. 21 is a diagram that describes a process of controlling a floor of a teleconference based on a value of priority according to an embodiment of the present disclosure.

Referring to FIG. 21, MCPTT server 2110 is capable of receiving floor request messages from MCPTT clients 1 2120 and 2 2130. In the embodiment, it is assumed that group communication is performed, where group communication may refer to group calling or a group call.

Group calling allows a number of MCPTT clients 2120 and 2130 to join the group communication. In a state where a number of clients join a group calling, when a client (or UE) has a plan to transmit data in order to prevent communication collision between clients, it transmits a floor request message to the MCPTT server 2110. The MCPTT server 2110 receives the floor request message and transmits the floor grant message to the client. When receiving the floor grant message, the client may perform the transmission of data.

In the embodiment, when the MCPTT server 2110 receiving the floor request message performs the transmission of a floor grant message, it may preferentially transmit the floor grant message to one of a number of UE devices, which has the highest priority. In the embodiment, it is assumed that MCPTT client 2 has a higher priority than the MCPTT client 1. Therefore, when the MCPTT server 2110 receives floor request messages from the MCPTT clients 1 and 2, it transmits the floor grant message to the MCPTT client 2. In an embodiment, when the server receives floor request messages from clients which have the same priority, it may determine the transmission of a floor grant message to them, considering the reception order of floor request messages, etc.

Figure 22:
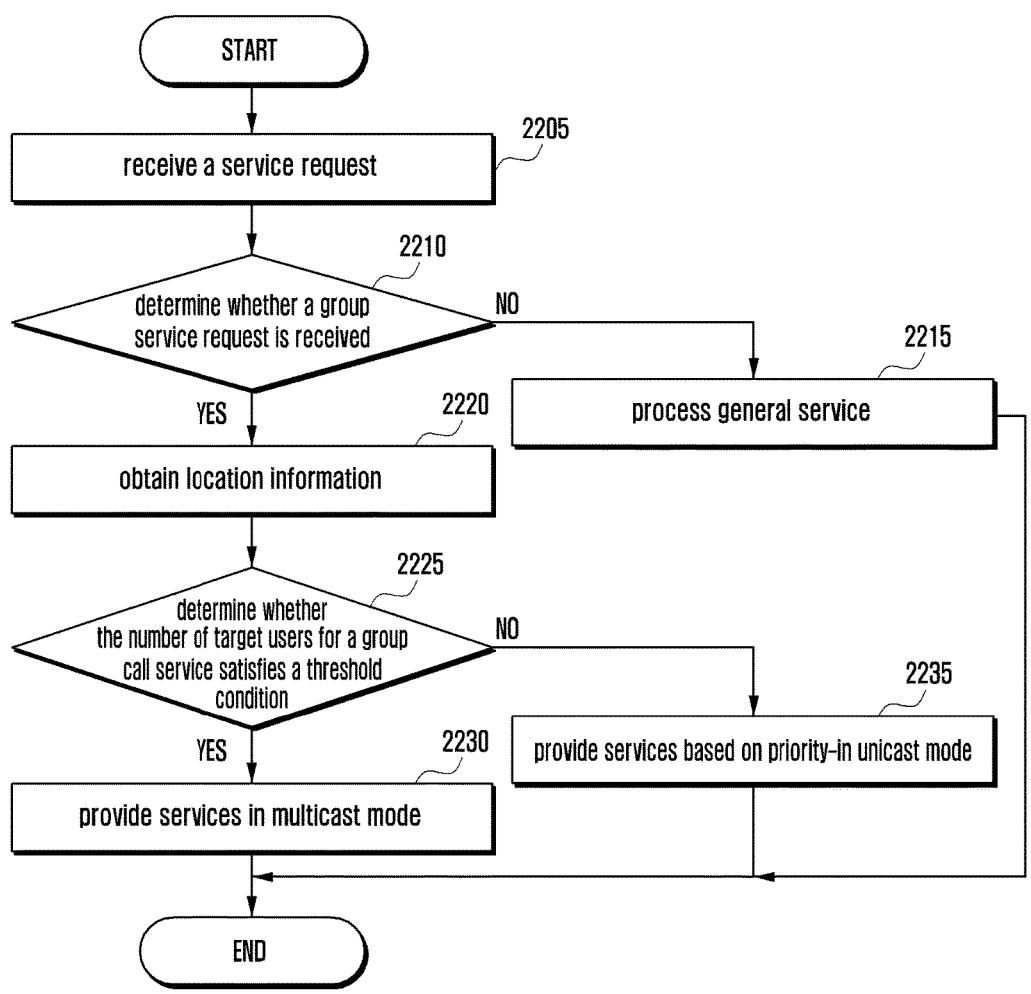
FIG. 22 is a flowchart that describes a method for a network to provide a quality of service (QoS) based on priority and location information of a UE according to an embodiment of the present disclosure.

FIG. 22 is a flowchart that describes a method for a network to provide a QoS based on priority and location information of a UE according to an embodiment of the present disclosure.

Referring to FIG. 22, when an MCPTT server receives a group communication request (e.g., a group call service request), it transmits the group call service request to individual users in the group and provides a group call service. In this case, the MCPTT server determines the transmission order of a service request, based on the number of users participating in a group call and priorities of the users, which is described referring to FIG. 22.

MCPTT server is capable of receiving a service request in operation 2205. Examples of the service request are a group communication request, a group call service request, etc.

MCPTT server is capable of determining whether the requested service is a group service in operation 2210. The group service may include a group communication request, a group call service, etc.

When the MCPTT server ascertains that the requested service is not a group service in operation 2210, it may process a corresponding service according to a general procedure in operation 2215. For example, the MCPTT server may process the corresponding service via the methods referring to FIGS. 18 to 20.

On the other hand, when the MCPTT server ascertains that the requested service is a group service in operation 2210, it is capable of performing operations to process a group service in operation 2220. For example, the MCPTT server may process the group service via the methods referring to FIGS. 18 to 20.

The MCPTT server is capable of obtaining location information regarding target UE for a group service in operation 2220.

The MCPTT server may obtain location information regarding a target user a group service, using the following methods. As a first method, when MCPTT UE attaches to a network and registers with the MCPTT server, the UE may transmit the ID information regarding the network to the MCPTT server, so that the MCPTT sever can obtain the location regarding the UE. In addition, when UE is moving and changes between its connected networks, it updates and reports a network ID to MCPTT server each time it changes the connection of the network, so that the MCPTT sever can obtain the location regarding the UE. A second method, when the MCPTT server receives a group call service request, it inquires the network of location information regarding UE, thereby obtaining the location information regarding UE. When the network has known corresponding information, it may inform the MCPTT server of the information. When the network does not know corresponding information, it transmits a message to UE in idle state and thus obtains the network ID. In particular, using the second method, the server may obtain the number of users connected, in real time, to a corresponding network. When the MCPTT server receives a group call service request, it may transmit an SIP invite to target UE to receive a group call service. Each group call service target UE may transmit a response message to the server. The response message may contain location information regarding each group call service target UE.

Alternatively, when the MCPTT server receives a group call service request from UE, it may obtain location information regarding the UE requesting a group call service. For example, location information regarding UE may be transmitted along with the group call service request. When the IMS-based SIP protocol is used, UE requesting a group call service may include its location information in the header of the SIP request and transmits the request. That is, when UE transmits a group call request, Invite, the UE may include its network information in the header of the request message. The network information may be location information or an ID of a cell that UE connects to. When a group call request does not contain location information or is not used, the location information may be obtained by the methods described above. Information regarding a group target requesting a group call may be obtained from a SIP Invite request. Location information regarding another group target receiving the group call request may be contained in an SIP response.

After obtaining location information regarding UE in operation 2220, the MCPTT server is capable of determining whether the number of group call service target UE satisfies a preset threshold condition in operation 2225. The threshold condition is used to determine whether a group service is provided in multicast or unicast mode. For example, when the number of group call service target UE is greater than or equal to a preset threshold, media for a group service may be provided in multicast mode. Since a group service may transmit the same media to a number of targets, when the number of group service target UE is greater than or equal to a preset value, it is preferable to provide the media to them in multicast mode, thereby increasing the resource efficiency.

When the MCPTT server ascertains that the number of group call service target UE satisfies a preset threshold condition in operation 2225, it provides media for a group service in multicast mode in operation 2230. Although media is provided in multicast mode, signaling is still performed in unicast mode. When signaling is performed for transmission, the order of signaling may be determined, based on priority of group service target UE. For example, when a cell for a group service has a capacity of 200 users and the number of group service target UE is 250, UE devices of 50 is not provided with the group service. In this case, signaling is performed for the top 200 of the UE devices of 250, based on priorities of UE devices, so that the 200 UE devices can be provided with the group service.

On the other hand, when the MCPTT server ascertains that the number of group call service target UE does not satisfy a preset threshold condition in operation 2225, it provides media for a group service in unicast mode in operation 2235. The MCPTT server is capable of providing group service target UE devices with media, sequentially, based on priority. When performing the signaling, the order of signaling may be determined based on priority of group service target UE.

When the MCPTT server ascertains that UE devices are centralized in a particular network and the number of UE devices is greater than the number of users that the network can support, it may provide services to UE users, based on priorities of UE users, from highest to lowest.

An emergency group call is an example of an MCPTT service with a high priority. The MCPTT system provides MCPTT UE with an MCPTT service based on priority, through UE and a number of entities.

FIGS. 23 to 31 show message flow diagrams that describe a method of providing an emergency group call service, as an example of the priority service, via an MCPTT system according to various embodiments of the present disclosure.

MCPTT UE is capable of transmitting an Alert message via an MCPTT network. The Alert message contains location information regarding UE, a user ID, a group ID, and information regarding an affiliated group. The MCPTT server configured to transmit an Alert message ascertains the authorization of a user that performs the transmission of an Alert message. Regardless of whether or not a sufficient amount of information is contained in an Alert message, the Alert message may be edited by the modification or deletion of the information or by the addition of information. In the embodiment, the term 'UE' and 'client' are interchangeable with each other. When UE is in an emergency situation, it is capable of notifying other UE of its emergency situation. The following embodiments enable MCPTT users to announce an emergency situation.

Figure 23:
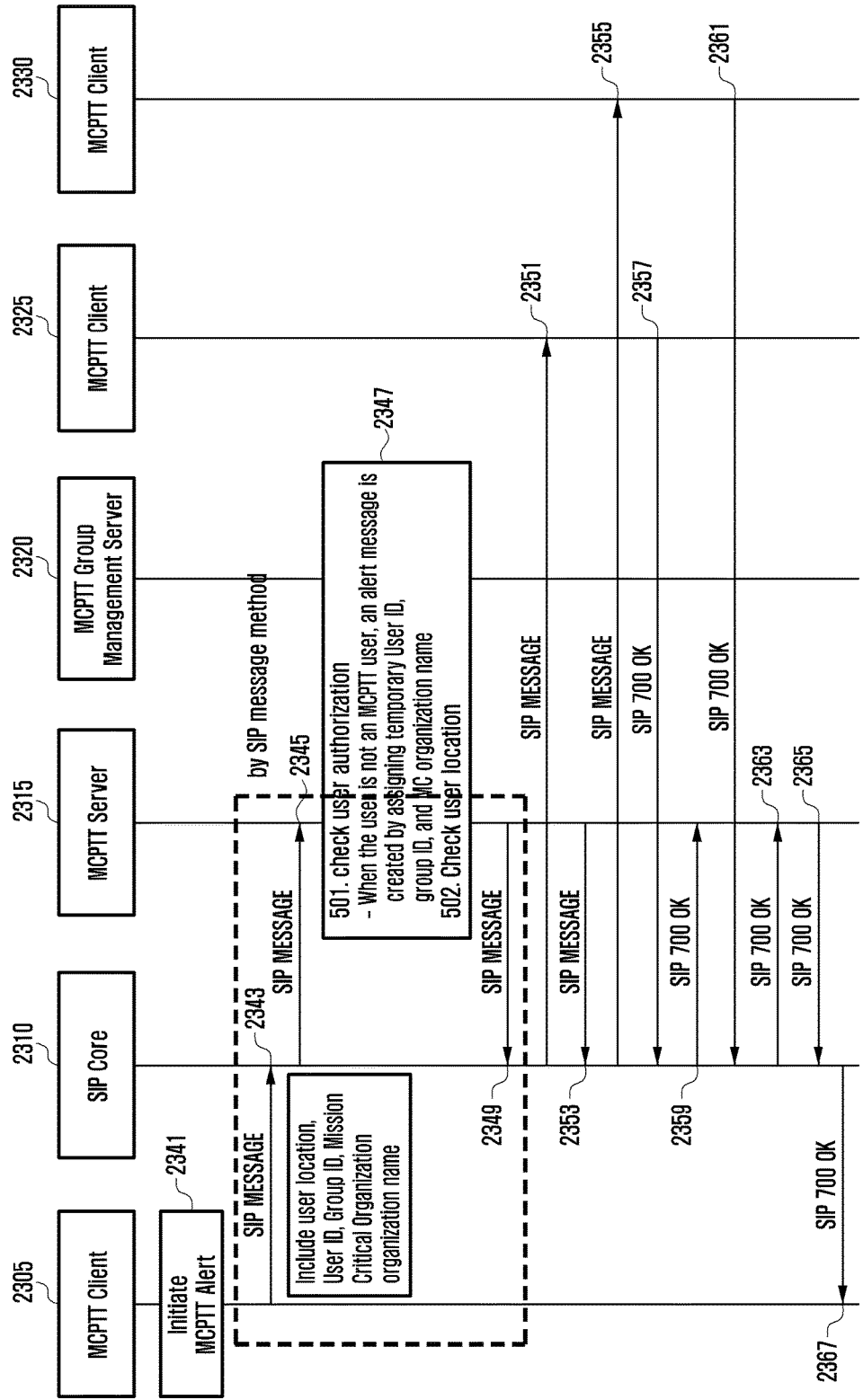
FIG. 23 is a flow diagram that describes a method of transmitting an alert message using a session initiation protocol (SIP) message according to an embodiment of the present disclosure.
Figure 24:
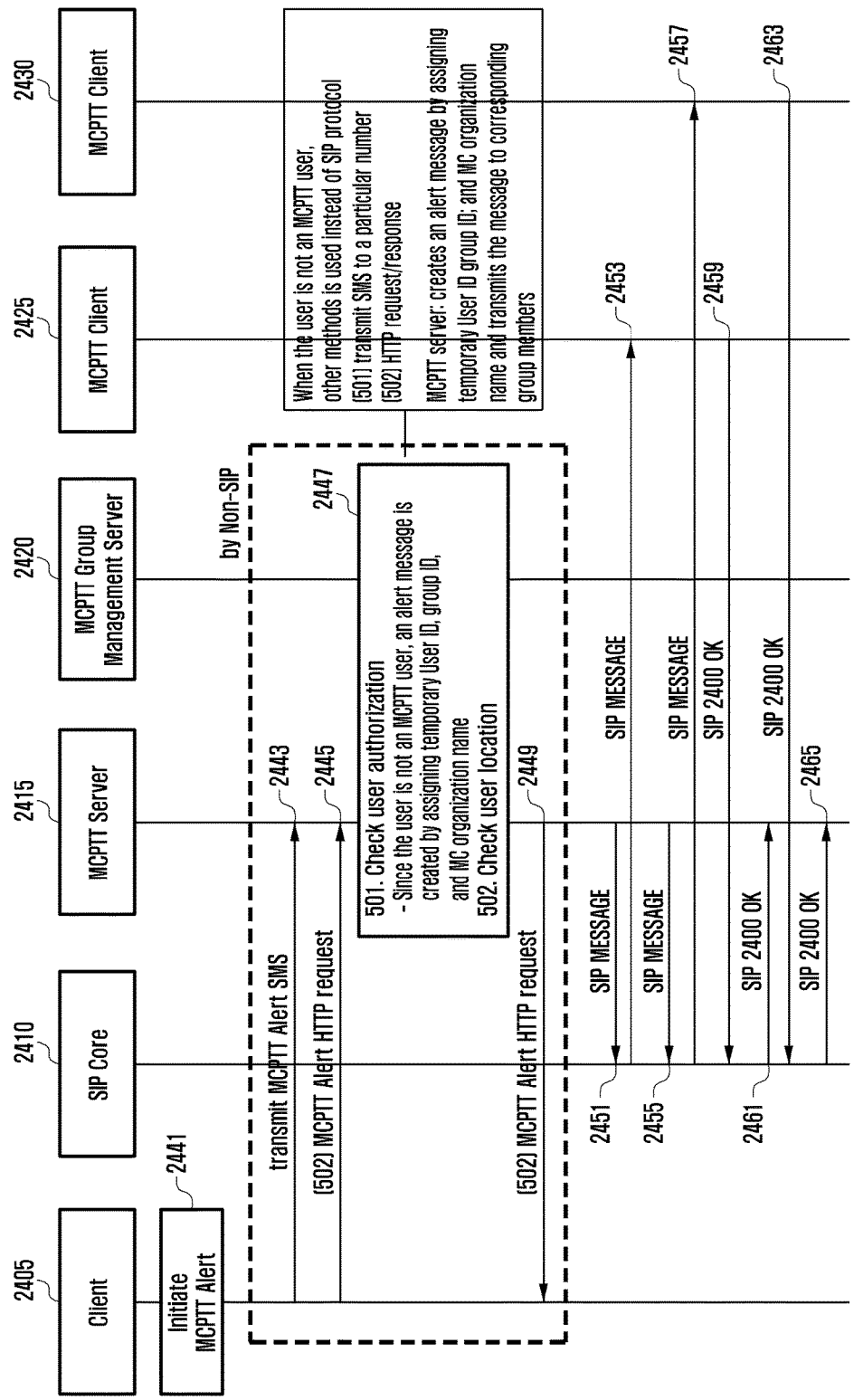
FIG. 24 is a flow diagram that describes a method for a UE to transmit an alert message using protocols other than SIP according to an embodiment of the present disclosure.
Figure 25:
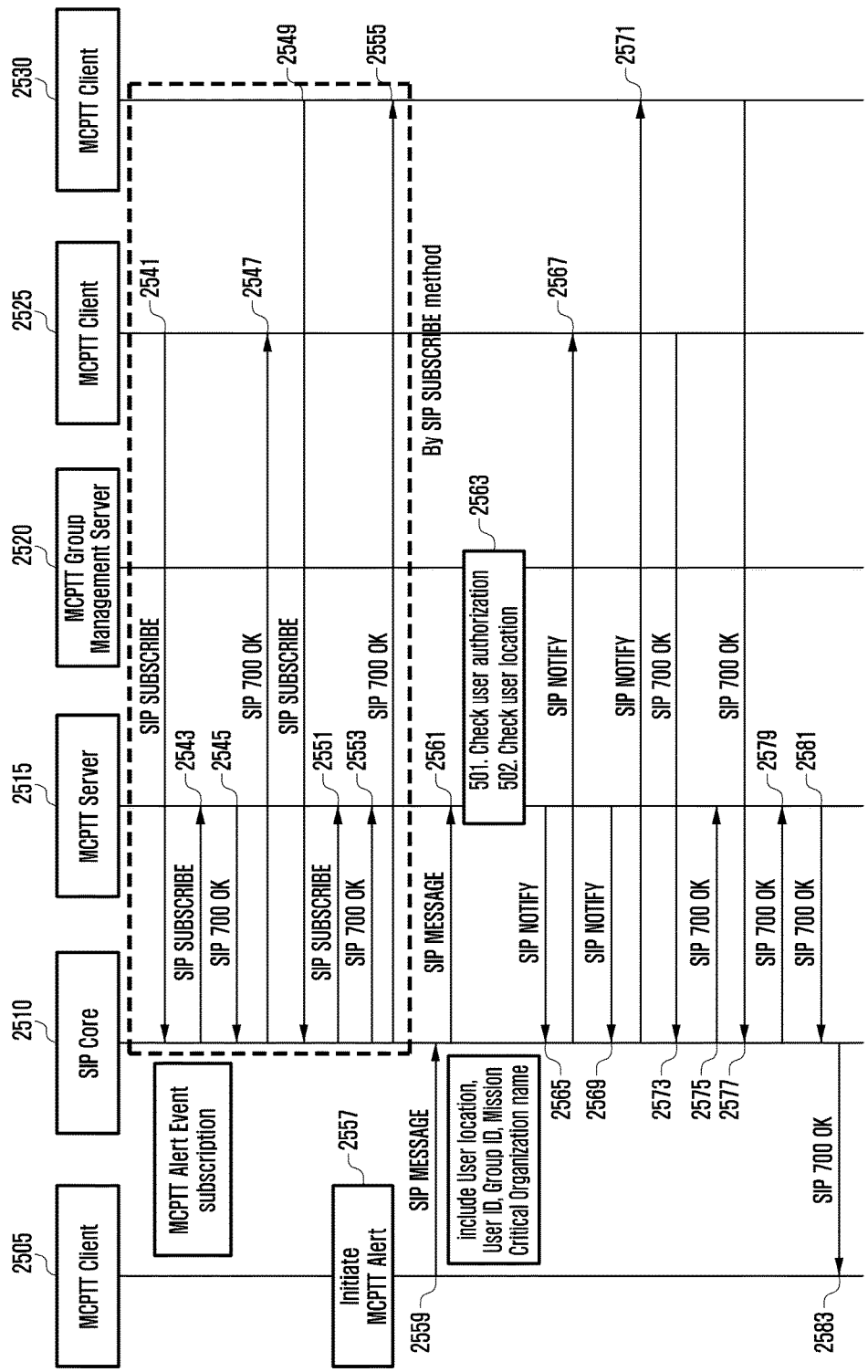
FIG. 25 is a flow diagram that describes a method of transmitting an alert message using SIP messages according to an embodiment of the present disclosure.

FIGS. 23 to 25 show flow diagrams that describe a method of transmitting an Alert message according to various embodiments of the present disclosure. An alert message may be transmitted before inviting an emergency call when an MCPTT service is provided. An alert message-related procedure may be optionally performed when MCPTT services are provided.

FIG. 23 is a flow diagram that describes a method of transmitting an alert message using an SIP message according to an embodiment of the present disclosure.

Referring to FIG. 23, the mobile communication system is capable of including an MCPTT client 2305, an SIP core 2310, an MCPTT server 2315, and an MCPTT group management server 2320. The mobile communication system is capable of further including an MCPTT client 2325 and an MCPTT client 2330. The MCPTT client and the MCPTT UE are interchangeable with each other. The MCPTT alert refers to an alert message that UE or UE user transmits to announce an emergency situation.

The MCPTT client 2305 initiates an MCPTT Alert operation in operation 2341. The MCPTT client 2305 transmits an SIP message to the SIP core 2310 in operation 2343. The SIP message may contain location information regarding UE, a user ID, a group ID, and information regarding an affiliated group. The SIP core 2310 transmits the SIP message to the MCPTT server 2315 in operation 2345. In the embodiment, location information is used to indicate a location of the MCPTT client 2305 and to select a particular target to transmit a message.

The MCPTT server 2315 is capable of checking the user authorization and/or the user location in operation 2347. The MCPTT server 2315 communicates with the MCPTT group management server 2320 and checks the user authorization and the user location. The MCPTT server 2315 checks the location and/or the authorization of the user that transmits an alert message. When the MCPTT server 2315 needs to edit the alert message, it may apply the modification, addition and deletion to the information contained in the alert message.

The MCPTT server 2315 transmits the SIP message to the SIP core 2310 in operation 2349. The SIP message may be a message that has been edited by the MCPTT server 2315 in such a way that part of the information is modified, added or deleted.

The SIP core 2310 transmits an SIP message to the MCPTT client 2325, based on the SIP message received in operation 2349, in operation 2351.

The MCPTT server 2315 transmits an SIP message to the SIP core 2310 in operation 2353. The SIP message may be a message that has been edited by the MCPTT server 2315 in such a way that part of the information is modified, added or deleted.

The SIP core 2310 transmits an SIP message to the MCPTT client 2330, based on the SIP message received in operation 2351, in operation 2355.

The MCPTT client 2325 transmits an SIP 200 OK to the SIP core 2310 in operation 2357. The SIP core 2310 transmits an SIP 200 OK to MCPTT server 2315, based on the SIP 200 OK received in operation 2357, in operation 2359.

The MCPTT client 2330 transmits an SIP 200 OK to the SIP core 2310 in operation 2361. The SIP core 2310 transmits an SIP 200 OK to the MCPTT server 2315, based on the SIP 200 OK received in operation 2361, in operation 2363.

The MCPTT server 2315 transmits an SIP 200 OK to the SIP core 2310, based on the received SIP 200 OK, in operation 2365. The SIP core 2310 transmits an SIP 200 OK to the MCPTT client 2305, based on the SIP 200 OK received from the MCPTT server 2315, in operation 2367.

Therefore, the method according to the embodiment transmits an alert message via the SIP message protocol.

FIG. 24 is a flow diagram that describes a method for a UE to transmit an alert message using protocols other than SIP according to an embodiment of the present disclosure.

Referring to FIG. 24, the mobile communication system is capable of including an MCPTT client 2405, an SIP core 2410, an MCPTT server 2415, and an MCPTT group management server 2420. The mobile communication system is capable of further including an MCPTT client 2425 and an MCPTT client 2430. In the embodiment, a UE (or client or clients) is capable of using a hypertext transfer protocol (HTTP) request message, HTTP response messages, SMS, etc.

The MCPTT client 2405 initiates an MCPTT alert operation in operation 2441.

The MCPTT client 2405 transmits an MCPTT alert SMS to the MCPTT server 2415 in operation 2443. Alternatively, the MCPTT client 2405 transmits an MCPTT alert HTTP request to the MCPTT server 2415 in operation 2445. The MCPTT alert SMS and the MCPTT alert HTTP request may contain location information regarding UE, a user ID, a group ID, and information regarding an affiliated group.

The MCPTT server 2415 is capable of checking the user authorization and/or the user location in operation 2447. The MCPTT server 2415 communicates with the MCPTT group management server 2420 and checks the user authorization and the user location. The MCPTT server 2415 checks the location and/or the authorization of the user that transmits an MCPTT alert SMS message or an MCPTT alert HTTP request message. When the MCPTT server 2415 needs to edit the alert message, it may apply the modification, addition and deletion to the information contained in the alert message. When the user is not an MCPTT user, the system may transmit an SMS message or an HTTP request/response message to a specific number, instead of SIP messages. Alternatively, the MCPTT server 2415 creates an MCPTT message with a user ID and a group which are temporarily assigned and transmits the message to corresponding group users.

The MCPTT server 2415 transmits the response to the MCPTT client 2405 in operation 2449. The response is an MCPTT alert HTTP response or an SMS.

The MCPTT server 2415 transmits an SIP message to the SIP core 2410 in operation 2451. The SIP message may be a message that has been edited by the MCPTT server 2415 in such a way that part of the information is modified, added or deleted.

The SIP core 2410 transmits an SIP message to the MCPTT client 2425, based on the SIP message received in operation 2451, in operation 2453.

The MCPTT server 2415 transmits an SIP message to the SIP core 2410 in operation 2455. The SIP message may be a message that has been edited by the MCPTT server 2415 in such a way that part of the information is modified, added or deleted.

The SIP core 2410 transmits an SIP message to the MCPTT client 2430, based on the SIP message received in operation 2455, in operation 2457.

The MCPTT client 2425 transmits an SIP 200 OK to the SIP core 2410 in operation 2459. The SIP core 2410 transmits an SIP 200 OK to MCPTT server 2415, based on the SIP 200 OK received in operation 2459, in operation 2461.

The MCPTT client 2430 transmits an SIP 200 OK to the SIP core 2410 in operation 2463. The SIP core 2410 transmits an SIP 200 OK to the MCPTT server 2415, based on the SIP 200 OK received in operation 2463, in operation 2465.

Therefore, the method according to the embodiment transmits an alert message using SMS and/or HTTP, instead of the SIP message protocol.

FIG. 25 is a flow diagram that describes a method of transmitting an alert message using SIP messages according to an embodiment of the present disclosure.

In the embodiment, UE devices have previously registered a situation of a particular event in the MCPTT server, using an SIP SUBSCRIBE method. When an event occurs, the MCPTT server notifies UE device, registered events, that the event occurred, via SIP NOTIFY. When UE is in a situation where an event occurs, the UE transmits an alert message of notifying the occurrence of an event to the MCPTT server. The transmission of an alert message may be performed using an SIP method or a protocol (e.g., HTTP, SMS, etc.) except for the SIP protocol.

Referring to FIG. 25, the mobile communication system is capable of including an MCPTT client 2505, an SIP core 2510, an MCPTT server 2515, and an MCPTT group management server 2520. The mobile communication system is capable of further including an MCPTT client 2525 and an MCPTT client 2530.

An event is registered using an SIP subscribe method as the following operations 2541 to 2555.

The MCPTT client 2525 transmits an SIP subscribe message to the SIP core 2510 in operation 2541. The MCPTT client 2525 registers a situation of a particular event, using the SIP subscribe message. The SIP core 2510 transmits the SIP subscribe message to the MCPTT server 2515 in operation 2543. The MCPTT server 2515 registers a particular event requested by the MCPTT client 2525. The MCPTT server 2515 transmits an SIP 200 OK to the SIP core 2510 in operation 2545. The SIP core 2510 transmits an SIP 200 OK to the MCPTT client 2525 in operation 2547. Through these processes, the MCPTT client 2525 registers its event.

The MCPTT client 2530 transmits an SIP subscribe message to the SIP core 2510 in operation 2549. The MCPTT client 2530 registers a situation of a particular event, using the SIP subscribe message. The SIP core 2510 transmits the SIP subscribe message to the MCPTT server 2515 in operation 2551. The MCPTT server 2515 registers a particular event requested by the MCPTT client 2530. The MCPTT server 2515 transmits an SIP 200 OK to the SIP core 2510 in operation 2553. The SIP core 2510 transmits an SIP 200 OK to the MCPTT client 2530 in operation 2555. Through these processes, the MCPTT client 2525 registers its event.

The MCPTT client 2505 initiates an MCPTT Alert operation in operation 2557. Although the embodiment referring to FIG. 25 is implemented in such a way that the Alert message is transmitted via SIP messages, it should be understood that the present disclosure is not limited to the embodiment. For example, the alert message may also be transmitted via other protocols such as HTTP, SMS, etc., instead of SIP messages.

The MCPTT client 2505 transmits an SIP message to the SIP core 2510 in operation 2559. The SIP message may contain location information regarding UE, a user ID, a group ID, and information regarding an affiliated group. The SIP core 2510 transmits the SIP message to the MCPTT server 2515 in operation 2561.

The MCPTT server 2515 is capable of checking the user authorization and/or user location in operation 2563. The MCPTT server 2515 communicates with the MCPTT group management server 2520 and checks the user authorization and the user location. The MCPTT server 2515 determines whether a particular event occurred. The MCPTT server may transmit an SIP NOTIFY message to the client which has registered a situation of a particular event when the event occurs.

The MCPTT server 2515 transmits an SIP NOTIFY message to the SIP core 2510 in operation 2565. The SIP NOTIFY message may indicate a particular event situation. The SIP core 2510 transmits the SIP NOTIFY to the MCPTT client 2525 in operation 2567.

The MCPTT server 2515 transmits an SIP NOTIFY message to the SIP core 2510 in operation 2569. The SIP NOTIFY message may indicate a particular event situation. The SIP core 2510 transmits an SIP NOTIFY to the MCPTT client 2530 in operation 2571.

The MCPTT client 2525 transmits an SIP 200 OK to the SIP core 2510 in operation 2573. The SIP core 2510 transmits an SIP 200 OK to the MCPTT server 2515, based on the SIP 200 OK received in operation 2573, in operation 2575.

The MCPTT client 2530 transmits an SIP 200 OK to the SIP core 2510 in operation 2577. The SIP core 2510 transmits an SIP 200 OK to the MCPTT server 2515, based on the SIP 200 OK received in operation 2577, in operation 2579.

The MCPTT server 2515 transmits an SIP 200 20 OK to the SIP core 2510, based on the SIP 200 OK received in operation 2579, in operation 2581. The SIP core 2510 transmits an SIP 200 OK to the MCPTT client 2505, based on the SIP 200 OK received from the MCPTT server 2515, in operation 2583.

Therefore, the method according to the embodiment transmits an alert message via the SIP NOTIFY message.

Figure 26:
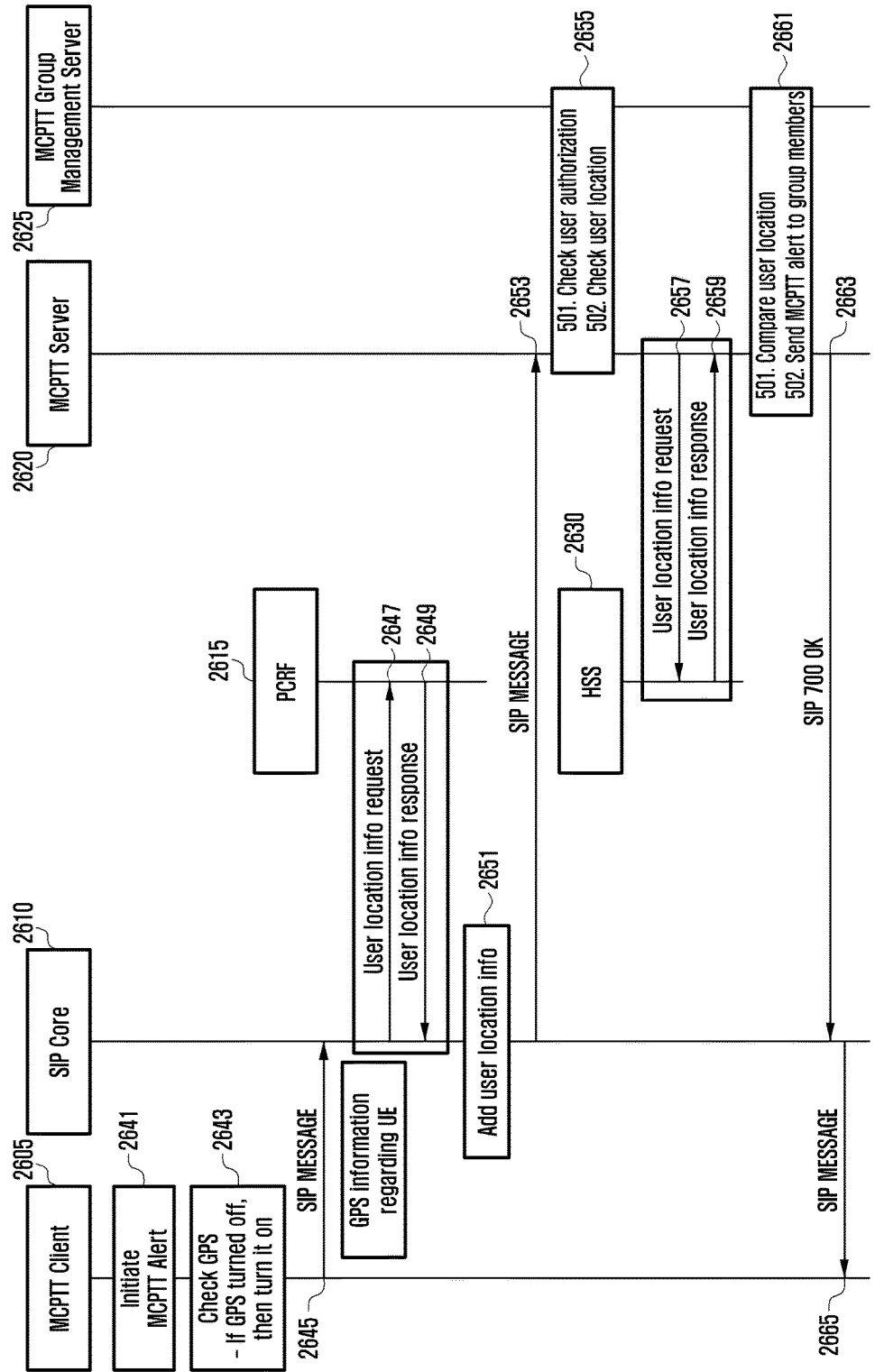
FIG. 26 is a flow diagram that describes a method of including location information of a UE in an alert message and transmitting the message according to an embodiment of the present disclosure.

FIG. 26 is a flow diagram that describes a method of including location information of a UE in an alert message and transmitting the message according to an embodiment of the present disclosure.

An Alert message transmitted by UE may contain location information regarding UE. A method of obtaining location information regarding UE and including location information in an alert message is described referring to FIG. 26. UE is capable of including its location information from a global positioning system (GPS) in an alert message and transmitting the alert message. When the GPS function is turned off in the UE, it may be activated by the user. When the SIP core receives an Alert message from UE, it is capable of adding location information regarding UE to the alert message, referring to its stored information. When the MCPTT server receives an Alert message, it is capable of obtaining location information regarding UE from the SIP core or a network, and adding the obtained information to the Alert message.

Referring to FIG. 26, the mobile communication system is capable of including an MCPTT client 2605, an SIP core 2610, a policy and charging rule function (PCRF) 2615, an MCPTT server 2620, an MCPTT group management server 2625 and an HSS 2630.

The MCPTT client 2605 initiates an MCPTT Alert operation in operation 2641.

The MCPTT client 2605 is capable of checking the state of a device for detecting location information (a location information detecting device) in operation 2643. For example, the location information detecting device may be a GPS. When the MCPTT client 2605 has turned off its GPS function, it may activate the GPS function.

The MCPTT client 2605 transmits an SIP message to the SIP core 2610 in operation 2645. The SIP message my contain GPS location information regarding UE. The SIP core 2610 transmits a user location information request to the PCRF 2615 in operation 2647. The PCRF 2615 transmits the user information response to the SIP core 2610 in operation 2649. In the embodiment, operations 2647 and 2649 may be omitted. The SIP core 2610 may add the user location information received from the MCPTT client 2605 and/or PCRF to the message in operation 2651.

The SIP core 26105 transmits an SIP message to the MCPTT server 2620 in operation 2653. The SIP message may contain user location information. The MCPTT server 2620 is capable of checking the user authorization and/or the user location in operation 2655. The MCPTT server 2620 communicates with the MCPTT group management server 2625 and checks the user authorization and the user location. The MCPTT server 2620 checks the location and/or the authorization of the user that transmits an alert message. When the MCPTT server 2620 needs to edit the alert message, it may apply the modification, addition and deletion to the information contained in the alert message.

The MCPTT server 2620 transmits a user location information request to the HSS 2630 in operation 2657. The HSS 2630 transmits a user location information response to the MCPTT server 2620 in operation 2659. In the embodiment, operations 2657 and 2659 may be omitted.

The MCPTT server 2620 compares user location information with at least one of the following: GPS information, information obtained from the PCRF, and information obtained from the HSS 2657 in operation 2661. The MCPTT server 2620 transmits the MCPTT alert message to group members.

The MCPTT server 2620 transmits an SIP 200 OK to the SIP core 2610 in operation 2663. The SIP core 2610 transmits an SIP 200 OK to the MCPTT client 2605 in operation 2665.

Therefore, the method according to the embodiment transmits an alert message including location information regarding UE.

FIGS. 27 to 31 show embodiments according to the method for MCPTT UE or an MCOPTT server to provide MCPTT priority services according to various embodiments of the present disclosure. When MCPTT UE or an MCPTT server receives a service request, they may perform the operations similar to those of the MCPTT UE or an MCPTT server described in the embodiments referring to FIGS. 18 to 22.

Figure 27:
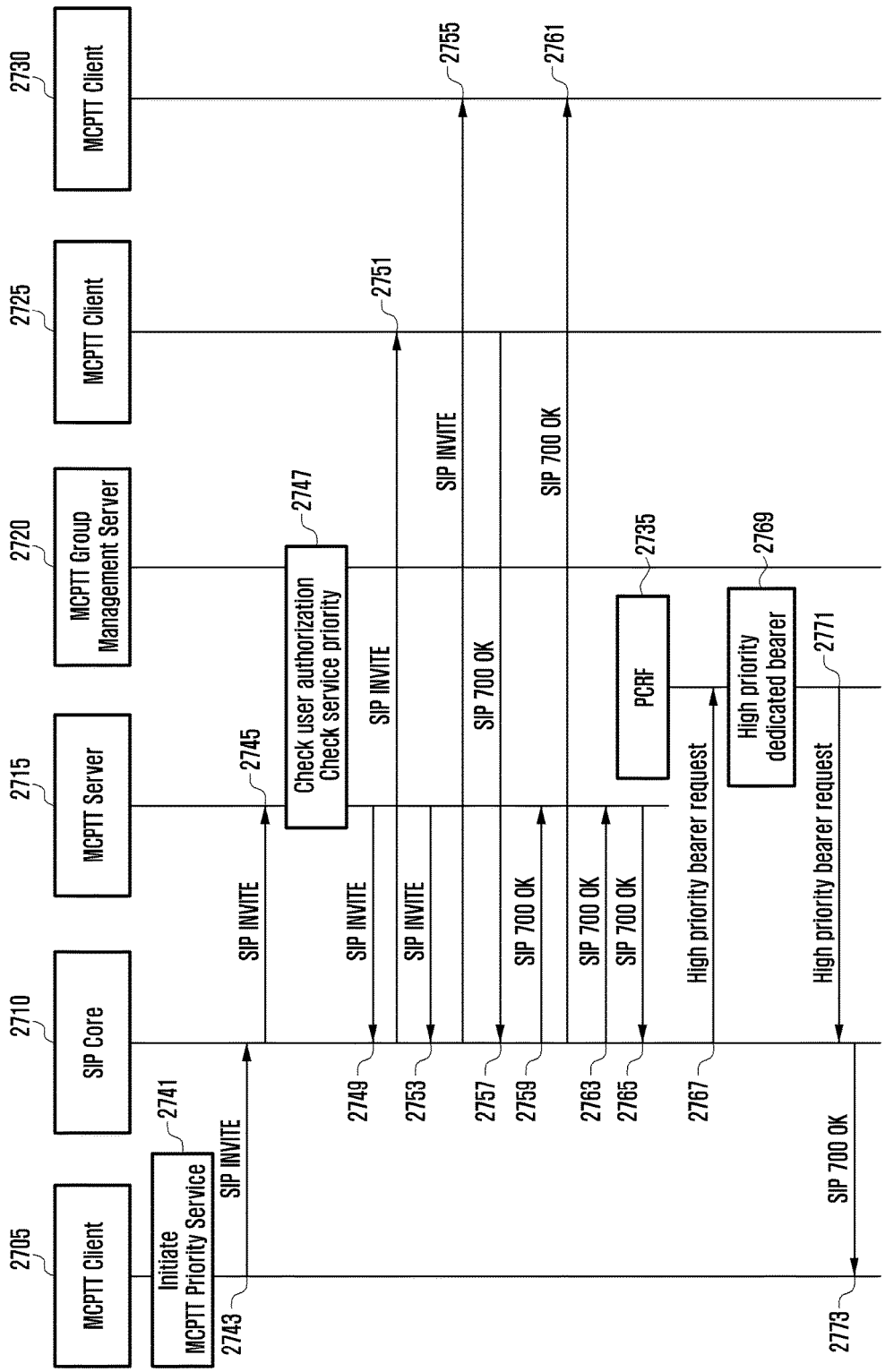
FIG. 27 is a flow diagram that describes a method of setting up a group call according to an embodiment of the present disclosure.

FIG. 27 is a flow diagram that describes a method of setting up a group call according to an embodiment of the present disclosure.

The MCPTT UE initiates an emergency group call via an MCPTT network. When the MCPTT server receives a group call request from MCPTT UE, it determines whether the user has an authorization for a group call request. The SIP core receives a group call request and assigns resources for the group call to the user.

Referring to FIG. 27, the MCPTT client 2705 initiates an MCPTT priority service in operation 2741. The MCPTT client 2705 transmits an SIP INVITE message to an SIP core 2710 in operation 2743. The SIP core 2710 transmits the SIP INVITE to the MCPTT server 2715 in operation 2745.

The MCPTT server 2715 checks the user authorization in operation 2747. The MCPTT server 2715 also checks the service priority. The MCPTT server 2715 communicates with the MCPTT group management server 2720 and checks the user authorization and the service priority. The MCPTT server 2715 transmits the SIP INVITE to the SIP core 2710 based on the check results in operation 2749. The SIP core 2710 transmits the SIP INVITE to the MCPTT client 2725 in operation 2751.

The MCPTT server 2715 transmits the SIP INVITE to the SIP core 2710 based on the checked result in operation 2753. The SIP core 2710 transmits the SIP INVITE to the MCPTT client 2730 in operation 2755.

The MCPTT client 2725 transmits an SIP 200 OK to the SIP core 2710 in operation 2757. The SIP core 2710 transmits an SIP 200 OK to the MCPTT server 2715 in operation 2759. The MCPTT client 2730 transmits an SIP 200 OK to the SIP core 2710 in operation 2761. The SIP core 2710 transmits an SIP 200 OK to the MCPTT server 2715 in operation 2763.

The MCPTT server 2715 transmits an SIP 200 OK to the SIP core 2710 in operation 2765. The SIP core 2710 transmits a bearer request message to a PCRF 2735 in operation 2767. For example, the SIP core 2710 may request a bearer with high priority from the PCRF 2735. The PCRF 2735 assigns a bearer in operation 2769. The assigned bearer may be a bearer with high priority or a dedicated bearer. The PCRF 2735 transmits the bearer response message to the SIP core 2710 in operation 2771. The SIP core 2710 transmits an SIP 200 OK to the MCPTT client 2705 in operation 2773.

Therefore, the emergency group call is set up via the method described above.

Figure 28:
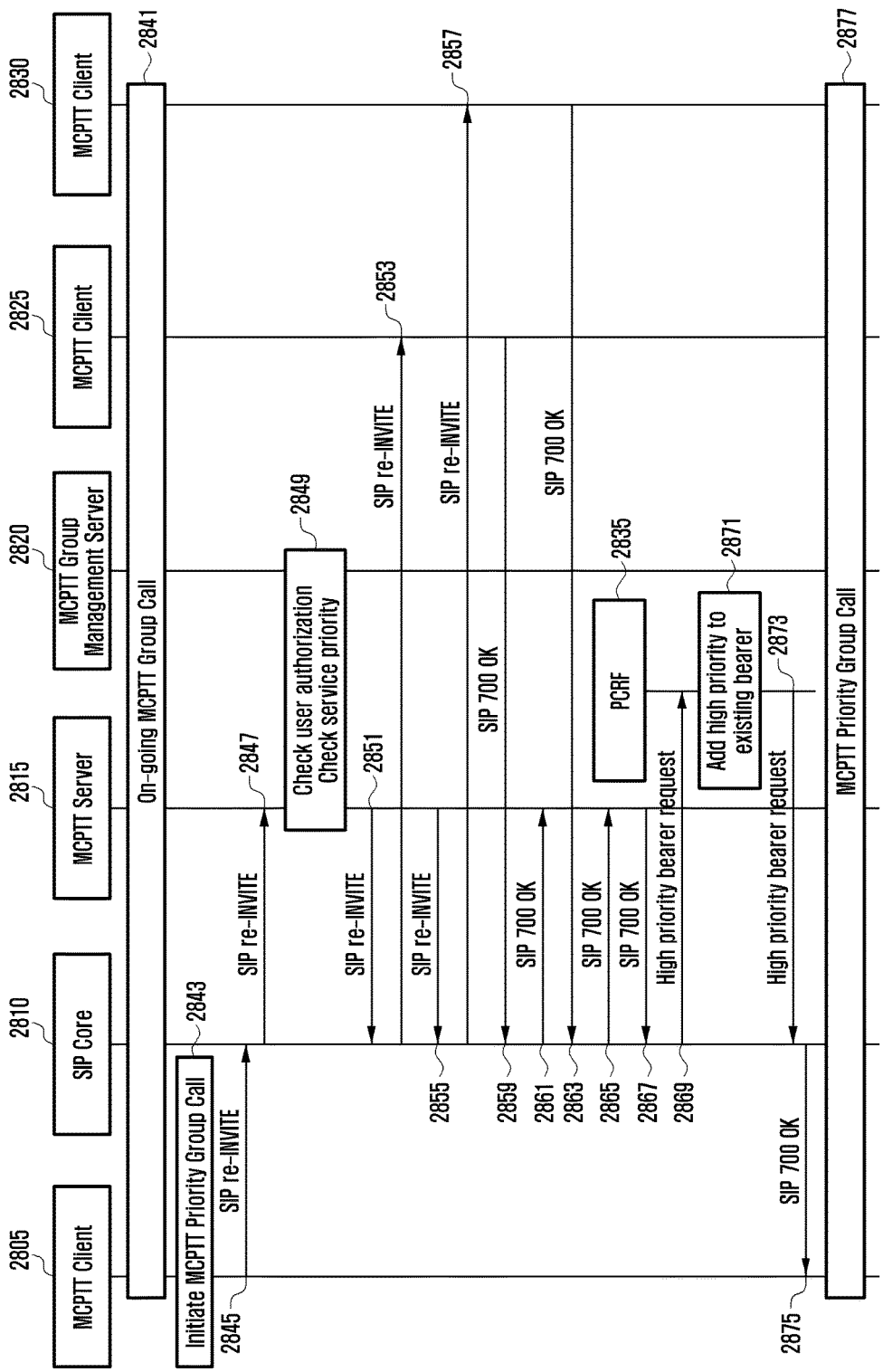
FIG. 28 is a flow diagram that describes a method of switching a normal group call to an emergency group call according to an embodiment of the present disclosure.

FIG. 28 is a flow diagram that describes a method of switching a normal group call to an emergency group call according to an embodiment of the present disclosure.

During an ongoing group call, UE is capable of switching the group call to an emergency group call. When the server receives an emergency group call request from the UE, it determines whether the user has an authorization for an emergency group call request. The SIP core receives an emergency group call request and alters resources to meet the emergency group call.

Referring to FIG. 28, the mobile communication system is capable of including an MCPTT client 2805, an SIP core 2810, an MCPTT server 2815, and an MCPTT group management server 2820. The mobile communication system is capable of further including an MCPTT client 2825, an MCPTT client 2830, and a PCRF 2835.

The MCPTT client 2805 performs an ongoing group call in operation 2841. The MCPTT client 2805 performs an ongoing group call with the MCPTT client 2825 and MCPTT client 2830.

The MCPTT client 2805 initiates an MCPTT priority service in operation 2843. In the embodiment, it is assumed that the priority service is an MCPTT priority group call service. The MCPTT client 2805 transmits an SIP re-INVITE message to the SIP core 2810 in operation 2845. The SIP core 2810 transmits the SIP re-INVITE to the MCPTT server 2815 in operation 2847.

The MCPTT server 2815 checks the user authorization in operation 2849. The MCPTT server 2815 also checks the service priority. The MCPTT server 2815 communicates with the MCPTT group management server 2820 and checks the user authorization and the service priority. The MCPTT server 2815 transmits the SIP re-INVITE to the SIP core 2810 based on the check results in operation 2851. The SIP core 2810 transmits the SIP re-INVITE to the MCPTT client 2825 in operation 2853. The MCPTT server 2815 transmits the SIP re-INVITE to the SIP core 2810 based on the checked result in operation 2855. The SIP core 2810 transmits the SIP re-INVITE to the MCPTT client 2825 in operation 2857.

The MCPTT client 2825 transmits an SIP 200 OK to the SIP core 2810 in operation 2859. The SIP core 2810 transmits an SIP 200 OK to the MCPTT server 2815 in operation 2861. The MCPTT client 2830 transmits an SIP 200 OK to the SIP core 2810 in operation 2863. The SIP core 2810 transmits an SIP 200 OK to the MCPTT server 2815 in operation 2865. The MCPTT server 2815 transmits an SIP 200 OK to the SIP core 2810 in operation 2867.

The SIP core 2810 transmits a bearer request message to the PCRF 2835 in operation 2869. For example, the SIP core 2810 may request a bearer with high priority for an emergency call from the PCRF 2835. The PCRF 2835 assigns a bearer in operation 2871. The assigned bearer may be a bearer with high priority or a dedicated bearer. The PCRF 2835 transmits the bearer response message to the SIP core 2810 in operation 2873. The SIP core 2810 transmits an SIP 200 OK to the MCPTT client 2805 in operation 2875 and the MCPTT priority group calls occurs in operation 2877.

Therefore, the method according to the embodiment alters a general group call to an emergency group call.

Figure 29:
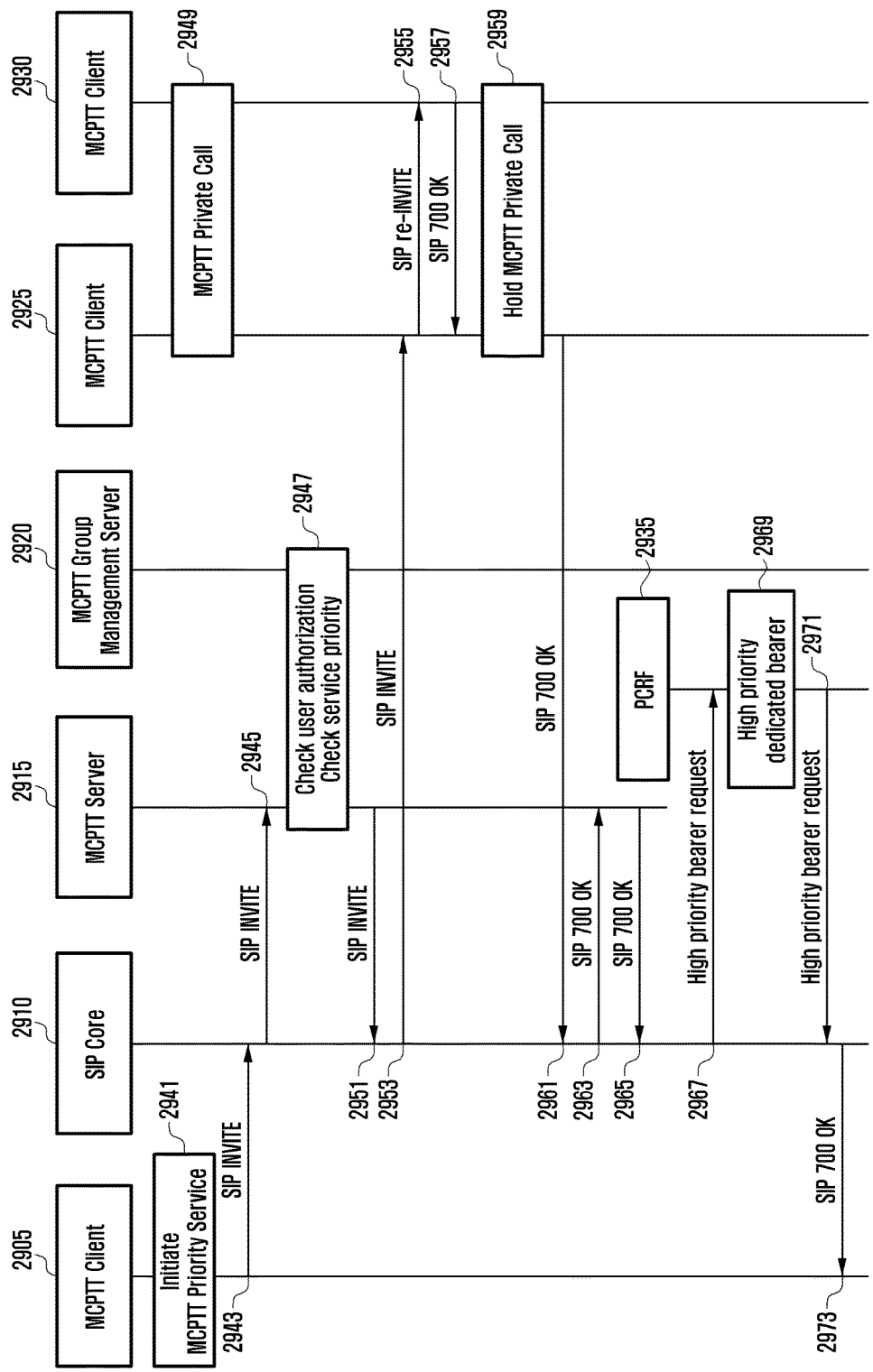
FIG. 29 is a flow diagram that describes a method for a UE to process an emergency group call request, while providing other services according to an embodiment of the present disclosure.

FIG. 29 is a flow diagram that describes a method for a UE to process an emergency group call request, while providing other services according to an embodiment of the present disclosure.

When UE receives an emergency group call request, it may continue providing a service that it has provided, ignoring the received request. Alternatively, the UE may stop providing a service that it has provided, and may then start with the requested, emergency group call or may alter media of the current service and/or the emergency group call service.

Referring to FIG. 29, the mobile communication system is capable of including an MCPTT client 2905, an SIP core 2910, an MCPTT server 2915, and an MCPTT group management server 2920. The mobile communication system is capable of further including an MCPTT 2925, an MCPTT client 2930, and a PCRF 2935.

The MCPTT client 2905 initiates an MCPTT priority service in operation 2941. The MCPTT client 2905 transmits an SIP INVITE message to the SIP core 2910 in operation 2943. The SIP core 2910 transmits the SIP INVITE to the MCPTT server 2915 in operation 2945.

The MCPTT server 2915 checks the user authorization in operation 2947. The MCPTT server 2915 also checks the service priority. The MCPTT server 2915 communicates with the MCPTT group management server 2920 and checks the user authorization and the service priority. The MCPTT server 2915 transmits the SIP INVITE to the SIP core 2910 based on the check result in operation 2951.

The SIP core 2910 transmits an SIP INVITE message to the MCPTT client 2925 in operation 2953. The MCPTT client 2925 and the MCPTT client 2930 have been performing a private call in operation 2949. When receiving the SIP INVITE from the SIP core 2910, the MCPTT client 2925 transmits an SIP re-INVITE to the MCPTT client 2930 in operation 2955. The MCPTT client 2930 transmits an SIP 200 OK to the MCPTT client 2925 in operation 2957. The private call between the MCPTT client 2925 and the MCPTT client 2930 is held in operation 2959.

The MCPTT client 2925 transmits an SIP 200 OK to the SIP core 2910 in operation 2961. The SIP core 2910 transmits an SIP 200 OK to the MCPTT server 2915 in operation 2963. The MCPTT client 2915 transmits an SIP 200 OK to the SIP core 2910 in operation 2965.

The SIP core 2910 transmits a bearer request message to the PCRF 2935 in operation 2967. For example, the SIP core 2910 may request a bearer with high priority for an emergency call from the PCRF 2935. The PCRF 2935 assigns a bearer in operation 2969. The assigned bearer may be a bearer with high priority or a dedicated bearer. The PCRF 2935 transmits the bearer response message to the SIP core 2910 in operation 2971. The SIP core 2910 transmits an SIP 200 OK to the MCPTT client 2905 in operation 2973.

Therefore, the method according to the embodiment is capable of receiving and processing the emergency group call request, while providing other services.

UE is capable of transmitting an alert message to a corresponding member in a group before requesting an emergency group call service. More specifically, UE transmits an alert message via one of the methods described above referring to FIGS. 23 to 26, and request an emergency group call service via one of the method described above referring to FIGS. 27 to 29.

Figure 30:
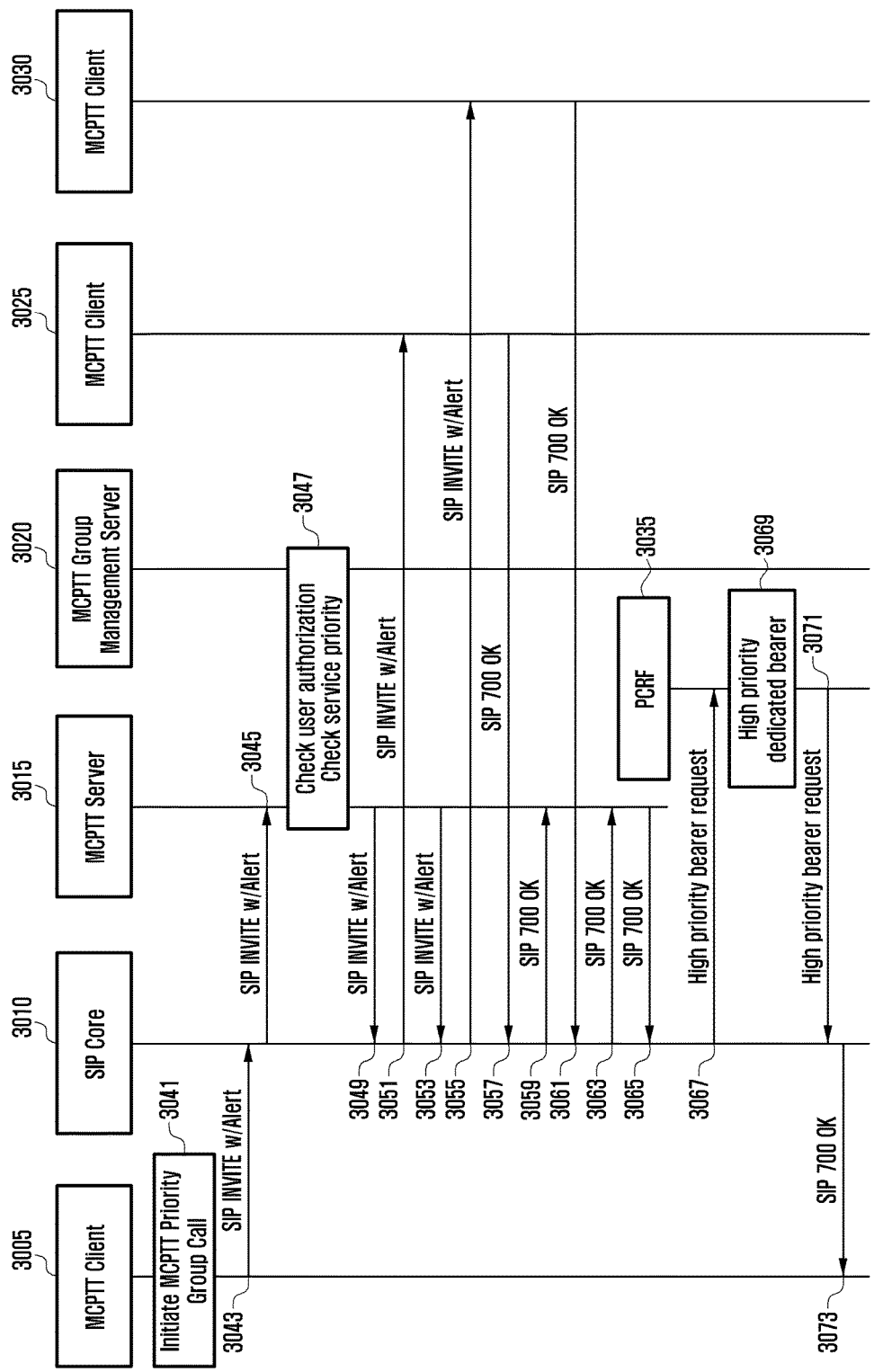
FIG. 30 is a flow diagram that describes a method of including an alert message in an emergency group call request message and transmitting the request message according to an embodiment of the present disclosure.

FIG. 30 is a flow diagram that describes a method of including an alert message in an emergency group call request message and transmitting the request message according to an embodiment of the present disclosure.

Referring to FIG. 30, the mobile communication system is capable of including an MCPTT client 3005, an SIP core 3010, an MCPTT server 3015, and an MCPTT group management server 3020. The mobile communication system is capable of further including an MCPTT client 3025 and an MCPTT client 3030.

The MCPTT client 3005 initiates an MCPTT priority group call in operation 3041. The MCPTT client 3005 transmits an SIP INVITE message to the SIP core 3010 in operation 3043. In the embodiment, the MCPTT client 3005 transmits an SIP INVITE message along with an alert message. The 'SIP INVITE message including an Alert message' is called an 'SIP INVITE w/Alert.'

The SIP core 3010 transmits the SIP INVITE w/Alert to the MCPTT server 3015 in operation 3045. The MCPTT server 3015 checks the user authorization in operation 3047. The MCPTT server 3015 also checks the service priority. The MCPTT server 3015 communicates with the MCPTT group management server 3020 and checks the user authorization and the service priority. The MCPTT server 3015 transmits the SIP INVITE w/Alert to the SIP core 3010 based on the check result in operation 3049.

The SIP core 3010 transmits an SIP INVITE w/Alert message to the MCPTT client 3025 in operation 3051. The MCPTT server 3015 transmits the SIP INVITE to the SIP core 3010 based on the checked result in operation 3053. The SIP core 3010 transmits the SIP INVITE w/Alert to the MCPTT client 3030 in operation 3055.

The MCPTT client 3025 transmits an SIP 200 OK to the SIP core 3010 in operation 3057. The SIP core 3010 transmits an SIP 200 OK to the MCPTT server 3015 in operation 3059. The MCPTT client 3030 transmits an SIP 200 OK to the SIP core 3010 in operation 3061. The SIP core 3010 transmits an SIP 200 OK to the MCPTT server 3015 in operation 3063.

The MCPTT server 3015 transmits an SIP 200 OK to the SIP core 3010 in operation 3065. The SIP core 3010 transmits a bearer request message to a PCRF 3035 in operation 3067. For example, the SIP core 3010 may request a bearer with high priority from the PCRF 3035. The PCRF 3035 assigns a bearer in operation 3069. The assigned bearer may be a bearer with high priority or a dedicated bearer. The PCRF 3035 transmits the bearer response message to the SIP core 3010 in operation 3071. The SIP core 3010 transmits an SIP 200 OK to the MCPTT client 3005 in operation 3073.

Figure 31:
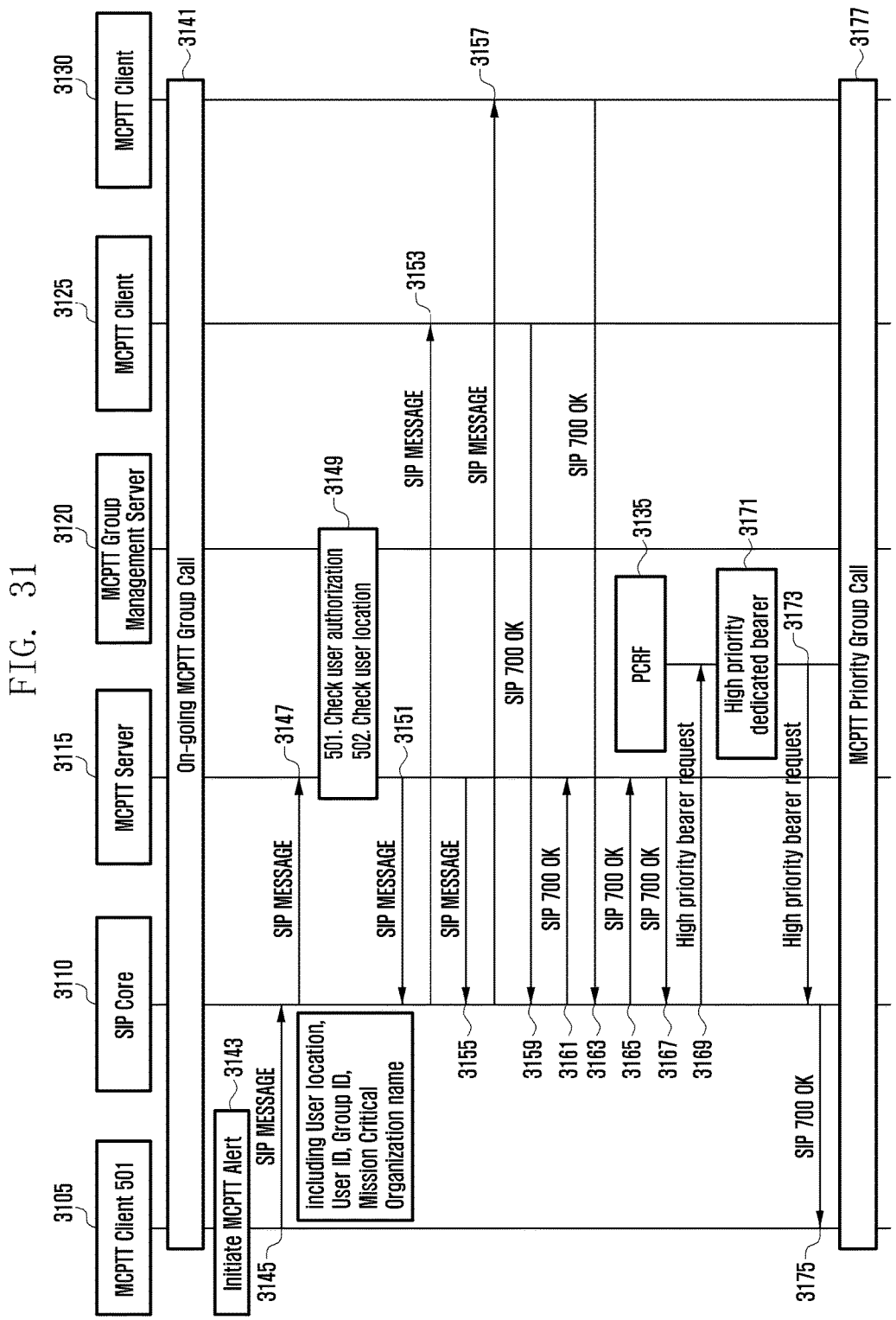
FIG. 31 is a flow diagram that describes a method of receiving an alert message during a normal group call and switching the normal group call to an emergency group call according to an embodiment of the present disclosure.

FIG. 31 is a flow diagram that describes a method of receiving an alert message during a normal group call and switching the normal group call to an emergency group call according to an embodiment of the present disclosure.

Alert message may be defined based on SIP methods (SIP MESSAGE, SUBSCRIBE/NOTIFY, etc.) and protocols (e.g., HTTP, SMS, etc.) as well as the SIP. When an SIP core receives a corresponding Alert message, it may modify resources assigned to a normal group call to meet an emergency group call.

Referring to FIG. 31, the mobile communication system is capable of including an MCPTT client 3105, a SIP core 3110, an MCPTT server 3115, and an MCPTT group management server 3120. The mobile communication system is capable of further including an MCPTT client 3125 and an MCPTT client 3130.

The entities of the communication system are performing a normal group call in operation 3141.

The MCPTT client 3105 initiates an MCPTT alert operation in operation 3143. The MCPTT client 3105 transmits an SIP message to the SIP core 3110 in operation 3145. The SIP message may contain location information regarding UE, a user ID, a group ID, and information regarding an affiliated group. The SIP core 3110 transmits the SIP message to the MCPTT server 3115 in operation 3147.

The MCPTT server 3115 is capable of checking the user authorization and/or the user location in operation 3149. The MCPTT server 3115 communicates with the MCPTT group management server 3120 and checks the user authorization and the user location. The MCPTT server 3115 checks the location and/or the authorization of the user that transmits an alert message. When the MCPTT server 3115 needs to edit the alert message, it may apply the modification, addition and deletion to the information contained in the alert message.

The MCPTT server 3115 transmits the SIP message to the SIP core 3110 in operation 3151. The SIP message may be a message that has been edited by the MCPTT server 3115 in such a way that part of the information is modified, added or deleted. The SIP core 3110 transmits an SIP message to the MCPTT client 3125, based on the SIP message received in operation 3151, in operation 3153. The MCPTT server 3115 transmits an SIP message to the SIP core 3110 in operation 3155. The SIP message may be a message that has been edited by the MCPTT server 3115 in such a way that part of the information is modified, added or deleted. The SIP core 3110 transmits an SIP message to the MCPTT client 3125, based on the SIP message received in operation 3155, in operation 3157.

The MCPTT client 3125 transmits an SIP 200 OK to the SIP core 3110 in operation 3159. The SIP core 3110 transmits an SIP 200 OK to MCPTT server 3115, based on the SIP 200 OK received in operation 3159, in operation 3161.

The MCPTT client 3130 transmits an SIP 200 OK to the SIP core 3110 in operation 3163. The SIP core 3110 transmits an SIP 200 OK to the MCPTT server 3115, based on the SIP 200 OK received in operation 3163, in operation 3165.

The MCPTT server 3115 transmits an SIP 200 OK to the SIP core 3110, based on the received SIP 200 OK, in operation 3167. The SIP core 3110 transmits a bearer request message to a PCRF 3135 in operation 3169. For example, the SIP core 3110 may request a bearer with high priority from the PCRF 3135. The PCRF 3135 assigns a bearer in operation 3171. The assigned bearer may be a bearer with high priority or a dedicated bearer. The PCRF 3135 transmits the bearer response message to the SIP core 3110 in operation 3173.

The SIP core 3110 transmits an SIP 200 OK to the MCPTT client 3105 in operation 3175. After that, entities on a normal group call are switched to an emergency group call in operation 3177. Individual entities perform an MCPTT priority group call.

Therefore, when UE devices on a normal group call receive an alert message, they can switch the current group call to an emergency call using the method according to the embodiment.

Figure 32:
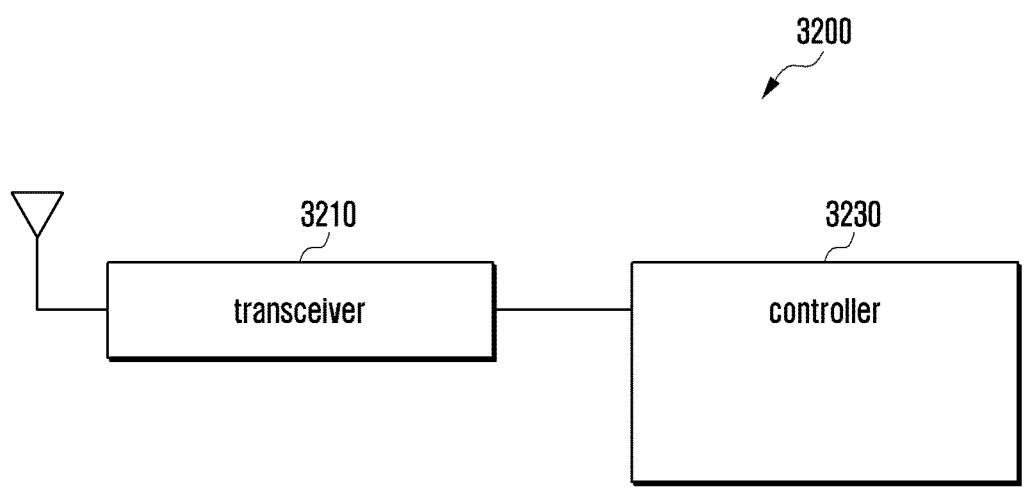
FIG. 32 is a block diagram showing the configuration of a UE according to an embodiment of the present disclosure.

FIG. 32 is a block diagram showing the configuration of a UE according to an embodiment of the present disclosure.

Referring to FIG. 32, a UE 3200 is capable of including a transceiver 3210 and a controller 3230. The transceiver 3210 is capable of including a receiver and a transmitter.

The transceiver 3210 is capable of transmitting/receiving signals to/from other network entities. The signals may include at least one of the following: control information, data, and pilot signals. The transceiver 3210 includes a radio frequency (RF) transmitter for up-converting the frequency of signals to be transmitted and amplifying power of the signals and an RF receiver for low-noise amplifying received signals and down-converting the frequency of the received signals. The transceiver 3210 receives signals via a wireless channel and outputs the signals to the controller 3230. The transceiver 3210 receives signals from the controller 3230 and transmits the signals via a wireless channel.

The controller 3230 controls all the operations of the UE. For example, the controller 3230 receives a first service request from an MCPTT server. The controller 3230 determines whether a first service corresponding to the first service request and a second service currently in execution can be provided simultaneously. When the controller 3230 ascertains that a first service corresponding to the first service request and a second service currently in execution cannot be provided simultaneously, it is capable of processing the services based on their individual priorities.

The controller 3230 is capable of adjusting media of a posterior service of the services, and processing the adjusted media. The processes of adjusting media include at least one of the following: terminating or refusing the posterior service, holding the posterior service until a prior service is ended, converting the posterior service to a service which can provide the media of the posterior service simultaneously along with media of a prior service, and forwarding the media to another UE which has already registered (set). The priority may refer to priority according to users, priority according to groups, or priority according to services.

Although the embodiment describes the operations and functions of the UE 3200 and controller 3230 referring to FIG. 32, it should be understood that the present disclosure is not limited thereto. It should be understood that the controller 3230 is capable of controlling the UE 3200 to perform the embodiments described above.

Figure 33:
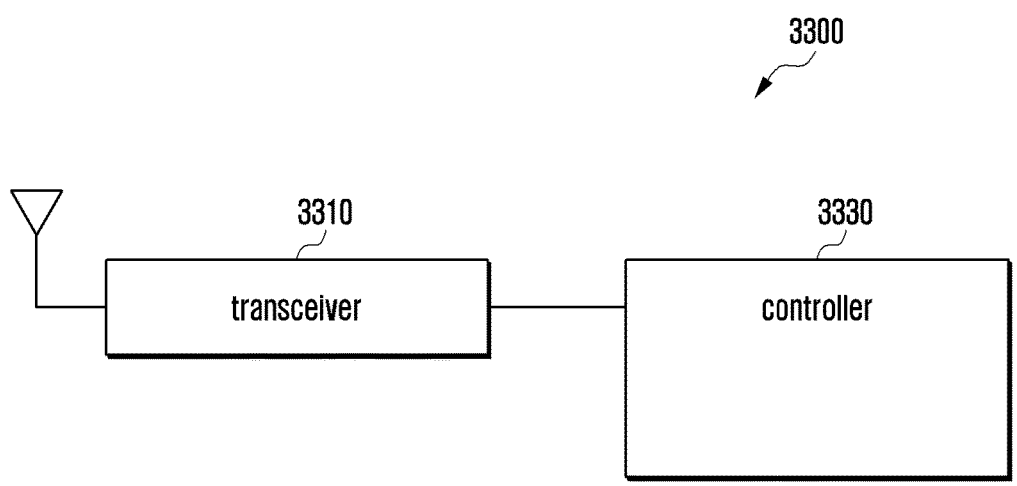
FIG. 33 is a block diagram showing the configuration of an MCPTT server according to an embodiment of the present disclosure.

FIG. 33 is a block diagram showing the configuration of an MCPTT server according to an embodiment of the present disclosure.

Referring to FIG. 33, an MCPTT server 3300 is capable of including a transceiver 3310 and a controller 3330. The transceiver 3310 is capable of including a receiver and a transmitter. The transceiver 3310 is capable of transmitting/receiving signals to/from other network entities. The controller 3330 controls all the operations of the MCPTT server 3300.

The controller 3330 receives, from UE 1, a first service request for UE 2. The controller 3330 determines whether UE 2 currently providing a second service can provide a first service corresponding to the first service request and the second service simultaneously. When the controller 3330 ascertains that UE 2 currently providing a second service cannot provide a first service corresponding to the first service request and the second service simultaneously, it is capable of processing the services based on their individual priorities. The controller 3330 transmits a service request message to the UE 2 based on the determination.

The controller 3330 is capable of adjusting media of a posterior service of the services. The processes of adjusting media include at least one of the following: terminating or refusing the posterior service, holding the posterior service until a prior service is ended, converting the posterior service to a service which can provide the media of the posterior service simultaneously along with media of a prior service, and forwarding the media to another UE which has already registered (set). The priority may refer to priority according to users, priority according to groups, or priority according to services.

The controller 3330 receives floor request messages from UEs 1 and 2. The controller 3330 transmits a floor grant message to prior UE of the UEs 1 and 2, based on priorities of the UEs 1 and 2.

The controller 3330 receives a group service request and determined whether the number of target UE devices for a group service satisfies a preset threshold condition. The controller 3330 provides the group service in multicast or unicast mode, based on the determination.

Although the embodiment describes the operations and functions of the MCPTT server 3300 and controller 3330 referring to FIG. 33, it should be understood that the present disclosure is not limited thereto. It should be understood that the controller 3330 is capable of controlling the MCPTT server 3300 to perform the embodiments described above.

It should be understood that individual entities shown in FIGS. 23 to 31 include a controller for controlling the entities and a transceiver for performing the transmission/reception of signals to/from other network entities.

According to embodiments of the present disclosure, the relay UE is capable of creating a PDN connection and efficiently performing UE-to-network relay.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for a first terminal to transmit signals in a communication system, the method comprising:
    transmitting a service authorization request message to a network device associated with a proximity-based service (ProSe) function;
    receiving a service authorization response message in response to the service authorization request message for authentication of the first terminal from the network device, the service authorization response message including a relay service code, validity time information related to a service authorization for a user equipment (UE)-to-network relay, and an access point name (APN) to be used for a packet data network (PDN) connection for a relay service code related service, the relay service code related service being provided for a second terminal through the first terminal; and
    establishing the PDN connection for the UE-to-network relay based on the APN included in the service authorization response message,
    wherein the first terminal is capable of performing a UE-to-network relay function, and
    wherein the relay service code is used to identify the service provided by the UE-to-network relay.

2. The method of claim 1, wherein information included in the service authorization response message is determined based on information that is stored in the network device for identifying whether the first terminal is capable of performing the UE-to-network relay function.

3. The method of claim 1, further comprising:
    transmitting a discovery message including the relay service code for the UE-to-network relay with the second terminal based on information included in the service authorization response message.

4. The method of claim 1, further comprising:
transmitting PDN connectivity request message including the APN to a mobility management entity (MME).

5. A method for a network device to transmit signals in a communication system, the method comprising:
receiving a service authorization request message from a first terminal, the first terminal being capable of performing a user equipment (UE)-to-network relay function; and
transmitting a service authorization response message in response to the service authorization request message for authentication of the first terminal to the first terminal, the service authorization response message including a relay service code, validity time information related to a service authorization for a UE-to-network relay, and an access point name (APN) to be used for a packet data network (PDN) connection for a relay service code related service, the relay service code related service being provided for a second terminal through the first terminal,
wherein the network device is associated with a proximity-based service (ProSe) function,
wherein the PDN connection for the UE-to-network relay is established based on the APN included in the service authorization response message, and
wherein the relay service code is used to identify the service provided by the UE-to-network relay function.

6. The method of claim 5, further comprising:
identifying whether the first terminal is capable of performing the UE-to-network relay function, after the service authorization request message is received.

7. The method of claim 6, further comprising:
in a case that information is not stored in the network device to determine whether the first terminal is capable of performing the UE-to-network relay function, obtaining the information from a home subscriber server (HSS).

8. The method of claim 5, wherein the first terminal is configured to transmit a discovery message including the relay service code for the UE-to-network relay with the second terminal, based on information included in the service authorization response message.

9. A first terminal configured to transmit signals in a communication system, the first terminal comprising:
a transceiver; and
a controller coupled with the transceiver and configured to:
transmit a service authorization request message to a network device associated with a proximity-based service (ProSe) function,
receive a service authorization response message in response to the service authorization request message for authentication of the first terminal from the network device, the service authorization response message including a relay service code, validity time information related to a service authorization for a user equipment (UE)-to-network relay, and an access point name (APN) to be used for a packet data network (PDN) connection for a relay service code related service, the relay service code related service being provided for a second terminal through the first terminal, and
establish the PDN connection for the UE-to-network relay based on the APN included in the service authorization response message,
wherein the first terminal is capable of performing a UE-to-network relay function, and
wherein the relay service code is used to identify the service provided by the UE-to-network relay.

10. The first terminal of claim 9, wherein information included in the service authorization response message is determined based on the information that is stored in the network device for identifying whether the first terminal is capable of performing the UE-to-network relay function.

11. The first terminal of claim 9, wherein the controller is further configured to transmit a discovery message including the relay service code for the UE-to-network relay with the second terminal based on information included in the service authorization response message.

12. The first terminal of claim 9, wherein the controller is further configured to control to transmit PDN connectivity request message including the APN to a mobility management entity (MME).

13. A network device configured to transmit signals in a communication system, the network device comprising:
a transceiver; and
a controller coupled with the transceiver and configured to control to:
receive a service authorization request message from a first terminal, the first terminal being capable of performing a user equipment (UE)-to-network relay function, and
transmit a service authorization response message in response to the service authorization request message for authentication of the first terminal to the first terminal, the service authorization response message including a relay service code, validity time information related to a service authorization for a UE-to-network relay, and an access point name (APN) to be used for a packet data network (PDN) connection for a relay service code related service, the relay service code related service being provided for a second terminal through the first terminal,
wherein the network device is associated with a proximity-based service (ProSe) function,
wherein the PDN connection for the UE-to-network relay is established based on the APN included in the service authorization response message, and
wherein the relay service code is used to identify the service provided by the UE-to-network relay function.

14. The network device of claim 13, wherein the controller is further configured to identify whether the first terminal is capable of performing the UE-to-network relay function, after the service authorization request message is received.

15. The network device of claim 14, wherein the controller is further configured to, in a case that information is not stored in the network device to determine whether the first terminal is capable of performing the UE-to-network relay function, obtain the information from a home subscriber server (HSS).

16. The network device of claim 13, wherein the first terminal is configured to transmit a discovery message including the relay service code for the UE-to-network relay with the second terminal based on information included in the service authorization response message.

* * * * *

UNITED STATES PATENT AND TRADEMARK OFFICE
CERTIFICATE OF CORRECTION

PATENT NO. : 10,455,406 B2
APPLICATION NO. : 15/196509
DATED : October 22, 2019
INVENTOR(S) : Youngkyo Baek et al.

It is certified that error appears in the above-identified patent and that said Letters Patent is hereby corrected as shown below:

On the Title Page

Item (72), Lines 8-9, delete "Guttman Erik" and insert --Erik Guttman--.

Signed and Sealed this
Twenty-eighth Day of January, 2020

Andrei Iancu
*Director of the United States Patent and Trademark Office*